US011924849B2

(12) United States Patent
Oh et al.

(10) Patent No.: US 11,924,849 B2
(45) Date of Patent: Mar. 5, 2024

(54) METHOD AND APPARATUS FOR TRANSMITTING CONTROL AND DATA INFORMATION IN WIRELESS CELLULAR COMMUNICATION SYSTEM

(71) Applicant: Samsung Electronics Co., Ltd., Gyeonggi-do (KR)

(72) Inventors: Jinyoung Oh, Seoul (KR); Seunghoon Choi, Gyeonggi-do (KR); Sungjin Park, Incheon (KR); Jeongho Yeo, Gyeonggi-do (KR); Youngbum Kim, Seoul (KR); Taehyoung Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 349 days.

(21) Appl. No.: 17/497,180

(22) Filed: Oct. 8, 2021

(65) Prior Publication Data
US 2022/0039074 A1 Feb. 3, 2022

Related U.S. Application Data

(63) Continuation of application No. 16/467,809, filed as application No. PCT/KR2018/001134 on Jan. 25, 2018, now Pat. No. 11,240,790.

(30) Foreign Application Priority Data

Feb. 7, 2017 (KR) .................. 10-2017-0016830

(51) Int. Cl.
H04W 72/23 (2023.01)
H04L 5/00 (2006.01)
H04W 72/20 (2023.01)

(52) U.S. Cl.
CPC ........... *H04W 72/23* (2023.01); *H04L 5/0007* (2013.01); *H04L 5/0053* (2013.01); *H04W 72/20* (2023.01)

(58) Field of Classification Search
None
See application file for complete search history.

(56) References Cited

U.S. PATENT DOCUMENTS 9,444,601 B2 9/2016 Zhang et al.
2001/0055290 A1 12/2001 Seidel et al.
(Continued)

FOREIGN PATENT DOCUMENTS

CN 1323123 11/2001
CN 101242247 8/2008
(Continued)

OTHER PUBLICATIONS

European Search Report dated Nov. 23, 2021 issued in counterpart application No. 18751353.6-1205, 8 pages.
(Continued)

*Primary Examiner* — Kenny S Lin
(74) *Attorney, Agent, or Firm* — The Farrell Law Firm, P.C.

(57) ABSTRACT

The present disclosure relates to a communication technique for joining an IoT technology with a 5G communication system for supporting a higher data transfer rate than a 4G system, and a system thereof. The disclosure may be applied to intelligent services (for example, a smart home, a smart building, a smart city, a smart car or a connected car, a health care, a digital education, retailing, security and safe-related service, etc.) on the basis of a 5G communication technology and an IoT related technology. The present disclosure relates to a wireless communication system, and to a method and an apparatus for smoothly providing a service in a communication system. More particularly, the present disclosure relates to a method and an apparatus for transmitting and receiving downlink and uplink control information within a communication system.

16 Claims, 34 Drawing Sheets

(56) References Cited

U.S. PATENT DOCUMENTS

| | | |
|---|---|---|
| 2010/0067460 A1 | 3/2010 | Hu et al. |
| 2012/0163334 A1 | 6/2012 | Miki |
| 2013/0051269 A1 | 2/2013 | Suzuki et al. |
| 2014/0023010 A1 | 1/2014 | Loehr et al. |
| 2014/0044206 A1 | 2/2014 | Nammi |
| 2015/0029990 A1 | 1/2015 | Marinier et al. |
| 2015/0365965 A1 | 12/2015 | Wu |
| 2015/0382356 A1 | 12/2015 | Kim et al. |
| 2016/0135143 A1* | 5/2016 | Won .......... H04W 52/243 370/312 |
| 2016/0191174 A1* | 6/2016 | Hwang .......... H04B 15/00 375/348 |
| 2016/0226643 A1* | 8/2016 | Mallik .......... H04L 1/1819 |
| 2017/0223701 A1* | 8/2017 | Bendle .......... H04W 72/23 |
| 2018/0124611 A1 | 5/2018 | Moon et al. |
| 2018/0176903 A1 | 6/2018 | Lee et al. |
| 2018/0205395 A1 | 7/2018 | Nammi |
| 2019/0007959 A1 | 1/2019 | Hwang |
| 2019/0191487 A1 | 6/2019 | Kwon |
| 2019/0268938 A1* | 8/2019 | Zhao .......... H04L 5/0055 |
| 2019/0349126 A1 | 11/2019 | Andgart |
| 2020/0099474 A1 | 3/2020 | Wikstrom |

FOREIGN PATENT DOCUMENTS

| | | | |
|---|---|---|---|
| CN | 101478808 | 7/2009 | |
| CN | 101695009 | 4/2010 | |
| CN | 101867953 | 10/2010 | |
| CN | 103067137 | 4/2013 | |
| CN | 105187181 | 12/2015 | |
| EP | 2 509 373 | 10/2012 | |
| EP | 3 550 918 | 10/2019 | |
| EP | 3582420 A1 * | 12/2019 | .......... H04L 1/004 |
| JP | 11-68712 | 3/1999 | |
| KR | 1020090089505 | 8/2009 | |
| KR | 1020160121405 | 10/2016 | |
| WO | WO 2017/003048 | 1/2017 | |
| WO | WO-2020204497 A1 * | 10/2020 | .......... H04L 1/1812 |

OTHER PUBLICATIONS

Sony, "Considerations on Dynamic Resource Sharing for eMBB/URLLC in DL", R1-1700677, 3GPP TSG RAN WG1 NR Ad-Hoc Meeting, Jan. 16-20, 2017, 7 pages.

ZTE, ZTE Microelectronics, "Multiplexing of eMBB and URLLC", R1-166408, 3GPP TSG RAN WG1 Meeting #86, Aug. 22-26, 2016, 10 pages.

Nokia, Alcatel-Lucent Shanghai Bell, "Punctured Scheduling for Low Latency Transmissions", R1-167308, 3GPP TSG-RAN WG1 #86, Aug. 22-26, 2016, 4 pages.

European Search Report dated Oct. 21, 2019 Issued in counterpart application No. 18751353.6-1219, 8 pages.

PCT/ISA/210 Search Report dated Apr. 25, 2018 Issued on PCT/KR2017/001134, pp. 5.

PCT/ISA/237 Written Opinion dated Apr. 25, 2018 issued on PCT/KR2017/001134, pp. 7.

Nokia et al., "On Indication for Downlink Punctured / Preemptive Scheduling", R1-1703327, 3GPP TSG-RAN WG1#88, Feb. 13-17, 2017, 4 pages.

European Search Report dated Oct. 28, 2020 issued in counterpart application No. 18751353.6-1205, 9 pages.

Samsung, "eMBB and URLLC Multiplexing in DL", R1-1612540, 3GPP TSG RAN WG1 Meeting #87, Nov. 14-18, 2016, 5 pages.

Chinese Office Action dated Aug. 31, 2022 issued in counterpart application No. 201880010513.7, 21 pages.

* cited by examiner

FIG. 1C
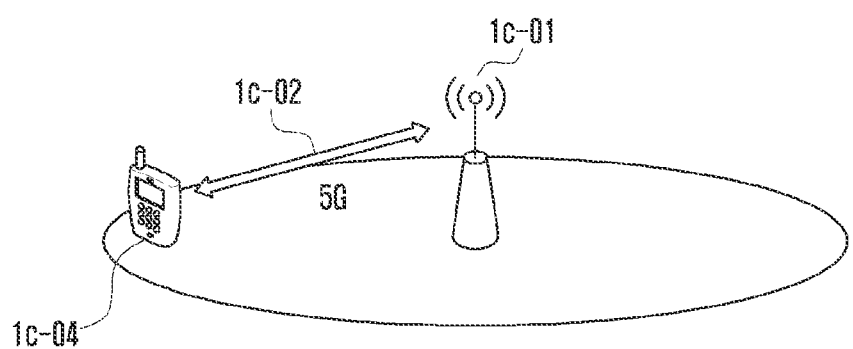
(a)
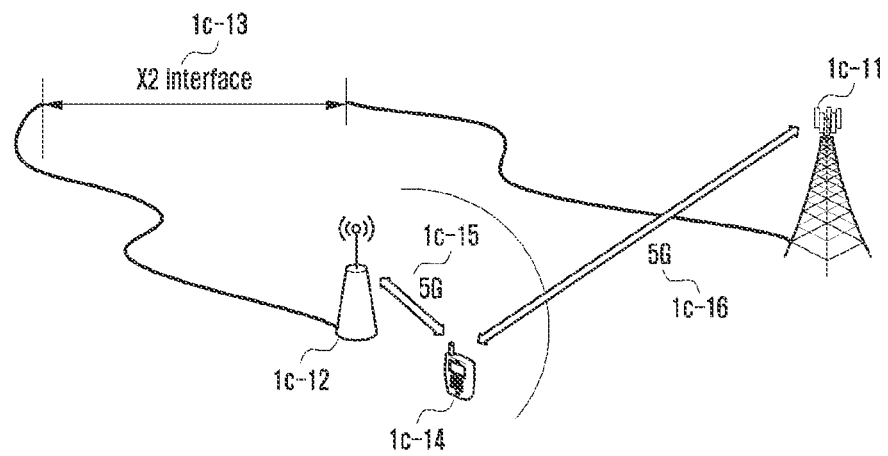
(b)

FIG. 1D
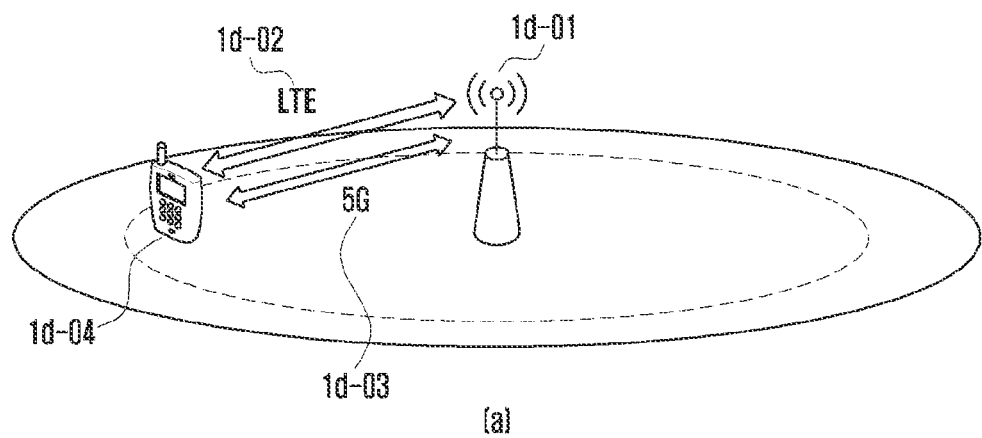
(a)
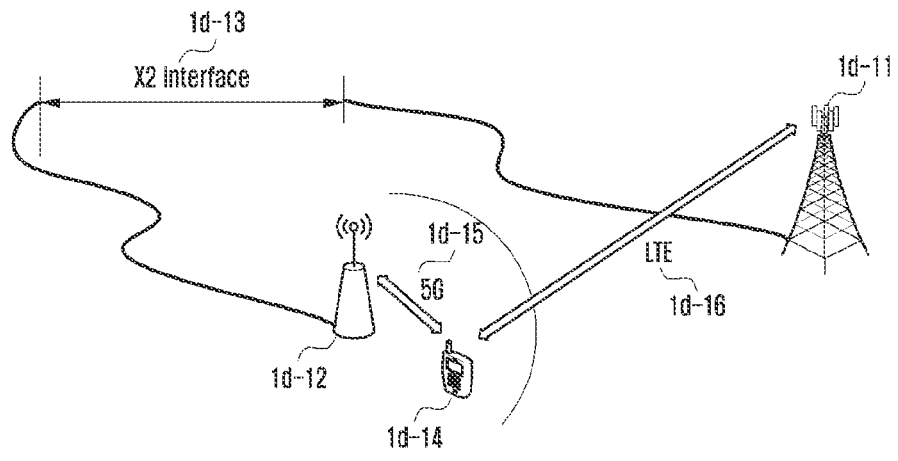
(b)

FIG. 1I

METHOD AND APPARATUS FOR TRANSMITTING CONTROL AND DATA INFORMATION IN WIRELESS CELLULAR COMMUNICATION SYSTEM

CROSS-REFERENCE TO RELATED APPLICATION(S)

This application is a Continuation of U.S. Ser. No. 16/467,809, which was filed in the U.S. Patent and Trademark Office (USPTO) on Jun. 7, 2019, as a National Phase Entry of PCT International Application No. PCT/KR2018/001134, which was filed on Jan. 25, 2018, and claims priority to Korean Patent Application No. 10-2017-0016830, which was filed on Feb. 7, 2017, the entire content of each of which is incorporated herein by reference.

BACKGROUND

1. Field

The disclosure relates to a wireless communication system and to a method and a device for efficiently providing a service in a communication system. More particularly, the disclosure relates to a method and a device for transmitting/receiving downlink and uplink control information in a communication system.

2. Description of the Related Art

In order to meet wireless data traffic demands, which have increased since the commercialization of a 4G communication system, efforts to develop an improved 5G communication system or a pre-5G communication system have been made. For this reason, the 5G communication system or the pre-5G communication system is called a beyond-4G-network communication system or a post-LTE system.

In order to achieve a high data transmission rate, implementation of the 5G communication system in an mmWave band (for example, a 60 GHz band) is being considered. In the 5G communication system, technologies regarding beamforming, massive MIMO, full-dimensional MIMO (FD-MIMO), array antennas, analog beamforming, and large-scale antennas are being discussed in order to mitigate a propagation path loss in the mm Wave band and to increase a propagation transmission distance.

Further, in the 5G communication system, technologies such as an evolved small cell, an advanced small cell, a cloud radio access network (cloud RAN), an ultra-dense network, device-to-device communication (D2D), a wireless backhaul, a moving network, cooperative communication, coordinated multi-points (CoMP), and received interference cancellation have been developed in order to improve the system network.

In addition, in the 5G system, advanced coding modulation (ACM) schemes such as hybrid FSK and QAM modulation (FQAM) and sliding window superposition coding (SWSC), and advanced access technologies such as filter bank multi-carrier (FBMC), non-orthogonal multiple access (NOMA), and sparse code multiple access (SCMA), have been developed.

Meanwhile, the Internet has evolved from a human-oriented connection network, in which humans generate and consume information, to encompass an Internet-of-Things (IoT) network, in which distributed components such as objects exchange and process information. Internet-of-Everything (IoE) technology, in which big-data processing technology is combined with the IoT technology through a connection with a cloud server or the like, has emerged. In order to implement IoT, technical factors such as sensing technology, wired/wireless communication, network infrastructure, service-interface technology, and security technology are required, and research into technologies such as a sensor network, machine-to-machine (M2M) communication, machine-type communication (MTC), and the like for connection between objects has recently been conducted. In an IoT environment, through collection and analysis of data generated by connected objects, an intelligent Internet technology (IT) service that creates new value in peoples' lives may be provided. The IoT may be applied to fields such as those of a smart home, a smart building, a smart city, a smart car or a connected car, a smart grid, health care, a smart home appliance, or high-tech medical services through the convergence of conventional information technology (IT) and various industries.

Accordingly, various attempts to apply the 5G communication to the IoT network are made. For example, technologies (5G communication technologies) such as a sensor network, machine-to-machine (M2M) communication, and machine-type communication (MTC) are implemented by techniques such as beamforming, MIMO, and array antennas. The application of a cloud RAN as the big data processing technology described above may be an example of convergence of the 5G technology and the IoT technology.

There is a need for a method and a device using the same, wherein multiple services can be provided to a user in a communication system as described above, and respective services can be provided within the same time interval according to the characteristics thereof in order to provide the multiple services to the user.

SUMMARY

The disclosure provides a method and a device wherein, when a terminal is to transmit uplink control information and uplink data through one uplink transmission slot or through one or more uplink transmission slots, the position of the slot through which the uplink control information is transmitted, the control information, and data information are transmitted/received efficiently such that communication between the base station and the terminal or between the terminal and another terminal can be provided efficiently.

In addition, the disclosure provides a method and a device for indicating the start symbol and end symbol (or sections) of uplink/downlink data to a terminal using a terminal-common control channel or a terminal-specific control channel.

In addition, the disclosure provides a method and a device for simultaneously providing different types of (or identical types of) services, wherein, when a specific type of service influences (interferes with, in a wireless communication environment) another type of service or the same type of service, the corresponding information is configured as control information and is transferred from the base station to the terminal.

In order to solve the above-mentioned problems, a method of a terminal according to an embodiment includes: receiving information indicating at least one time interval, in which scheduling information is to be monitored, from a base station through a downlink control channel; and receiving downlink scheduling information or uplink scheduling information in the at least one time interval indicated by the information.

In order to solve the above-mentioned problems, a terminal according to an embodiment includes: a transmission/reception unit configured to transmit and receive a signal; and a control unit configured to receive information indicating at least one time interval, in which scheduling information is to be monitored, from a base station through a downlink control channel, and configured to receive downlink scheduling information or uplink scheduling information in the at least one time interval indicated by the information.

In order to solve the above-mentioned problems, a method of a base station according to an embodiment includes: transmitting information indicating at least one time interval, in which scheduling information is to be monitored, to a terminal through a downlink control channel; and transmitting, to the terminal, at least one of downlink scheduling information or uplink scheduling information in the at least one time interval indicated by the information.

In order to solve the above-mentioned problems, a base station according to an embodiment includes: a transmission/reception unit configured to transmit and receive a signal; and a control unit configured to transmit information indicating at least one time interval, in which scheduling information is to be monitored, to a terminal through a downlink control channel, and configured to transmit, to the terminal, at least one of downlink scheduling information or uplink scheduling information in the at least one time interval indicated by the information.

In order to solve the above-mentioned problems, a method of a terminal according to an embodiment includes: receiving control information for scheduling transmission or reception in a slot from a base station through a control channel; identifying a first symbol indicated by the control information and a second symbol determined based on the format of the slot; and transmitting/receiving data to/front the base station according to the control information within an interval determined by the first symbol and the second symbol.

In order to solve the above-mentioned problems, a terminal according to an embodiment includes: a transmission/reception unit configured to transmit and receive a signal; and a control unit configured to receive control information for scheduling transmission or reception in a slot from a base station through a control channel, configured to identify a first symbol indicated by the control information and a second symbol determined based on the format of the slot, and configured to transmit/receive data to/from the base station according to the control information within an interval determined by the first symbol and the second symbol.

In order to solve the above-mentioned problems, a method of a base station according to an embodiment includes: transmitting control information for scheduling transmission or reception in a slot to a terminal through a control channel; and transmitting/receiving data to/from the terminal according to the control information within an interval determined by a first symbol indicated by the control information and by a second symbol determined based on the format of the slot.

In order to solve the above-mentioned problems, a base station according to an embodiment includes: a transmission/reception unit configured to transmit and receive a signal; and a control unit configured to transmit control information for scheduling transmission or reception in a slot to a terminal through a control channel, and configured to transmit/receive data to/from the terminal according to the control information within an interval determined by a first symbol indicated by the control information and by a second symbol determined based on the format of the slot.

In order to solve the above-mentioned problems, a method of a terminal according to an embodiment includes: receiving, from a base station an indicator indicating whether or not a retransmitted code block is to be combined and processed; and decoding, based on the indicator, the retransmitted code block.

In order to solve the above-mentioned problems, a terminal according to an embodiment includes: a transmission/reception unit configured to transmit and receive a signal; and a control unit configured to receive, from a base station, an indicator indicating whether or not a retransmitted code block is to be combined and processed, and configured to decode, based on the indicator, the retransmitted code block.

In order to solve the above-mentioned problems, a method of a base station according to an embodiment includes: transmitting, to a terminal, an indicator indicating whether or not a retransmitted code block is to be combined and processed; and receiving, from the terminal, a result of decoding the retransmitted code block based on the indicator. In order to solve the above-mentioned problems, a base station according to an embodiment includes: a transmission/reception unit configured to transmit and receive a signal; and a control unit configured to transmit, to a terminal, an indicator indicating whether or not a retransmitted code block is to be combined and processed, and configured to receive, from the terminal, a result of decoding the retransmitted code block based on the indicator.

An embodiment of the disclosure provides a method wherein, when a terminal is to transmit uplink control information and uplink data through one uplink transmission slot or through more than one uplink transmission slots, the uplink control information and data are transmitted/received efficiently such that at least one of frequency-time and space resources and transmission power can be used efficiently.

In addition, an embodiment of the disclosure minimizes bits added to a terminal-common control channel for indicating common information to multiple terminals and bits added to a terminal-specific control channel for scheduling uplink/downlink data to the terminals such that the start symbol and end symbol for intervals) of the uplink/downlink data can be indicated to the terminals, and the terminals can transmit/receive the uplink/downlink data through the information.

In addition, an embodiment of the disclosure provides a method wherein data can be transmitted effectively using different types of services in a communication system, data transmission can coexist between the different types of services, thereby satisfying requirements according to respective services, and the delay of transmission time can be reduced, or at least one of frequency-time and space resources can be used efficiently.

BRIEF DESCRIPTION OF THE DRAWINGS

The above and other aspects, features and advantages of certain embodiments of the disclosure will be more apparent from the following detailed description taken in conjunction with the accompanying drawings, in which:

FIG. 1C and FIG. 1D illustrate embodiments of a communication system to which the disclosure is applied;

FIG. 1I illustrates scheduling information that a base station can configure for a terminal according to an embodiment of the disclosure;

FIG. 3IA and FIG. 3IB are block diagrams of a process for receiving data by a terminal according to the $(3\text{-}3)^{th}$ embodiment;

DETAILED DESCRIPTION

Figure 1A:
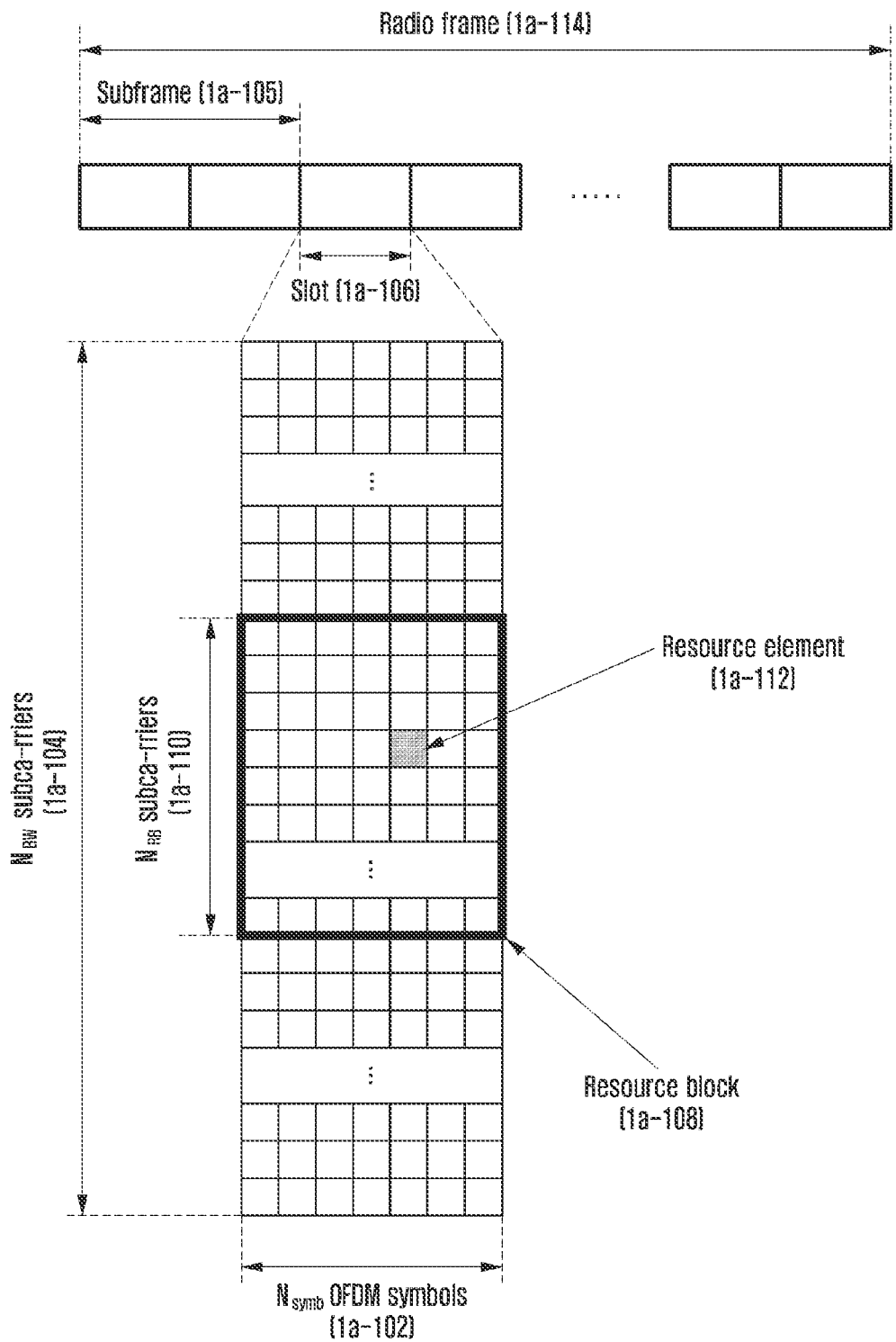
FIG. 1A illustrates the basic structure of a time-frequency domain, which is a radio resource domain where data or a control channel is transmitted in a downlink in an LTE system or a system similar thereto.

In describing embodiments of the disclosure, descriptions of technical contents that are well-known in the art and are not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit", or "module" or divided into a larger number of elements, "unit", or "module". Moreover, the elements and "units" may be implemented to reproduce one or more CPUs within a device or a security multimedia card. Further, in the embodiments, the "unit" may include at least one processor.

First Embodiment

A wireless communication system has developed beyond the voice-based service provided at the initial stage into a broadband wireless communication system that provides high-speed and high-quality packet data services according to communications standards such as, for example, high-speed packet access (HSPA) of 3GPP, long-term evolution (LTE) or evolved universal terrestrial radio access (E-UTRA) LTE-advanced (LTE-A), high-rate packet data (HRPD) of 3GPP2, ultra-mobile broadband (EMB), 802.16e of IEEE, and the like. Also, a communication standard of 5G or new radio (NR) is being developed as a 5G wireless communication system.

In such a wireless communication system, including 5G, a terminal may be provided with at least one service among enhanced mobile broadband (eMBB), massive machine-type communications (mMTC), and ultra-reliable and low-latency communications (URLLC). Such services may be provided to the same terminal during the same time interval. In all embodiments of the disclosure described below, the eMBB may be a service aimed at high-speed transmission of large-capacity data, the mMTC may be a service aimed at minimizing terminal power and connecting multiple terminals, and the URLLC may be a service aimed at high reliability and low latency, but the disclosure is not limited thereto. It may also be assumed in all embodiments of the disclosure described below that the URLLC service transmission time is shorter than the eMBB service transmission time and the mMTC service transmission time, but the disclosure is not limited thereto. The above three services may be major scenarios in a system such as an LTE system or a post-LTE 5G/NR (new-radio or next-radio) system.

Hereinafter, embodiments of the disclosure will be described in detail with reference to the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of operators, or customs, Therefore, the definitions of the terms should be made based on the contents throughout the specification. As used herein, "base station" refers to an entity which configures information for controlling part or all of a terminal, and which performs resource allocation, and may be at least one of an eNode B, a Node B, a base station (BS), a wireless access unit, a base station controller, a transmission and reception unit (TRP), or a node on a network. A terminal may include user equipment (UE), a mobile station (MS), a cellular phone, a smartphone, a computer, or a multimedia system capable of performing a communication function.

In the disclosure, "downlink (DL)" refers to a path of wireless transmission of a signal that a base station transmits to a terminal, and "uplink (UL)" refers to a path of wireless communication of a signal that a terminal transmits to a base station. Although embodiments of the disclosure will be described hereinafter with reference to an exemplary LTE or LTE-A system, embodiments of the disclosure are also applicable to other communication systems having similar technical backgrounds or channel types. For example, the $5^{th}$-generation mobile communication technology (5G new radio (NR)) that is developed as post-LTE-A may belong thereto. In addition, embodiments of the disclosure may be applied to other communication systems through a partial modification that is not deemed by a person skilled in the art to substantially deviate from the scope of the disclosure.

An LTE system, which is a representative example of the broadband wireless communication system, employs an orthogonal frequency division multiplexing (OFDM) scheme for a downlink (DL), and employs a single carrier frequency division multiple access (SC-FDMA) scheme for an uplink (UL). "Uplink" refers to a wireless link through which a terminal (or user equipment (UE) or a mobile station (MS)) transmits data or a control signal to a base station (BS) (or eNodeB), and "downlink" refers to a wireless link through which a base station transmits data or a control signal to a terminal. In the multiple access schemes described above, time-frequency resources for carrying data or control information are allocated and operated in a manner that prevents overlapping of the resources, i.e. to establish orthogonality between users so as to identify data or control information of each user.

When decoding fails at the time of initial transmission, the LTE system employs a hybrid automatic repeat reQuest (HARQ) scheme that retransmits the corresponding data in a physical layer. According to the HARQ scheme, when the receiver fails to accurately decode data, the receiver transmits information that indicates decoding failure (negative acknowledgement (NACK)) to the transmitter such that the transmitter can retransmit the corresponding data in the physical layer. The receiver combines data retransmitted by the transmitter with data, the decoding of which has previously failed, thereby improving the data reception performance. Also, when the receiver accurately decodes data, the receiver may transmit information that indicates successful decoding (acknowledgement (ACK)) to the transmitter such that the transmitter can transmit new data.

FIG. 1A illustrates the basic structure of a time-frequency domain, which is a radio resource domain where data or a control channel is transmitted in a downlink of an LTE system.

In FIG. 1A, the horizontal axis indicates the time domain, and the vertical axis indicates the frequency domain. The smallest transmission unit in the time domain is an OFDM symbol, $N_{symb}$ OFDM symbols 1a-102 constitute one slot 1a-106, and two slots constitute one subframe 1a-105. The length of each slot is 0.5 ms, and the length of each subframe is 1.0 ms. The radio frame 1a-114 is a time-domain unit including ten subframes. The smallest transmission unit in the frequency domain is a subcarrier, and the bandwidth of the entire system transmission bandwidth includes a total of $N_{BW}$ subcarriers 1a-104.

In the time-frequency domain, the basic resource unit is a resource element (RE) 1a-112, which may be expressed by an OFDM symbol index and a subcarrier index. A resource block (RB) (or physical resource block (PRB)) 1a-108 is defined by $N_{symb}$ consecutive OFDM symbols 1a-102 in the time domain and $N_{RB}$ consecutive subcarriers 1a-110 in the frequency domain. Therefore, one RB 1a-108 includes $N_{symb} \times N_{RB}$ REs 1a-112. Generally, the minimum transmission unit of data is the RB unit. In the LTE system, generally, $N_{symb}=7$ and $N_{RB}=12$, and $N_{BW}$ and $N_{RB}$ are proportional to the bandwidth of the system transmission band. The data rate increases in proportion to the is number of RBs that are scheduled for the terminal. An LTE system defines and operates six transmission bandwidths. In the case of an FDD system that separately operates the downlink and the uplink on the basis of frequency, the downlink transmission bandwidth and the uplink transmission bandwidth may differ from each other. The channel bandwidth denotes an RF bandwidth corresponding to the system transmission bandwidth. Table 1 provided below indicates the correlation between a system transmission bandwidth and a channel bandwidth defined in the LTE system. For example, in the case of an LTE system having a channel bandwidth of 10 MHz, the transmission bandwidth includes 50 RBs.

TABLE 1

| Channel bandwidth $BW_{channel}$ [MHz] | 1.4 | 3 | 5 | 10 | 15 | 20 |
|---|---|---|---|---|---|---|
| Transmission bandwidth configuration | 6 | 15 | 25 | 50 | 75 | 100 |

Downlink control information is transmitted within the initial N OFDM symbols inside the subframe. In general, N={1,2,3}. Therefore, the value of N may be changed for each subframe based on the amount of control information to be transmitted in the current subframe. The control information includes a control channel transmission interval indicator indicating the number of OFDM symbols across which control information is transmitted, scheduling information associated with downlink data or uplink data, a HARQ ACK/NACK signal, or the like.

In the LTE system, scheduling information associated with downlink data or uplink data is transmitted from a base station to a terminal via downlink control information (DCI). "Uplink (UL)" refers to a wireless link through which the terminal transmits data or a control signal to the base station, and "downlink (DL)" refers to a wireless link through which the base station transmits data or a control signal to the terminal. The DCI is defined in various formats such that a DCI format is applied and employed based on a definition regarding whether the same indicates scheduling information regarding uplink data (uplink (UL) grant) or scheduling information regarding downlink data (downlink (DL) grant), whether or not the same indicates compact DCI having a small control information size, whether or not spatial multiplexing using multiple antennas is applied, and whether or not the same indicates DCI for power control. For example, DCI format 1, corresponding to scheduling control information regarding downlink data (DL grant), is configured to include at least the following pieces of control information.

Resource allocation type 0/1 flag: indicates whether the resource allocation scheme is type 0 or type 1. Type 0 applies a bitmap scheme and allocates resources in units of resource block groups (RBGs). In the LTE system, the basic unit of scheduling is a resource block (RB), expressed by time and frequency domain resources, and an RBG includes multiple RBs and is used as a basic unit of scheduling in the type 0 scheme Resource block assignment: indicates RBs assigned to data transmission. Expressed resources are determined according to the system bandwidth and the resource allocation scheme.

Modulation and coding scheme (MCS): indicates the modulation scheme used for data transmission and the size of the transport block, which is the data to be transmitted.

HARQ process number: indicates the process number of the HARQ.

New data indicator: indicates HARQ initial transmission or retransmission.

Redundancy version: indicates the redundancy version of the HARQ.

Transmit power control (TPC) command for physical uplink control channel (PUCCH): indicates a transmit power control command regarding a PUCCH, which is an uplink control channel.

The DCI undergoes channel coding and modulation processes and is transmitted through a physical downlink control channel (PDCCH), which is a downlink physical control channel, or through an enhanced PDCCH (EPDCCH).

In general, the DCI is channel-coded independently of each terminal, and is then transmitted through each independently configured PDCCH. In the time domain, the PDCCH is mapped and transmitted during the control channel transmission interval. The frequency-domain mapping position of the PDCCH is determined by the identifier (ID) of each terminal, and is distributed across the entire system transmission band.

The downlink data is transmitted through a physical downlink shared channel (PDSCH), which is a physical channel dedicated to downlink data transmission. The PDSCH is transmitted after the control channel transmission interval, and scheduling information such as the specific mapping position in the frequency domain and the modulation scheme indicates the DCI transmitted through the PDCCH.

By using an MCS including five bits among the control information constituting the DCI, the base station notifies the terminal of the modulation scheme applied to the PDSCH to be used for transmission and the size of the data to be transmitted (transport block size (TBS)). The TBS corresponds to the size before channel coding for error correction is applied to the data (transport block (TB)) to be transmitted by the base station.

The modulation scheme supported by the LTE system includes quadrature phase shift keying (QPSK), 16 quadrature amplitude modulation (QAM), and 64QAM, and modulation orders ($Q_m$) thereof correspond to 2, 4, and 6, respectively. That is, in the case of the QPSK modulation, 2 bits can be transmitted per symbol; in the case of the 16QAM modulation, 4 bits can be transmitted per symbol; and in the case of 64QAM modulation, 6 bits can be transmitted per symbol.

Compared with LTE Rel-8, 3GPP LTE Rel-10 has adopted a bandwidth extension technology in order to support a larger amount of data transmission. The technology referred to as "bandwidth extension" or "carrier aggregation (CA)" can increase the amount of data transmission in proportion to the extended bandwidth, compared with an LTE Rel-8 terminal that extends the bandwidth and transmits data in one band. Each of the bands is referred to as a component carrier (CC), and an LTE Rel-8 terminal is required to have one CC for each of downlink and uplink transmissions. In addition, the downlink CC and the uplink CC, which is connected thereto by SIB-2, are collectively referred to as a cell. The SIB-2 connectivity between the downlink CC and the uplink CC is transmitted as a system signal or an upper-level signal. A terminal supporting the CA can receive downlink data and can transmit uplink data through multiple serving cells.

When a base station has difficulty sending a physical downlink control channel (PDCCH) to a specific terminal in a specific cell under Rel-10, the base station may transmit the PDCCH in another serving cell and may configure a carrier indicator field (CIF) as a field informing that the corresponding PDCCH indicates a physical downlink shared channel (PDSCH) or a physical uplink shared channel (PUSCH) of another serving cell. The CIF may be configured for a terminal supporting the CA. The CIF has been determined such that three bits can be added to PDCCH information in a specific serving cell so as to indicate another serving cell, the CIF is included only when cross-carrier scheduling is performed, and the cross-carrier scheduling is not performed when the CIF is not included. When the CIF is included in downlink assignment information (DL assignment), the CIF indicates a serving cell in which a PDSCH scheduled by the DL assignment is to be transmitted; and when the CIF is included in uplink resource assignment information (UL grant), the CIF is defined so as to indicate the serving cell in which a PUSCH scheduled by the UL grant is to be transmitted.

As described above, carrier aggregation (CA) is defined as a bandwidth extension technology in LTE-10 such that multiple serving cells can be configured for a terminal. The terminal transmits channel information regarding the multiple serving cells to the base station periodically or aperiodically for the purpose of data scheduling of the base station. The base station schedules data for each carrier and transmits the same, and the terminal transmits A/N feedback regarding data transmitted with regard to each carrier. LTE Rel-10 is designed such that a maximum of 21 bits of A/N feedback is transmitted, and when A/N feedback transmission and channel information transmission overlap in one subframe, the A/N feedback is transmitted, and the channel information is discarded. LTE Rel-11 is designed such that channel information of one cell is multiplexed together with A/N feedback such that of a maximum of 22 bits of A/N feedback and channel information of one cell are transmitted through PUCCH format 3 by using a transmission resource of PUCCH format 3.

LTE-13 assumes a scenario wherein a maximum of 32 serving cells are configured, and establishes a concept wherein bands not only in a licensed band but also in an unlicensed band are used to extend the number of serving cells to a maximum of 32. In addition, considering the fact that the number of licensed bands is limited, as in the case of the LTE frequencies, providing an LTE service in an unlicensed band such as 5 GHz band has been completed, and is referred to as licensed assisted access (LAA). The LAA applies carrier aggregation technology in the LTE and supports operating an LTE cell, which is a licensed band, as a primary cell (PCell) and operating an LAA cell, which is an unlicensed band, as a secondary cell (SCell). Accordingly, feedback occurring in the LAA cell, which is an SCell, needs to be transmitted only in the PCell as in the case of LTE, and the downlink subframe and the uplink subframe can be freely applied to the LAA cell. Unless otherwise specified in the specification, "LTE" as used herein includes all advanced technologies of LTE, such as LTE-A and LAA.

Meanwhile, the new radio access technology (NR), which is a post-LTE communication system, that is, a $5^{th}$-generation wireless cellular communication system (hereinafter, referred to as 5G) needs to be able to freely accommodate various requirements of the user, the service provider, and the like, and a service satisfying such various requirements can be provided accordingly.

Therefore, 5G may be defined as a technology for satisfying requirements selected for various 5G oriented services, among requirements such as a maximum terminal transmission rate of 20 Gbps, a maximum terminal speed of 500 km/h, a maximum latency of 0.5 ms, and a terminal access density of 1,000,000 terminal/km$^2$, in connection with various 5G oriented services such as enhanced mobile broadband (hereinafter, referred to as eMBB), massive machine-type communication (hereinafter, referred to as mMTC), ultra-reliable and low-latency communications (hereinafter, referred to as URLLC).

For example, in order to provide eMBB in 5G, one base station needs to be able to provide a maximum terminal transmission rate of 20 Gbps in the downlink, and a maximum terminal transmission rate of 10 Gbps in the uplink. At the same time, the average transmission rate that is actually experienced by the terminal needs to be increased. In order to satisfy this requirement, it is necessary to improve the transmission/reception technology, including further improved multiple-input multiple-output transmission technology.

At the same time, mMTC is considered for use in supporting an application service such as Internet of things (IoT) in 5G. In order to efficiently provide IoT, mMTC is required to meet requirements such as support for large-scale terminal access in a cell, terminal coverage improvement, improved battery time, and terminal cost reduction. A large number of terminals (for example, 1,000,000 terminals/km$^2$) needs to be supported in a cell such that the same are attached to various sensors and devices to provide communication functions according to the IoT. In addition, mMTC is required to have a coverage larger than that provided by eMBB because, due to the service characteristics thereof, terminals are likely to be positioned in coverage holes, such as a basement of a building, where cell coverage fails. Since mMTC is likely to be configured by inexpensive terminals, and since it is difficult to frequently replace the batteries of the terminals, a very long battery lifetime is required.

Lastly, in the case of URLLC, it is required to provide cellular-based wireless communication used for a specific purpose, specifically, communication that provides ultra-low latency and ultra-high reliability in connection with services used for remote control of a robot or machinery, industrial automation, unmanned aerial vehicles, remote health control, and emergency notifications. For example, URLLC has the requirement that the maximum latency be shorter than 0.5 ms and that a packet error ratio equal to or less than $10^{-5}$ be provided. Accordingly, URLLC has the design requirement that the same provide a transmit time interval (TTI) smaller than that of a 5G service such as eMBB and that a large resource be allocated in the frequency band.

The services considered in the $5^{th}$-generation wireless cellular communication system described above need to be provided as a single framework. That is, for the purpose of efficient resource management and control, respective services are preferably integrated into a single system, controlled, and transmitted, instead of being operated independently.

Figure 1B:
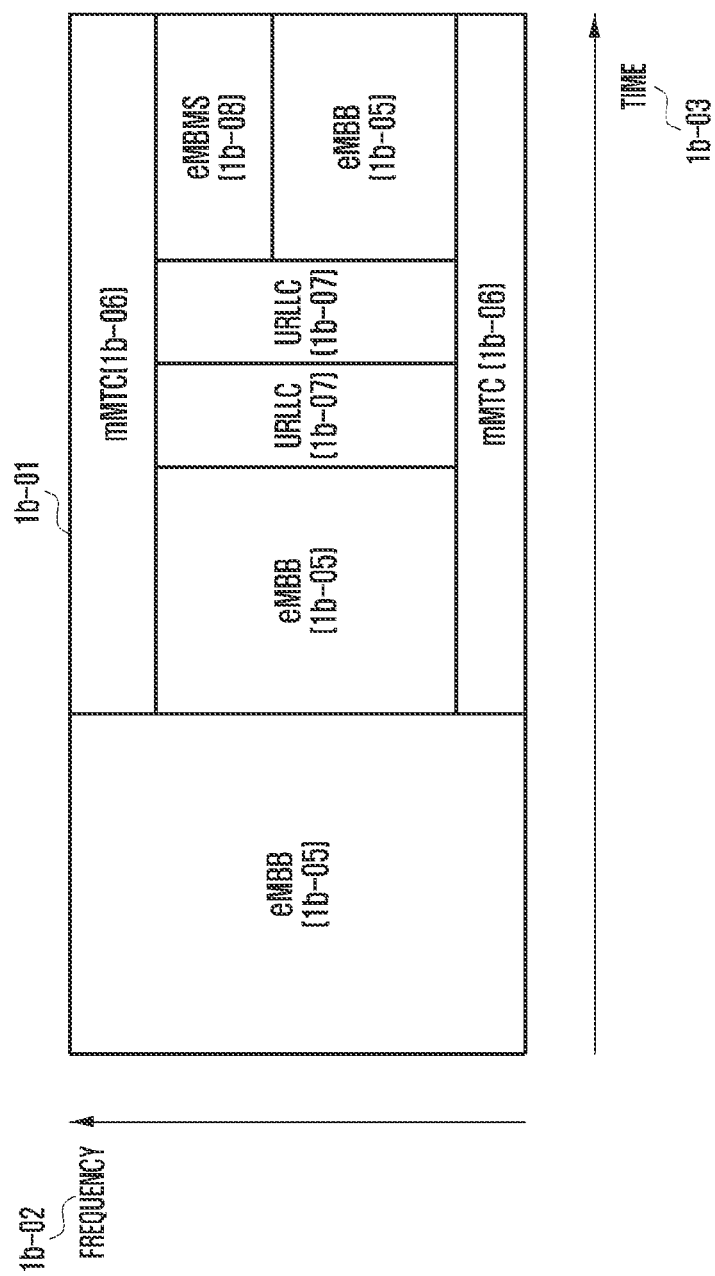
FIG. 1B illustrates an example of multiplexing services considered in 5G into one system and transmitting the same.

FIG. 1B illustrates an example of multiplexing services considered in 5G into one system and transmitting the same.

In FIG. 1B, the frequency-time resource 1b-01 used by 5G may include a frequency axis 1b-02 and a time axis 1b-03. FIG. 1B illustrates an example wherein, inside one framework, 5G operates eMBB 1b-05, 1b-06, and URLLC 1b-07 by means of a 5G base station. It is also possible to consider, as a service that can be additionally considered in 5G, an enhanced mobile broadcast/multicast service (eM-BMS) 1b-08 for providing a cellular-based broadcasting service. Services considered in 5G, such as eMBB 1b-05, mMTC 1b-6, URLLC 1b-07, and eMBMS 1b-08, may be multiplexed and transmitted by means of time-division multiplexing (TDM) or frequency division multiplexing (FDM) inside one system frequency bandwidth operated by 5G, and it is also possible to consider spatial division multiplexing. In the case of eMBB 1b-05, it is preferred to occupy and transmit the maximum frequency bandwidth at a specific arbitrary time in order to provide the above-mentioned increased data transmission rate. Accordingly, the service of eMBB 1b-05 is preferably subjected to TDM with other services and transmitted within the system transmission bandwidth 1b-01, but the same is also preferably subjected to FDM with other services and transmitted within the system transmission bandwidth, as required by other services.

In the case of mMTC 1b-06, an increased transmission interval is required to secure a wide coverage unlike other services, and the coverage can be secured by repeatedly transmitting the same packet inside the transmission interval. At the same time, there is a limit on the transmission bandwidth that a terminal can receive in order to reduce the complexity and price of the terminal. In view of such requirements, the mMTC 1b-06 is preferably subjected to TDM with other services and transmitted within the system transmission bandwidth 1b-01 of 5G.

In order to satisfy the ultra-latency requirement required by services, URLLC 1b-07 preferably has a short transmit time interval (TTI) compared with other services. At the same time, the same preferably has a large bandwidth in terms of frequency because a low coding rate is necessary to satisfy the ultra-latency requirement. In view of such requirements of URLLC 1b-07, URLLC 1b-07 is preferably subjected to TDM with other services within the transmission system bandwidth 1b-01 of 5G.

Respective services described above may have different transmission/reception techniques and transmission/reception parameters in order to satisfy requirements required by respective services. For example, respective services may have different numerologies according to respective service requirements. As used herein, the numerology includes the length of a cyclic prefix (CP), the subcarrier spacing, the length of an OFDM symbol, and the length of a TTI in a communication system based on orthogonal frequency division multiplexing (OFDM) or orthogonal frequency division multiple access (OFDMA). As an example of having different numerologies between services, eMBMS 1b-08 may have a CP length longer than that of other services. Since eMBMS 1b-08 transmits broadcast-based upper-level traffic, the same may transmit the same data in all cells. From the viewpoint of a terminal, if signals received in multiple cells arrive within the CP length, the terminal can receive and decode all of the signals and thus can obtain single frequency network (SFN) diversity gain; accordingly, there is an advantage in that even a terminal positioned at a cell boundary can receive broadcast information with no coverage limit. However, when the CP length is longer than that of other services in connection with providing eMBMS in 5G, the CP overhead generates waste, a longer OFDM symbol length is accordingly required than that of other services, and a narrower subcarrier spacing is also required than that of other services.

As another example of using different numerologies between services in 5G, URLLC may require a smaller TTI than that of other services, a shorter OFDM symbol length may be accordingly required, and a larger subcarrier spacing may also be required.

The necessity of various services for satisfying various requirements in 5G, and requirements regarding representative services that are being considered, have been described above.

Frequencies in which 5G is considered to operate range from several GHz to tens of GHz; in bands with low frequencies (several GHz), frequency division duplex (FDD) is preferred to time division duplex (TDD); and in bands with high frequencies (tens of GHz), TDD is considered more appropriate than FDD. However, unlike FDD that uses a separate frequency for uplink/downlink transmission and seamlessly provides uplink/downlink transmission resources, TDD needs to support both uplink and downlink transmissions by a single frequency and, depending on the time, supports only uplink resources or downlink resources. Assuming that the TDD needs URLLC uplink transmission or downlink transmission, the latency until the time when uplink or downlink resources appear makes it difficult to satisfy the ultra-latency requirement required by URLLC. Accordingly, in the case of TDD, there is a need for a method for dynamically changing a subframe uplink or downlink according to whether data of URLLC is uplink or downlink, in order to satisfy the ultra-latency requirement of URLLC.

Meanwhile, there is such a requirement that, even when services and technologies for 5G phase 2 or beyond-5G are multiplexed later at a 5G operation frequency according to 5G, such services and technologies for 5G phase 2 or beyond-5G need to be provided without any issue of backward compatibility with operation of previous 5G technologies. Such a requirement is referred to as forward compatibility, and technologies for satisfying forward compatibility need to be considered during initial 5G design. Since the forward compatibility has been considered insufficiently in the initial LTE standardization stage, there may be restrictions on providing a new service inside the LTE framework. For example, in the case of enhanced machine-type communication (eMTC) applied to LTE release-13, communication is possible only at a frequency corresponding to 1.4 MGz, regardless of the system bandwidth provided by a serving cell, in order to reduce the terminal price by decreasing the complexity of the terminal. Accordingly, a terminal supporting eMTC cannot receive a physical downlink control channel (PDCCH) that is transmitted through the entire band of the existing system transmission bandwidth, thereby incurring a restriction in that signals cannot be received in a time interval in which the PDCCH is transmitted. Therefore, a 5G communication system needs to be designed such that services considered after the 5G communication system can operate while efficiently coexisting with the 5G system. For the purpose of forward compatibility in a 5G communication system, it is necessary to be able to freely allocate and transmit resources such that services to be considered in the future can be freely transmitted in a time-frequency resource domain supported by the 5G communication system. Accordingly, there is a need for a method for freely allocating time-frequency resources such that forward compatibility can be supported in a 5G communication system.

Hereinafter, preferred embodiments of the disclosure will be described in detail with reference to the accompanying drawings. Here, it is to be noted that identical reference numerals denote the same constituent elements in the accompanying drawings. Further, a detailed description of a known function and configuration which may make the subject matter of the disclosure unclear will be omitted.

Further, although the following detailed description of embodiments of the disclosure will be directed to LTE and 5G systems, it can be understood by those skilled in the art that the main gist of the disclosure may also be applied to any other communication systems having similar technical backgrounds and channel types, with a slight modification, without substantially departing from the scope of the disclosure.

The following description concerns a 5G communication system wherein 5G cells operate in a standalone type, or a 5G communication system wherein 5G cells are combined with other standalone 5G cells through dual connectivity or carrier aggregation and operate in a non-standalone type.

FIG. 1C and FIG. 1D illustrate embodiments of a communication system to which the disclosure is applied. Schemes proposed in the disclosure are all applicable to the system of FIG. 1C and the system of FIG. 1D.

Referring to FIG. 1C, the upper figure of FIG. 1C (FIG. 1CA) illustrates a case wherein a 5G cell 1c-02 operates in a standalone type within a single base station 1c-01 in a network. The terminal 1c-04 is a 5G-capable terminal having a 5G transmission/reception module. The terminal 1c-04 acquires synchronization through a synchronization signal transmitted in the 5G standalone cell 1c-01, receives system information, and then attempts random access to the 5G base station 1c-01. After completing RRC connection with the 5G base station 1c-01, the terminal 1c-04 transmits/receives data through the 5G cell 1c-02. In this case, there is no limit on the duplex type of the 5G cell 1c-02. In the system of the upper figure of FIG. 1C the 5G cell may have multiple serving cells.

Next, the lower figure of FIG. 1C (FIG. 1CB) illustrates a case wherein a 5G standalone base station 1c-11 and a 5G non-standalone base station 1c-12 for increasing the amount of data transmission are installed. The terminal 1c-14 is a 5G-capable terminal having a 5G transmission/reception module for performing 5G communication in multiple base stations. The terminal 1c-14 acquires synchronization through a synchronization signal transmitted in the 5G standalone cell 1c-11, receives system information, and then attempts random access to the 5G standalone base station 1c-11. After completing RRC connection with the 5G standalone base station 1c-11, the terminal 1c-14 additionally configures a 5G non-standalone cell 1c-15 and transmits/receives data through the 5G standalone base station 1c-11 or the 5G non-standalone base station 1c-12. In this case, there is no limit on the duplex type of the 5G standalone base station 1c-11 or the 5G non-standalone base station 1c-12, and it is assumed that the 5G standalone base station 1c-11 and the 5G non-standalone base station 1c-12 are connected by an ideal backhaul network or an unideal backhaul network. Accordingly, fast inter-base station X2 communication 1c-13 is possible when an ideal backhaul network 1c-13 is provided. In the system shown in the lower figure of FIG. 1C, the 5G cell may have multiple serving cells.

Next, referring to FIG. 1D, the upper figure of FIG. 1D (FIG. 1DA) illustrates a case wherein an LTE cell 1d-02 and a 5G cell 1d-03 coexist inside a single base station 1d-01 in a network. The terminal 1d-04 may be an LTE-capable terminal having an LTE transmission/reception module, a 5G-capable terminal having a 5G transmission/reception module, and a terminal having both an LTE transmission/reception module and a 5G transmission/reception module. The terminal 1d-04 acquires synchronization through a synchronization signal transmitted in the LTE cell 1d-02 or the 5G cell 1d-03, receives system information, and then transmits/receives data with the base station 1d-01 through the LTE cell 1d-02 or the 5G cell 1d-03. In this case, there is no limit on the duplex type of the LTE cell 1d-02 or the 5G cell 1d-03. Uplink control transmission is transmitted through the LTE cell 1d-02 when the LTE cell is the PCell, and through the 5G cell 1d-03 when the 5G cell is the PCell. In the system of the upper figure of FIG. 1D, the LTE cell and the 5G cell may have multiple serving cells and may support a total of 32 serving cells. It is assumed that the base station 1d-01 in the network has both an LTE transmission/reception module (system) and a 5G transmission/reception module (system), and the base station 1d-01 can control and operate the LTE system and the 5G system in real time. For example, when time resources are divided such that the LTE system and the 5G system operate at different times, allocation of time resources to the LTE system and to the 5G system can be selected dynamically. By receiving a signal that indicates allocation of resources (for example, time resources, frequency resources, antenna resources, or space resources) that are separately operated by the LTE cell and the 5G cell from the LTE cell 1d-02 or the 5G cell 1d-03, the terminal 1d-04 can be aware of which resources are used to receive data from the LTE cell 1d-02 and the 5G cell 1d-03.

The lower figure of FIG. 1D (FIG. 1DB) illustrates a case wherein an LTE macro base station 1d-11 for a wide coverage and a 5G small base station 1d-12 for increasing the amount of data transmission are installed in a network. The terminal 1d-14 may be an LTE-capable terminal having an LTE transmission/reception module, a 5G-capable module having a 5G transmission/reception module, and a terminal having both an LTE transmission/reception module and a 5G transmission/reception module. The terminal 1d-14 acquires synchronization through a synchronization signal transmitted from the LTE base station 1d-11 or the 5G base station 1d-12, receives system information, and then transmits/receives data through the LTE base station 1d-11 and the 5G base station 1d-12. In this case, there is no limit on the duplex type of the LTE macro base station 1d-11 or the 5G small base station 1d-12. Uplink control transmission is transmitted through the LTE cell 1d-11 when the LTE cell is the PCell, and through the 5G cell 1d-12 when the 5G cell is the PCell. It is assumed that the LTE base station 1d-11 and the 5G base station 1d-12 have an ideal backhaul network or an unideal backhaul network. Accordingly, when an ideal backhaul network 1d-13 is provided, fast inter-base station X2 communication 1d-13 is possible such that, even if the uplink transmission is transmitted only to the LTE base station 1d-11, the 5G base station 1d-12 can receive related control information from the LTE base station 1d-11 through the X2 communication 1d-13 in real time. In the system of the lower figure of FIG. 1D, the LTE cell and the 5G cell may have multiple serving cells and may support a total of 32 serving cells. The base station 1d-11 or 1d-12 can control and operate the LTE system and the 5G system in real time. For example, when the base station 1d-11 divides time resources and operates the LTE system and the 5G system at different times, it is possible to dynamically select allocation of time resources to the LTE system and to the 5G system and to transmit the corresponding signal to the other base station 1d-12 through X2. By receiving a signal that indicates allocation of resources (for example, time resources, frequency resources, antenna resources, or space resources) that are separately operated by the LTE cell and the 5G cell from the LTE base station 1d-11 or the 5G base station 1d-12, the terminal 1d-14 can be aware of which resources are used to transmit/receive data from the LTE cell 1d-11 and the 5G cell 1d-12.

Meanwhile, when the LTE base station 1d-11 and the 5G base station 1d-12 have an unideal backhaul network 1d-13, fast inter-base station X2 communication 1d-13 is impossible. Accordingly, the base station 1d-11 or 1d-12 can operate the LTE system and the 5G system semi-statically. For example, when the base station 1d-11 divides time resources and operate the LTE system and the 5G system at different times, resources for the LTE system and the 5G system can be divided by selecting allocation of time resources to the LTE system and the 5G system and transmitting the corresponding signal to the other base station 1d-12 through X2 in advance. By receiving a signal that indicates allocation of resources (for example, time resources, frequency resources, antenna resources, or space resources) that are separately operated by the LTE cell and the 5G cell from the LTE station 1d-11 or the 5G base station 1d-12, the terminal 1d-14 can be aware of which resources are used to transmit/receive data from the LTE cell 1d-11 and the 5G cell 1d-12.

Terms such as "physical channels" and "signals" in a conventional LTE or LTE-A system may be used to describe methods and devices proposed in embodiments. However, the content of the disclosure is applicable in a wireless communication system, not LTE and LTE-A systems.

In addition, the technology proposed in the disclosure is applicable not only in FDD and TDD systems, but also in a new type of duplex mode (for example, LTE frame structure type 3).

As used in the disclosure, "upper-level signaling" or "upper-level signal" refers to a signal transfer method wherein a base station transfers a signal to a terminal by using a downlink data channel of a physical layer, or the terminal transfers a signal to the base station by using an uplink data channel of the physical layer, and denotes transfer of signals between the base station and the terminal through at least one method of RRC signaling, PDCP signaling, or MAC control element (MAC CE).

Embodiment 1-1

A network or a base station (hereinafter, referred to as a base station) may transmit at least one piece of control information among scheduling information regarding downlink data transmission and scheduling information regarding uplink data transmission to a terminal through a downlink control channel with regard to each subframe, slot, minislot, or TTI (hereinafter, referred to as a slot). That is, the terminal may monitor whether or not there is scheduling information regarding downlink data transmission or scheduling information regarding uplink data transmission, which is transmitted to the terminal through a downlink control channel with regard to each subframe or each slot; and when the terminal succeeds in receiving downlink scheduling information or uplink scheduling configuration information transmitted to the terminal through the downlink control channel, the terminal may receive downlink data according to the received scheduling configuration information or may transmit an uplink signal of at least one of uplink data or uplink control information to the base station.

More specifically, the terminal may monitor up/downlink scheduling information transmitted through a downlink control channel in the entire frequency band or in downlink control channel monitoring time and frequency domains (hereinafter, referred to as downlink control channel monitoring domains), which are defined in advance, or which are configured through a signaling/channel of at least one of a group-common control channel or a UE-specific control channel transmitted from the base station through an upper-level signal, PBCH, SIB, or downlink control channel, with regard to each subframe, each slot, each mini-slot, or each TTI (hereinafter, referred to as a slot). For example, the downlink control channel monitoring frequency domain may be configured through an upper-level signal, and the downlink control channel monitoring time domain may be configured by a configuration value of a specific field of the group-common control channel or the UE-specific control channel; for example, the downlink control channel monitoring time domain may be configured by a control field indicator (CFI) value. The downlink control channel monitoring time domain may change for each slot.

The base station may configure up/downlink scheduling information transmitted by the terminal through the downlink control channel such that the monitoring cycle, interval, or timepoint (hereinafter, referred to as a timepoint) is longer than each slot, thereby minimizing power consumed by the terminal to monitor the up/downlink scheduling information transmitted through the downlink control channel. The monitoring timepoint regarding the up/downlink scheduling information transmitted through the downlink control channel may be configured for the terminal by the base station through at least one of the group-common control channel or the UE-specific control channel, which is transmitted through an upper-level signal or downlink control channel. When the base station has configured, for the terminal, the monitoring timepoint regarding the up/downlink scheduling information transmitted through the upper-level signal through the downlink control channel, the terminal may perform monitoring regarding the up/downlink scheduling information transmitted through the downlink control channel in each slot immediately before the configuration through the upper-level signal (RRC configuration or RRC reconfiguration) is completed, or immediately before the terminal transmits an upper-level signal configuration completion message or ACK/NACK information to the base station.

Figure 1E:
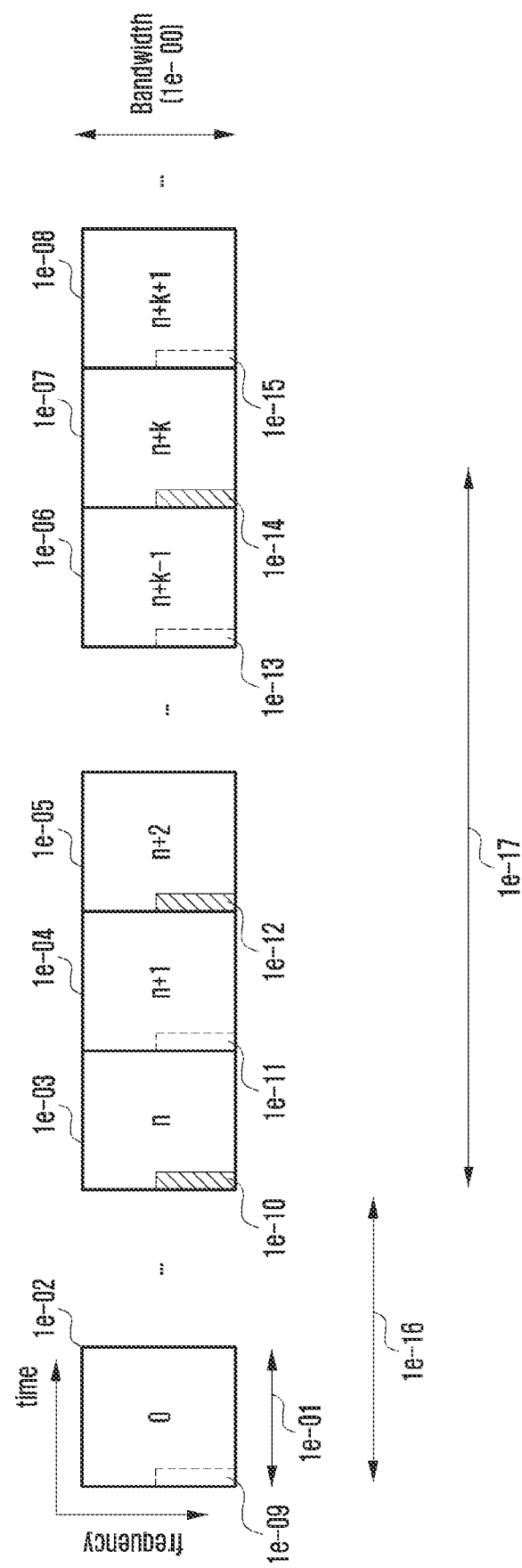
FIG. 1E illustrates a situation to be resolved by the disclosure.
Figure 1F:
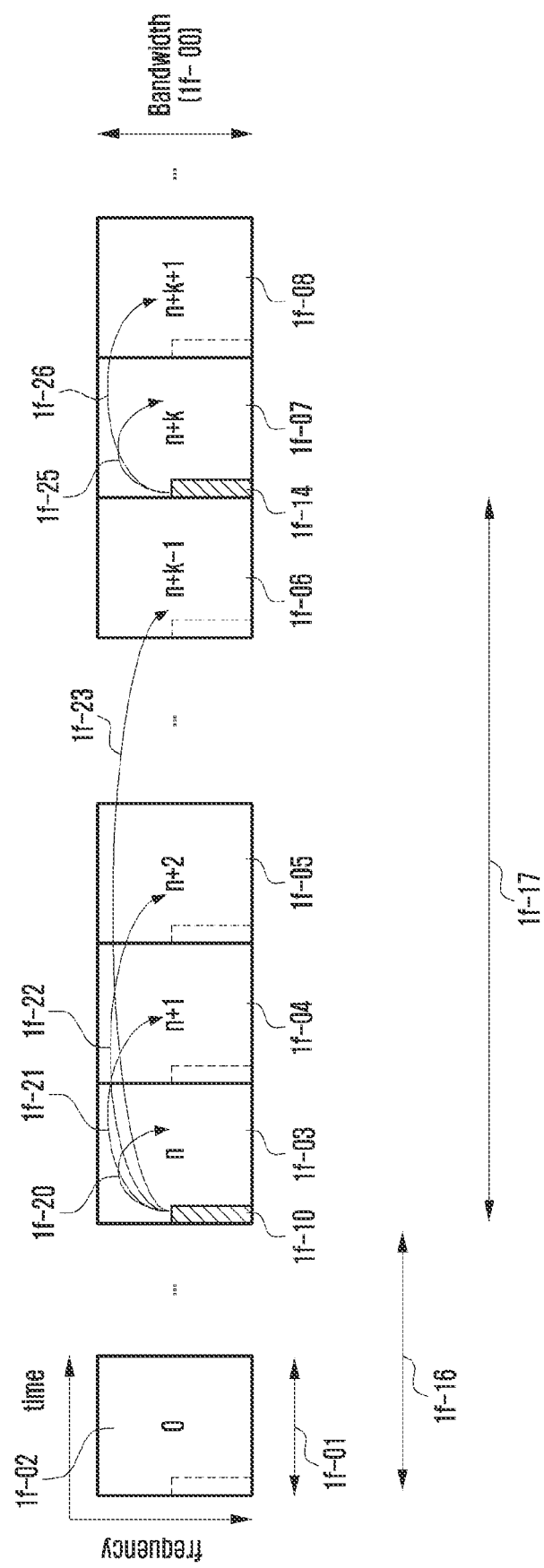
FIG. 1F illustrates a scheduling method according to an embodiment of the disclosure.

A more detailed description will now be made with reference to FIG. 1E. FIG. 1E illustrates a situation to be resolved by the disclosure. Although an embodiment of the disclosure, including FIG. 1E, will be described with reference to a slot 1e-01, the slot 1e-01 may be a subframe or a TTI.

The base station may configure the timepoint at which the terminal monitors up/downlink scheduling information transmitted through downlink control channels such that the terminal monitors up/downlink scheduling information transmitted through the downlink control channels 1e-09, 1e-10, 1e-12, 1e-13, 1e-14, and 1e-15 in all slots 1e-02, 1e-03, 1e-04, 1e-05, 1e-06, 1e-07, and 1e-08 in which downlink transmission is performed. Alternatively, the base station may configure the timepoint at which the terminal monitors up/downlink scheduling information transmitted through a downlink control channel such that, by transmitting at least one value of a cycle ($T_{PDCCH}$) value 1e-17 and an offset ($\Delta_{PDCCH}$) value 1e-16 from a specific reference slot to the terminal through an upper-level signal, an SIB, or a group-common control channel, the up/downlink scheduling information transmitted through the downlink control channels 1e-10 and 1e-14 is monitored only in specific slots 1*e*-03 and 1*e*-07; alternatively, the base station may transmit a bit string based on the length of one frame or more than one frames to the terminal through an upper-level signal so as to configure timepoints 1*e*-03, 1*e*-05, and 1*e*-07 for monitoring the up/downlink scheduling information transmitted through the downlink control channel within the length of the one frame or more than one frames. The terminal may configure the timepoint, at which the up/downlink scheduling information transmitted through the downlink control channel configured by the bit string is monitored, repeatedly or periodically with reference to the length of one frame or more than one frames.

When the base station configures the timepoint, at which the up/downlink scheduling information transmitted to the terminal through the downlink control channel is monitored, by using the cycle or bit string, the configured monitoring timepoint may be applied only to up/downlink scheduling information transmitted through the UE-specific control channel, and may not be applied to up/downlink scheduling information transmitted through the group-common control channel. The terminal monitors the up/downlink scheduling information transmitted from the base station through the group-common control channel with regard to each slot. It is also possible to differently configure the timepoint at which the up/downlink scheduling information transmitted through the UE-specific control channel is monitored and the timepoint at which the up/downlink scheduling information transmitted through the group-common control channel is monitored. In other words, it is possible to differently configure, through a separate field, the bit string value or at least one value of the cycle value and the offset value regarding the timepoint at which the up/downlink scheduling information transmitted through the UE-specific control channel is monitored, and the bit string value or at least one value of the cycle value and the offset value regarding the timepoint at which the up/downlink scheduling information transmitted through the group-common control channel is monitored.

Assuming that, as in the method proposed by the above embodiment, the base station transfers the timepoint at which up/downlink scheduling information transmitted through a downlink control channel to the terminal through an upper-level signal, SIB, or group-common control channel by at least one method using at least one of the cycle ($T_{PDCCH}$) value 1*e*-17 and the offset ($\Delta_{PDCCH}$) value 1*e*-16 from a specific reference slot, a bit string, or a set of slot indexes {1*f*-03, 1*f*-07} for monitoring the up/downlink scheduling information such that the up/downlink scheduling information transmitted through the downlink control channels 1*f*-10 and 1*f*-14 is monitored only in specific slots 1*f*-03 and 1*f*-07, the terminal then does not receive the scheduling information in the slots 1*f*-02, 1*f*-04, 1*f*-05, 1*f*-06, and 1*f*-08 in which the scheduling information is not monitored, and the base station may accordingly fail to configure or schedule uplink data transmission or downlink data reception for the terminal in the slots 1*f*-02, 1*f*-04, 1*f*-05, 1*f*-06, and 1*f*-08 in which the scheduling information is not monitored. Accordingly, when the base station configures at least one slot as the timepoint at which up/downlink scheduling information transmitted through the downlink control channel is monitored as mentioned above, not only the up/downlink scheduling information 1*f*-20 at the timepoint 1*f*-03 at which the up/downlink scheduling information is monitored, but also the up/downlink scheduling information 1*f*-21, 1*f*-22, and 1*f*-23 in the slots 1*f*-02, 1*f*-04, 1*f*-05, 1*f*-06, and 1*f*-08 in which the scheduling information is not monitored need to be additionally transferred at the timepoints 1*f*-03 and 1*f*-07 configured for the terminal to monitor the up/downlink scheduling information. Accordingly, when the base station configures at least one slot as the timepoint at which up/downlink scheduling information transmitted through the downlink control channel is monitored as mentioned above, the up/downlink scheduling information needs to include information regarding the time for the terminal to perform uplink data transmission or downlink data reception operations, for example, information regarding a slot index used to perform uplink data transmission or downlink data reception.

In other words, when the base station has configured, for the terminal, at east one slot as the timepoint at which up/downlink scheduling information transmitted through the downlink control channel is monitored as described above, the size of up/downlink scheduling information that the terminal needs to receive or the bit number of the up/downlink scheduling information is larger than the size of up/downlink scheduling information that the terminal needs to receive or the bit number of the up/downlink scheduling information when the base station has not additionally configured the timepoint at which up/downlink scheduling information transmitted through the downlink control channel is monitored, at least by the size of slot index information included to transfer up/downlink scheduling information 1*f*-21, 1*f*-22, and 1*f*-23 in the slots 1*f*-02, 1*f*-04, 1*f*-05, 1*f*-06, and 1*f*-08 in which the scheduling information is not monitored, the size of scheduling time information, or the bit number of the up/downlink scheduling information. Accordingly, when the base station has configured, for the terminal, at least one slot as the timepoint at which up/downlink scheduling information transmitted through the downlink control channel is monitored as described above, the base station needs to monitor the up/downlink scheduling information assuming that the same is larger than the size of up/downlink scheduling information that the terminal needs to receive or the bit number of the up/downlink scheduling information when the base station has not additionally configured the timepoint at which up/downlink scheduling information transmitted through the downlink control channel is monitored, at least by the size of slot index information, the size of scheduling time information, or the bit number of the up/downlink scheduling information. As used in the disclosure and embodiments, the size of slot index information or scheduling time information refers to the number of bits necessary to configure the slot index information or the up/downlink scheduling time information.

The terminal may add the size of slot index information or scheduling time information or the bit number of up/downlink scheduling information to information regarding configuration of the timepoint at which up/downlink scheduling information transmitted from the base station to the terminal through the downlink control channel is monitored. In other words, the base station may additionally inform of the bit string size N of slot index information or scheduling time information through configuration information transmitted by the base station to configure the up/downlink scheduling information monitoring timepoint, such as at least one value of the cycle ($T_{PDCCH}$) value 1*e*-17 and the offset ($\Delta_{PDCCH}$) value 1*f*-16 from a specific reference slot, a bit string, or information regarding a set of slot indexes {1*f*-07} for monitoring the up/downlink scheduling information. If the size of slot index information or scheduling time information or the bit number of up/downlink scheduling time information is additionally transferred to the information regarding configuration of the timepoint at which up/downlink scheduling information transmitted is monitored as described above, the terminal, after receiving the configuration information, monitors the up/downlink scheduling information, which is increased by the size of slot index information or scheduling time information or the bit number of up/downlink scheduling time information included in the configuration, at the configured monitoring timepoint.

As another method, the terminal may transmit the size of slot index information or scheduling time information or the bit number of up/downlink scheduling information through a group-common downlink control channel that the base station transmits to the terminal. If the size of slot index information or scheduling time information or the bit number of up/downlink scheduling information is transmitted through a group-common downlink control channel, the terminal, after receiving the configuration information, monitors the up/downlink scheduling information, which is increased by the size of slot index information or scheduling time information or the bit number of up/downlink scheduling information included in the configuration, at the configured monitoring timepoint.

As another method, without transmitting the size of slot index information or scheduling time information or the bit number thereof through additional information, the terminal may be configured to determine the size of slot index information or scheduling time information or the bit number thereof. If the base station transmits the up/downlink scheduling information monitoring timepoint to the terminal through at least one value of the cycle ($T_{PDCCH}$) value 1f-17 and the offset ($\Delta_{PDCCH}$) value 1f-16 from a specific reference slot, the configured cycle ($T_{PDCCH}$) value 1f-17 may be used such that the terminal determines the size of slot index information or scheduling time information or the bit number thereof without transmitting the size of slot index information or scheduling time information or the bit number thereof through additional information. In other words, the terminal may determine the size of slot index information or scheduling time information or the bit number thereof with reference to the cycle ($T_{PDCCH}$) as the up/downlink scheduling information monitoring timepoint configured by the base station. For example, when the configured cycle ($T_{PDCCH}$) value 1f-17 is configured as one of values expressed by exponent products of 2, the terminal may determine that the size of slot index information or scheduling time information is the cycle ($T_{PDCCH}$) value 1f-17 or $\log_2$ (cycle ($T_{PDCCH}$) value 1f-17), without transmitting the size of slot index information or scheduling time information or the bit number thereof through additional information. If the configured cycle ($T_{PDCCH}$) value 1f-17 is configured as one of normal integer values, not a value expressed by an exponent product of 2, the terminal may determine the size of slot index information or scheduling time information or the bit number thereof by rounding up the $\log_2$ (cycle ($T_{PDCCH}$) value 1f-17) value (or ceiling or $\lceil \log_2$ (cycle ($T_{PDCCH}$) value 1f-17)$\rceil$) without transmitting the size of slot index information or scheduling time information or the bit number thereof through additional information. It is also possible to make a definition such that the terminal determines the size of slot index information or scheduling time information or the bit number thereof by rounding down the $\log_2$ (cycle ($T_{PDCCH}$) value 1f-17) value with regard to the received cycle value (or $\lfloor \log_2$ (cycle ($T_{PDCCH}$) value 1f-17)$\rfloor$) or by rounding off the same.

Figure 1G:
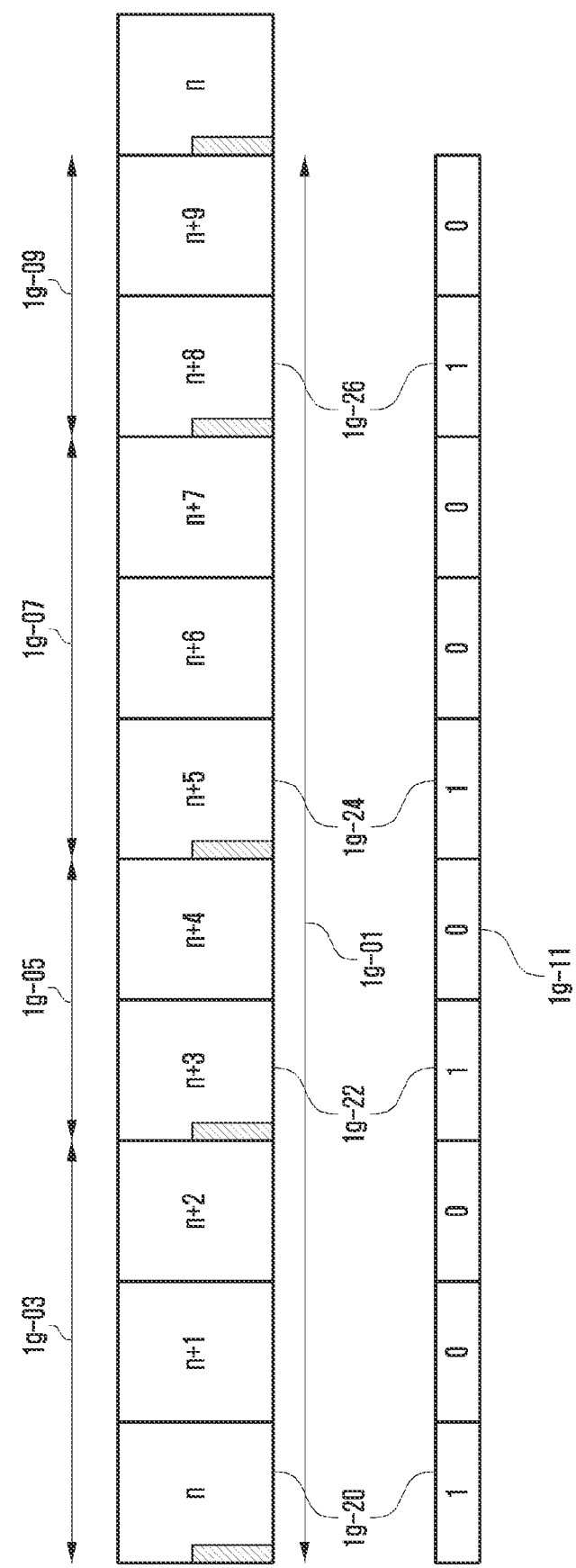
FIG. 1G illustrates a scheduling method according to an embodiment of the disclosure.

As another method, the terminal may transmit the size of slot index information or scheduling time information without transmitting the size of slot index information or scheduling time information through additional information. A more detailed description will be made with reference to FIG. 1G. Although it will be assumed in the description with reference to FIG. 1G that the base station configures the up/downlink scheduling information monitoring timepoint through a bit string for the terminal, the same is applicable not only to a case of using a bit string, but also to a case of informing of a set of slot indexes {1g-20, 1g-22, 1g-24, 1g-26} for monitoring the up/downlink scheduling information. If the base station transmits the up/downlink scheduling information monitoring timepoint to the terminal through a bit string 1g-11 with reference to a specific length 1g-01 (for example, the length of one frame or more than one frames), the size of slot index information or scheduling time information may be determined with reference to the largest distance 1g-03 among the distances between slots 1g-20, 1g-22, 1g-24, and 1g-26 or bit strings configured to monitor the up/downlink scheduling information such that the terminal can determine the size of slot index information or scheduling time information without transmitting additional information regarding the size of slot index information or scheduling time information by the base station. In other words, the terminal may determine the size of slot index information or scheduling time information with reference to the largest distance ($D_{PDCCH}$ 1g-03) among the distances between slots and 1g-20, 1g-22, 1g-24, and 1g-26 or bit strings configured to monitor the up/downlink scheduling information, and the terminal may perform up/downlink scheduling information, the determined size of slot index information or scheduling time information being added to the size thereof, at the configured monitoring timepoint. The terminal may determine the size of slot index information or scheduling time information by rounding up the $\log_2$ (distance ($D_{PDCCH}$) value 1f-03) value (or ceiling or $\lceil \log_2$ (distance ($D_{PDCCH}$) value$\rceil$). It is also possible to make a definition such that the terminal determines the size of slot index information or scheduling time information by rounding down the $\log_2$ (distance ($D_{PDCCH}$) value) value with regard to the received cycle value (or $\lceil \log_2$ (distance ($D_{PDCCH}$) value)$\rceil$) or by rounding off the same.

The terminal may determine the size of slot index information or scheduling time information with reference to the smallest distance ($D_{PDCCH}$ 1g-05) among the distances between slots 1g-20, 1g-22, 1g-24, and 1g-26 or bit strings configured to monitor the up/downlink scheduling information, and the terminal may perform up/downlink scheduling information, the determined size of slot index information or scheduling time information being added to the size thereof, at the configured monitoring timepoint. The terminal may determine the size of slot index information or scheduling time information by rounding up the $\log_2$ (distance ($D_{PDCCH}$) value 1f-03) value (or ceiling or $\lceil \log_2$ (distance ($D_{PDCCH}$) value$\rceil$). It is also possible to make a definition such that the terminal determines the size of slot index information or scheduling time information by rounding down the $\log_2$ (distance $D_{PDCCH}$) value) value with regard to the received cycle value (or $\lfloor \log_2$ (distance ($D_{PDCCH}$) value)$\rfloor$) or by rounding off the same.

The terminal may determine the size of slot index information or scheduling time information with reference to respective distances between slots 1g-20, 1g-22, 1g-24, and 1g-26 or bit strings configured to monitor the up/downlink scheduling information, and the terminal may perform up/downlink scheduling information, the determined size of slot index information or scheduling time information being added to the size thereof, at the configured monitoring timepoint. That is, the terminal may determine the size of slot index information or scheduling time information with reference to the distance ($D_{PDCCH}$) value 1g-05) between slots 1g-22 and 1g-24 or bit strings configured to monitor the up/downlink scheduling information, and the terminal may perform up/downlink scheduling information, the determined size of slot index information or scheduling time information being added to the size thereof, at the configured monitoring timepoint 1g-22. In slot 1g-24, the terminal may determine the size of slot index information or scheduling time information with reference to the distance value 1g-07 between slots 1g-24 and 1g-26 or bit strings configured to monitor the up/downlink scheduling information, and the terminal may perform up/downlink scheduling information, the determined size of slot index information or scheduling time information being added to the size thereof, at the configured monitoring timepoint 1g-24. The terminal may determine the size of slot index information or scheduling time information by rounding up the $\log_2$ (distance ($D_{PDCCH}$) value 1f-03) value (or ceiling or $\lceil \log_2$ (distance ($D_{PDCCH}$) value$\rceil$). It is also possible to make a definition such that the terminal determines the size of slot index information or scheduling time information by rounding down the $\log_2$ (distance ($D_{PDCCH}$) value) value with regard to the received cycle value (or $\lfloor \log_2$ (distance ($D_{PDCCH}$) value)$\rfloor$) or by rounding off the same.

The terminal may determine the determined value of slot index information or scheduling time information by expressing successive scheduling time information in a slot or TTI unit in a slot or TTI for monitoring up/downlink scheduling information. For example, when the up/downlink scheduling time information includes two bits, the terminal may determine that 00 of the two bits indicates a slot (for example, slot ii) for monitoring the up/downlink scheduling information, 01 indicates a slot (slot n+1) next to the slot for monitoring the up/downlink scheduling information, 10 indicates a slot (slot n+2) two slots away from the slot for monitoring the up/downlink scheduling information, and 11 indicates a slot (n+3) three slots away from the slot for monitoring the up/downlink scheduling information. The base station may configure actual up/downlink scheduling time information indicated by the determined slot index information or scheduling time information through an upper-level signal for the terminal; alternatively, the base station may configure actual up/downlink scheduling time information indicated by the determined slot index information or scheduling time information through offset information based on the slot for monitoring the up/downlink scheduling information. For example, when the up/downlink scheduling time information includes two bits, the base station may determine, for the terminal, that 00 of the two bits indicates a slot (for example, slot n) for monitoring the up/downlink scheduling information, 01 indicates a slot (slot n+2) second next to the slot for monitoring the up/downlink scheduling information, 10 indicates a slot (slot n+3) three slots away from to the slot for monitoring the up/downlink scheduling information, and 11 indicates a slot (n+5) five slots away from the slot for monitoring the up/downlink scheduling information. The actual up/downlink scheduling time information configured by the base station is only an example, and is not limiting in any manner. The base station may fix and use, without any configuration, at least one piece of information of the actual up/downlink scheduling time information indicated by the slot index information or scheduling time information. For example, when the up/downlink scheduling time information includes two bits, the base station and the terminal may assume that 00 of the two bits always indicates a slot (for example, slot n) for monitoring the up/downlink scheduling information such that the actual up/downlink scheduling time information indicated by slot index information or scheduling time information transmitted through the upper-level signal, or the actual up/downlink scheduling time information indicated by slot index information or scheduling time information is transmitted after excluding one piece of information of the offset information based on the slot for monitoring the up/downlink scheduling information, thereby minimizing transmission of unnecessary information.

Embodiment 1-2

Compared with the method proposed by Embodiment 1-1 wherein one piece of up/downlink scheduling information can be configured to receive an uplink control signal regarding one or more slots (N slots) or TTIs data transmission, a downlink control signal, or a data signal, Embodiment 1-2 is directed to a method for transmitting the up/downlink scheduling time information proposed by Embodiment 1-1 and the number (N) of slots scheduled by the up/downlink scheduling information more efficiently.

If the base station transmits the up/downlink scheduling information monitoring timepoint to the terminal by a method using at least one of the cycle ($T_{PDCCH}$) value and the offset ($\Delta_{PDCCH}$) value from a specific reference slot, a bit string, or a set of slot indexes for monitoring the up/downlink scheduling information, the terminal may determine the size of slot index information or scheduling time information or the bit number thereof by using at least one of the methods proposed in Embodiment 1-1, and the terminal may monitor the determined size of slot index information or scheduling time information, or the up/downlink scheduling information, which is increased by the bit number of the up/downlink scheduling time information, at the configured monitoring timepoint. If the terminal can be configured such that one piece of up/downlink scheduling information can receive an uplink control signal regarding one or more slots (N slots, $N_{slot}$) or TTIs, data transmission, a downlink control signal, or a data signal from the base station, the terminal may monitor, at the configured monitoring timepoint, the up/downlink scheduling information, the size or bit number of which is increased by the bit number (for example, $\lceil \log_2 (N_{slot})$ value$\rceil$) necessary to indicate additionally scheduled slot number information added to the determined size of slot index information or scheduling time information or to the bit number of up/downlink scheduling time information.

An increase in the bit number of the up/downlink scheduling information may be minimized by considering both the size of slot index information or scheduling time information or the bit number of up/downlink scheduling time information and the bit number necessary to indicate scheduled slot number information.

Figure 1H:
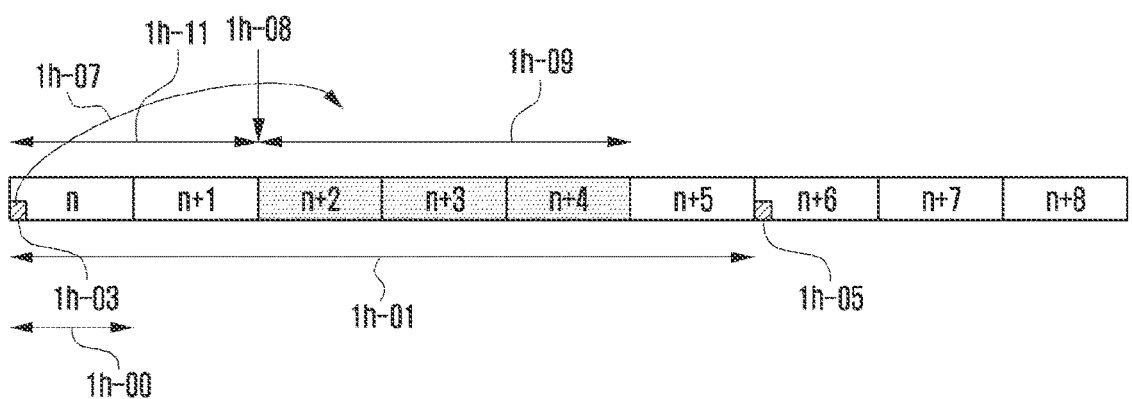
FIG. 1H illustrates the case in which scheduling information is configured to receive a signal regarding one or more slots or TTIs according to an embodiment of the disclosure.

FIG. 1H will be referred to in the following description. If the base station has configured the terminal to monitor the up/downlink scheduling information in one or more slots or TTIs (n and n+6), or the up/downlink scheduling information monitoring timepoint is larger than the minimum scheduling unit of the terminal or the minimum transmission unit thereof, and if one piece of up/downlink scheduling information can be configured to receive an uplink control signal regarding one or more slots (N slots, $N_{slot}$) or TTIs, data transmission, a downlink control signal, or a data signal, then the increase in the bit number of the up/downlink scheduling information may be minimized by considering both the size of slot index information or scheduling time information or the bit number of up/downlink scheduling time information and the bit number necessary to indicate scheduled slot number information. The maximum value of $N_{slot}$ may be configured to be equal to or smaller than the number of slots or TTIs that can be included in the up/downlink scheduling information monitoring timepoint period ($T_{PDCCH}$) that is configured by the base station or defined in advance, or configured to be equal to or smaller than the number of slots or TTIs that can be included in the distance ($D_{PDCCH}$) between up/downlink scheduling information monitoring timepoints. In addition, the one or more scheduled slots may not exceed up/downlink scheduling information monitoring timepoints or slots. In other words, the $N_{slot}$ value may be transmitted from the base station while being additionally included in configuration information configured such that one piece of up/downlink scheduling information receives an uplink control signal regarding one or more slots or TTIs, data transmission, a downlink control signal, or a data signal; alternatively, the $N_{slot}$ value may be determined without adding configuration information on the basis of the number of slots that can be included in the up/downlink scheduling information monitoring timepoint cycle ($T_{PDCCH}$) included in configuration information for configuring the timepoint at which up/downlink scheduling information is monitored, or the number of slots that can be included in the distance ($D_{PDCCH}$) between up/downlink scheduling information monitoring timepoints. FIG. 1H illustrates a case wherein the maximum number of $N_{slot}$ ($N_{slot}^{max}$) is equal to the number of slots that can be included in the configured or defined up/downlink scheduling information monitoring timepoint cycle ($T_{PDCCH}$) 1h-01. In FIG. 1H, there are a total of 21 cases wherein the base station can perform up/downlink scheduling to the terminal within the up/downlink scheduling information monitoring timepoint cycle, and five bits are necessary to select one from the 21 cases. Accordingly, if the up/downlink scheduling time information and the scheduled slot number information are considered together as proposed by the disclosure, the increase in the number of bits added to the up/downlink scheduling information can be minimized compared with the case of separately considering the up/downlink scheduling time information and the scheduled slot number information.

As in FIG. 1H, the terminal's uplink control signal or data transmission time and the number of transmission slots, or the downlink control signal or data signal reception time and the number of reception slots may be determined on the basis of the following equation by using up/downlink scheduling time information (a slot or TTI for starting transmission of an uplink control signal or data, or a slot or TTI for receiving a downlink control signal or data signal, $T_{start}$, 1h-08) and the number of scheduled slots ($N_{slot}$) 1h-09 or the length thereof, and by using the RIV value calculated by Equation 1 below:

$$\text{If } (N_{slot} - 1) \le \left\lfloor \frac{T_{PDCCH}}{2} \right\rfloor, \quad \text{[Equation 1]}$$
$$RIV = T_{PDCCH}(N_{slot} - 1) + T_{start}$$
$$\text{Else,}$$
$$RIV = T_{PDCCH}(N_{slot} - T_{start} - 1) + T_{PDCCH} - 1 - T_{start}$$

If the terminal can start transmitting an uplink control signal or data or can receive a downlink control signal or data signal after a specific time $T_{min}$ 1h-11 from the timepoint at which up/downlink scheduling information is received, the up/downlink scheduling time information and scheduled slot number information may be determined in view of the time 1h-11. The time 1h-11 may be defined by the capability of the terminal, and the base station, after receiving the capability regarding the time 1h-11 of the terminal, may configure the terminal's up/downlink scheduling time in view of the time 1h-11. If the time 1h-11 is considered, $N_{slot}^{max} = N_{slot}^{max} - T_{min}$ and Equation 1 above may be changed to Equation 2 below:

$$\text{If } (N_{slot} - 1) \le \left\lfloor \frac{T_{PDCCH} - T_{min}}{2} \right\rfloor, \quad \text{[Equation 2]}$$
$$RIV = (T_{PDCCH} - T_{min})(N_{slot} - 1) + T_{start}$$
$$\text{Else,}$$
$$RIV = (T_{PDCCH} - T_{min})(N_{slot} - T_{start} - 1) +$$
$$(T_{PDCCH} - T_{min}) - 1 - T_{start}$$

The terminal may determine the number of bits necessary to transfer the number of all cases that can be scheduled from the base station as in FIG. 1H, and may determine the bit number of the monitored up/downlink scheduling information by assuming the determined number of bits. If the base station transmits, to the terminal, up/downlink scheduling time information (a slot or TTI for starting transmission of an uplink control signal or data, or a slot or TTI for receiving a downlink control signal or data signal, $T_{start}$) and the number of slots ($N_{slot}$) that can be scheduled by using the following equation, the number of bits necessary to transmit the scheduling information may be determined as $\log \lceil \log_2 ((T_{PDCCH})T_{PDCCH})/2 \rceil$.

Embodiment 1-3

Compared with the methods proposed by Embodiment 1-1 and Embodiment 1-2 wherein one piece of up/downlink scheduling information can be configured to receive an uplink control signal regarding one or more slots (N slots) or TTIs, data transmission, a downlink control signal, or a data signal, Embodiment 1-3 is directed to a method for configuring the up/downlink scheduling time information proposed by Embodiment 1-1 and Embodiment 1-2 and the number (N) of slots scheduled by the up/downlink scheduling information according to control channel transmission domain information in a slot in which the up/downlink scheduling information is transmitted.

If the base station transmits the up/downlink scheduling information monitoring timepoint to the terminal by a method using at least one of the cycle ($T_{PDCCH}$) value and the offset ($\Delta_{PDCCH}$) value from a specific reference slot, a bit string, or a set of slot indexes for monitoring the up/downlink scheduling information, the terminal may determine the size of slot index information or scheduling time information or the bit number thereof by using at least one of the methods proposed in Embodiment 1-1, and the terminal may monitor the determined size of slot index information or scheduling time information, or the up/downlink scheduling information, which is increased by the bit number of the up/downlink scheduling time information, at the configured monitoring timepoint. If the terminal can be configured such that one piece of up/downlink scheduling information can receive an uplink control signal regarding one or more slots (N slots, $N_{slot}$) or TTIs, data transmission, a downlink control signal, or a data signal from the base station, the terminal may monitor, at the configured monitoring timepoint, the up/downlink scheduling information, the size or bit number of which is increased by the bit number (for example, $\lceil \log_2 (N_{slot}) \text{ value} \rceil$) necessary to indicate additionally scheduled slot number information added to the determined size of slot index information or scheduling time information or to the bit number of up/downlink scheduling time information.

The increase in the bit number of the up/downlink scheduling information may be minimized by considering both the size of slot index information or scheduling time information or the bit number of up/downlink scheduling time information and the bit number necessary to indicate scheduled slot number information, FIG. 1H will be referred to in the following description. If the base station has configured the terminal to monitor the up/downlink scheduling information in one or more slots or TTIs (n and n+6), or the up/downlink scheduling information monitoring timepoint is larger than the minimum scheduling unit of the terminal or the minimum transmission unit thereof, and if one piece of up/downlink scheduling information can be configured to receive an uplink control signal regarding one or more slots (N slots, $N_{slot}$) or TTIs, data transmission, a downlink control signal, or a data signal, then the increase in the bit number of the up/downlink scheduling information may be minimized by considering both the size of slot index information or scheduling time information or the bit number of up/downlink scheduling time information and the bit number necessary to indicate scheduled slot number information. The maximum value of $N_{slot}$ may be configured to be equal to or smaller than the number of slots or TTIs that can be included in the up/downlink scheduling information monitoring timepoint period ($T_{PDCCH}$) that is configured by the base station or defined in advance, or configured to be equal to or smaller than the number of slots or TTIs that can be included in the distance ($D_{PDCCH}$) between up/downlink scheduling information monitoring timepoints. In addition, the one or more scheduled slots may not exceed up/downlink scheduling information monitoring timepoints or slots. In other words, the $N_{slot}$ value may be transmitted from the base station while being additionally included in configuration information configured such that one piece of up/downlink scheduling information receives an uplink control signal regarding one or more slots or TTIs, data transmission, a downlink control signal, or a data signal; alternatively, the $N_{slot}$ value may be determined without adding configuration information on the basis of the number of slots that can be included in the up/downlink scheduling information monitoring timepoint cycle ($T_{PDCCH}$) included in configuration information for configuring the timepoint at which up/downlink scheduling information is monitored, or the number of slots that can be included in the distance ($D_{PDCCH}$) between up/downlink scheduling information monitoring timepoints. FIG. 1H illustrates a case wherein the maximum number of $N_{slot}$ ($N_{slot}^{max}$) is equal to the slots that can be included in the configured or defined up/downlink scheduling information monitoring timepoint cycle ($T_{PDCCH}$) 1h-01. In FIG. 1H, there are a total of 21 cases wherein the base station can perform up/downlink scheduling to the terminal within the up/downlink scheduling information monitoring timepoint cycle, and five bits are necessary to select one from the 21 cases. Accordingly, if the up/downlink scheduling time information and the scheduled slot number information are considered together as proposed by the disclosure, the increase in the number of bits added to the up/downlink scheduling information can be minimized compared with the case of separately considering the up/downlink scheduling time information and the scheduled slot number information.

As in FIG. 1H, the terminal's uplink control signal or data transmission time and the number of transmission slots, or the downlink control signal or data signal reception time and the number of reception slots may be determined on the basis of the following Equation 3 by using up/downlink scheduling time information to slot or TTI for starting transmission of an uplink control signal or data, or a slot or TTI for receiving a downlink control signal or data signal, $T_{start}$, 1h-08) and the number of scheduled slots ($N_{slot}$) 1h-09 or the length thereof, and by using the RIV value calculated by Equation 3 below:

$$\text{If } (N_{slot} - 1) \le \left\lfloor \frac{T_{PDCCH} -}{2} \right\rfloor, \quad [\text{Equation 3}]$$
$$RIV = T_{PDCCH}(N_{slot} - 1) + T_{start}$$
$$\text{Else,}$$
$$RIV = T_{PDCCH}(N_{slot} - T_{start} - 1) + T_{PDCCH} - 1 - T_{start}$$

If the terminal can start transmitting an uplink control signal or data or can receive a downlink control signal or data signal after a specific time $T_{min}$ 1h-11 from the timepoint at which up/downlink scheduling information is received, the up/downlink scheduling time information and scheduled slot number information may be determined in view of the time 1h-11. The time 1h-11 may be defined by the capability of the terminal, and the base station, after receiving the capability regarding the time 1h-11 of the terminal, may configure the terminal's up/downlink scheduling time in view of the time 1h-11. If the time 1h-11 is considered, $N_{slot}^{max} = N_{slot}^{max} - T_{min}$ and Equation 3 above may be changed to Equation 4 below:

$$\text{If } (N_{slot} - 1) \le \left\lfloor \frac{T_{PDCCH} - T_{min}}{2} \right\rfloor, \quad [\text{Equation 4}]$$
$$RIV = (T_{PDCCH} - T_{min})(N_{slot} - 1) + T_{start}$$
$$\text{Else,}$$
$$RIV = (T_{PDCCH} - T_{min})(N_{slot} - T_{start} - 1) +$$
$$(T_{PDCCH} - T_{min}) - 1 - T_{start}$$

Figure 1I:
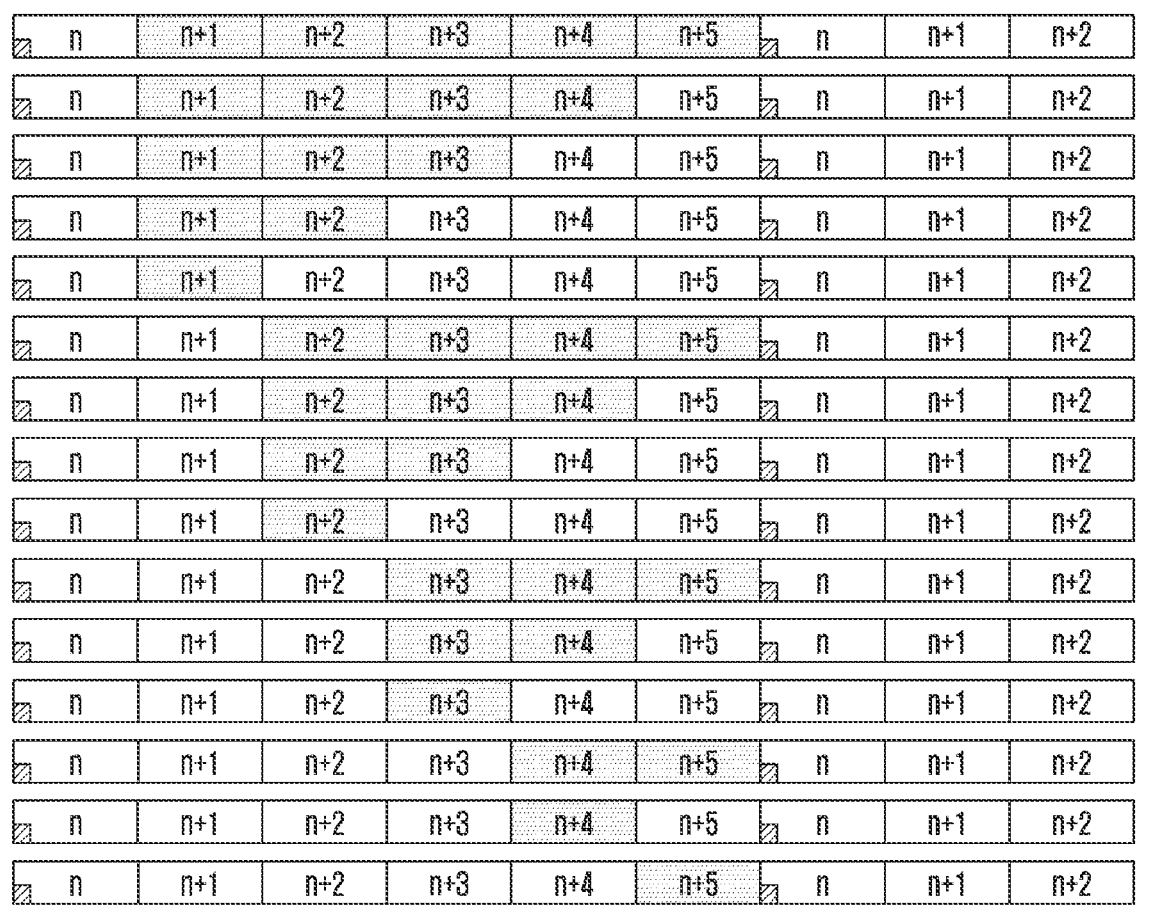

If the number of symbols used to transmit a downlink control channel in slot n or TTI n in which the up/downlink scheduling information is transmitted is equal to the number of symbols included in slot n or TTI n in which the up/downlink scheduling information is transmitted, in other words, if it is confirmed that symbols in slot n or TTI n in which up/downlink scheduling information is transmitted are all used to transmit up/downlink scheduling information, the up/downlink scheduling time information (a slot or TTI for starting transmission of an uplink control signal or data, or a slot or TTI for receiving a downlink control signal or data signal, $T_{start}$) that the base station can configure for the terminal and the number of slots $N_{slot}$ that can be scheduled or the number of schedulable cases change as in FIG. 1I. Accordingly, in Embodiment 3, the terminal may determine the number of symbols used to transmit up/downlink scheduling information in slot n or TTI n in which up/downlink scheduling information is transmitted, and if it is it confirmed that symbols in slot n or TTI n in which up/downlink scheduling information is transmitted are all used to transmit up/downlink scheduling information, the terminal may determine the number of bits necessary to transfer the number of scheduling cases except for the case in which scheduling is impossible as in FIG. 1I. If the base station transmits, to the terminal, up/downlink scheduling time information (a slot or TTI for starting transmission of an uplink control signal or data, or a slot or TTI for receiving a downlink control signal or data signal, $T_{start}$) and the number of slots ($N_{slot}$) that can be scheduled by using the following Equation 5, the number of bits necessary to transmit the scheduling information may be determined as $\lceil \log_2 ((T_{PDCCH}-1)T_{PDCCH}/2) \rceil$.

$$\text{If } (N_{slot} - 1) \leq \left\lfloor \frac{T_{PDCCH} - 1}{2} \right\rfloor, \quad [\text{Equation 5}]$$
$$RIV = (T_{PDCCH} - 1)(N_{slot} - 1) + T_{start}$$
$$\text{Else,}$$
$$RIV =$$
$$(T_{PDCCH} - 1)(N_{slot} - T_{start} - 1) + (T_{PDCCH} - 1) - 1 - T_{start}$$

If the terminal determines the number of symbols used to transmit up/downlink scheduling information in slot n or TTI n in which up/downlink scheduling information is transmitted, and if it is it confirmed that all symbols in slot n or TTI n in which up/downlink scheduling information is transmitted are not used to transmit up/downlink scheduling information, the terminal may determine the number of bits necessary to transfer the number of scheduling cases where scheduling is possible as in FIG. 1H, and may determine the bit number of the monitored up/downlink scheduling information by assuming the determined number of bits. If the base station transmits, to the terminal, up/downlink scheduling time information (a slot or TTI for starting transmission of an uplink control signal or data, or a slot or TTI for receiving a downlink control signal or data signal, $T_{start}$) and the number of slots ($N_{slot}$) that can be scheduled by using the following Equation 6, the number of bits necessary to transmit the scheduling information may be determined as $\lceil \log_2 ((T_{PDCCH})T_{PDCCH}/2) \rceil$.

$$\text{If } (N_{slot} - 1) \leq \left\lfloor \frac{T_{PDCCH}}{2} \right\rfloor, \quad [\text{Equation 6}]$$
$$RIV = T_{PDCCH}(N_{slot} - 1) + T_{start}$$
$$\text{Else,}$$
$$RIV = T_{PDCCH}(N_{slot} - T_{start} - 1) + T_{PDCCH} - 1 - T_{start}$$

The terminal may determine the number (control field indicator (cm) of symbols used to transmit up/downlink scheduling information in slot n or TTI n in which up/downlink scheduling information is transmitted by receiving a channel that transmits the number of symbols used to transmit the up/downlink scheduling information, such as a PCFICH, or by using the value of CFI included in the group-common control channel or UE-specific control channel. The CH value in slot n or n in which up/downlink scheduling information is transmitted may be defined in advance or configured through an upper-level signal.

Second Embodiment

The disclosure relates to a wireless communication system and, more particularly, to a method and a device wherein different wireless communication systems coexist in one carrier frequency or multiple carrier frequencies, and a terminal capable of transmitting/receiving data in at least one communication system among the different communication systems transmits/receives data to/from each communication system.

In general, a mobile communication system is developed to provide voice services while guaranteeing the mobility of users. The wireless communication system has gradually expanded its service scope from voice to data services and, in recent years, has evolved to such a degree that it can provide high-speed data services. However, since resources are insufficient and users demand faster services in mobile communication systems currently providing services, a more developed mobile communication system is needed.

To meet such demands, standardization of long-tenet evolution (LTE) is under way by the 3rd Generation Partnership Project (3GPP) as one of the next-generation mobile communication systems that are being developed. LTE is a technology of implementing high-speed packet-based communication with a transmission rate of up to about 100 Mbps. To this end, several methods are discussed, including a method of reducing the number of nodes located on a communication path by simplifying the network architecture, a method of making wireless protocols closest to the wireless channel, and the like.

When decoding fails at the initial transmission, the LTE system employs a hybrid automatic repeat reQuest (HARQ) scheme that retransmits the corresponding data in a physical layer. According to the HARQ scheme, when the receiver fails to accurately decode data, the receiver transmits information that indicates decoding failure (negative acknowledgement (NACK)) to the transmitter such that the transmitter can retransmit the corresponding data in the physical layer. The receiver combines data retransmitted by the transmitter with data, the decoding of which has previously failed, thereby improving the data reception performance. Also, when the receiver accurately decodes data, the receiver may transmit information that indicates successful decoding (acknowledgement (ACK)) to the transmitter such that the transmitter can transmit new data.

Figure 2A:
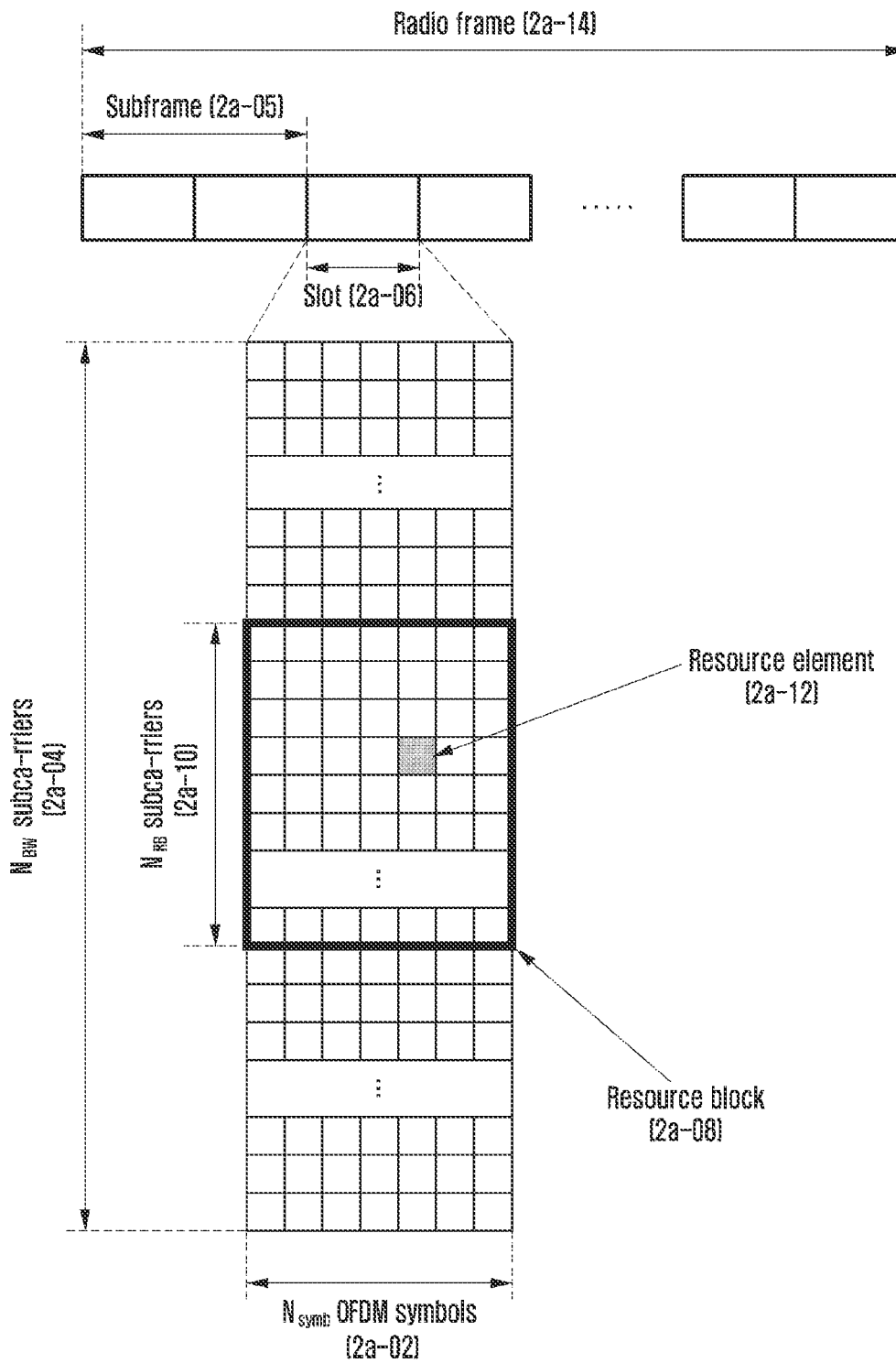
FIG. 2A illustrates the basic structure of a time-frequency domain in an LTE system.

FIG. 2A illustrates the basic structure of a time-frequency domain, which is a radio resource domain where data or a control channel is transmitted in a downlink of an LTE system.

In FIG. 2A, the horizontal axis indicates the time domain, and the vertical axis indicates the frequency domain. The smallest transmission unit in the time domain is an OFDM symbol, $N_{symb}$ OFDM symbols 2a-02 constitute one slot 2a-06, and two slots constitute one subframe 2a-05. The length of each slot is 0.5 ms, and the length of each subframe is 1.0 ms. The radio frame 2a-14 is a time-domain unit including ten subframes. The smallest transmission unit in the frequency domain is a subcarrier, and the bandwidth of the entire system transmission bandwidth includes a total of $N_{BW}$ subcarriers 2a-04.

In the time-frequency domain, the basic resource unit is a resource element (RE) 2a-12, which may be expressed by an OFDM symbol index and a subcarrier index. A resource block (RB) (or physical resource block (PRB)) 2a-08 is defined by $N_{symb}$ consecutive OFDM symbols 2a-02 in the time domain and $N_{RB}$ consecutive subcarriers 2a-10 in the frequency domain. Therefore, one RB 2a-08 includes $N_{symb} \times N_{RB}$ REs 2a-12. Generally, the minimum transmission unit of data is the RB unit. In the LTE system, generally, $N_{symb}=7$ and $N_{RB}=12$, and $N_{BW}$ and $N_{RB}$ are proportional to the bandwidth of the system transmission band. The data rate increases in proportion to the number of RBs that are scheduled to the terminal. An LTE system defines and operates six transmission bandwidths. In the case of an FDD system that separately operates the downlink and the uplink on the basis of frequency, the downlink transmission bandwidth and the uplink transmission bandwidth may differ from each other. The channel bandwidth denotes an RF bandwidth corresponding to the system transmission bandwidth. Table 2 provided below indicates the correlation between a system transmission bandwidth and a channel bandwidth defined in the LTE system. For example, in the case of an LTE system having a channel bandwidth of 10 MHz, the transmission bandwidth includes 50 RBs.

TABLE 2

| Channel bandwidth $BW_{channel}$ [MHz] | 1.4 | 3 | 5 | 10 | 15 | 20 |
|---|---|---|---|---|---|---|
| Transmission bandwidth configuraton | 6 | 15 | 25 | 50 | 75 | 100 |

Downlink control information is transmitted within the initial N OFDM symbols inside the subframe. In general, N={1,2,3}. Therefore, the value of N may be changed for each subframe based on the amount of control information to be transmitted in the current subframe. The control information includes a control channel transmission interval indicator indicating the number of OFDM symbols across which control information is transmitted, scheduling information associated with downlink data or uplink data, a HARQ ACK/NACK signal, or the like.

In the LTE system, scheduling information associated with downlink data or uplink data is transmitted from a base station to a terminal via downlink control information (DCI). "uplink (UL)" refers to a wireless link through which the terminal transmits data or a control signal to the base station, and "downlink (DL)" refers to a wireless link through which the base station transmits data or a control signal to the terminal. The DCI is defined in various formats such that a DCI format is applied and employed based on a definition regarding whether the same indicates scheduling information regarding uplink data (uplink (UL) grant) or scheduling information regarding downlink data (downlink (DL) grant), whether or not the same indicates compact DCI having a small control information size, whether or not spatial multiplexing using multiple antennas is applied, and whether or not the same indicates DCI for power control. For example, DCI format 1 corresponding to scheduling control information regarding downlink data (DL grant) is configured to include at least the following pieces of control information, Resource allocation type 0/1 flag: indicates whether the resource allocation scheme is type 0 or type 1. Type 0 applies a bitmap scheme and allocates resources in units of resource block groups (RBGs). In the LTE system, the basic unit of scheduling is a resource block (RB) expressed by time and frequency domain resources, and an RBG includes multiple RBs and is used as a basic unit of scheduling in the type 0 scheme.

Resource block assignment: indicates RBs assigned to data transmission, Expressed resources are determined according to the system bandwidth and the resource allocation scheme.

Modulation and coding scheme (MCS): indicates the modulation scheme used for data transmission and the size of the transport block, which is the data to be transmitted.

HARQ process number: indicates the process number of the HARQ.

New data indicator: indicates HARQ initial transmission or retransmission.

Redundancy version: indicates the redundancy version of the HARQ.

Transmit power control (TPC) command for physical uplink control channel (PUCCH): indicates a transmit power control command regarding a PUCCH, which is an uplink control channel.

The DCI undergoes channel coding and modulation processes and is transmitted through a physical downlink control channel (PDCCH), which is a downlink physical control channel, or through an enhanced PDCCH (EPDCCH).

In general, the DCI is channel-coded independently of each terminal, and is then transmitted through each independently configured PDCCH. In the time domain, the PDCCH is mapped and transmitted during the control channel transmission interval. The frequency-domain mapping position of the PDCCH is determined by the identifier (ID) of each terminal, and is distributed across the entire system transmission band.

The downlink data is transmitted through a physical downlink shared channel (PDSCH), which is a physical channel dedicated to downlink data transmission. The PDSCH is transmitted after the control channel transmission interval, and scheduling information such as the specific mapping position in the frequency domain and the modulation scheme indicates the DCI transmitted through the PDCCH.

By using an MCS including five bits among the control information constituting the DCI, the base station notifies the terminal of the modulation scheme applied to the PDSCH to be used for transmission and the size of the data to be transmitted (transport block size (TBS)). The TBS corresponds to the size before channel coding for error correction is applied to the data (transport block (TB)) to be transmitted by the base station.

The modulation scheme supported by the LTE system includes quadrature phase shift keying (QPSK), 16 quadrature amplitude modulation (QAM), and 64QAM, and modulation orders ($Q_m$) thereof correspond to 2, 4, and 6, respectively. That is, in the case of the QPSK modulation, 2 bits can be transmitted per symbol; in the case of the 16QAM modulation, 4 bits can be transmitted per symbol; and in the case of 64QAM modulation, 6 bits can be transmitted per symbol.

Compared with LTE Rel-8, 3GPP LTE Rel-10 has adopted a bandwidth extension technology in order to support a larger amount of data transmission. The technology referred to as "bandwidth extension" or "carrier aggregation (CA)" can increase the amount of data transmission in proportion to the extended bandwidth, compared with an LTE Rel-8 terminal that extends the bandwidth and transmits data in one band. Each of the bands is referred to as a component carrier (CC), and an LTE Rel-8 terminal is required to have one CC for each of downlink and uplink transmissions. In addition, the downlink CC and the uplink CC, which is connected thereto by SIB-2, are collectively referred to as a cell. The SIB-2 connectivity between the downlink CC and the uplink CC is transmitted as a system signal or an upper-level signal. A terminal supporting the CA can receive downlink data and can transmit uplink data through multiple serving cells.

When a base station has difficulty sending a physical downlink control channel (PDCCH) to a specific terminal in a specific serving cell under Rel-10, the base station may transmit the PDCCH in another serving cell and may configure a carrier indicator field (CIF) as a field informing that the corresponding PDCCH indicates a physical downlink shared channel (PDSCH) or a physical uplink shared channel (PUSCH) of another serving cell. The CIF may be configured for a terminal supporting the CA. The CIF has been determined such that three bits can be added to PDCCH information in a specific serving cell so as to indicate another serving cell, the CIF is included only when cross-carrier scheduling is performed, and the cross-carrier scheduling is not performed when the CIF is not included. When the CIF is included in downlink assignment information (DL assignment), the CIF indicates a serving cell in which a PDSCH scheduled by the DL assignment is to be transmitted; and when the CIF is included in uplink resource assignment information (UL grant), the CIF is defined to indicate a serving cell in which a PUSCH scheduled by the UL grant is to be transmitted.

As described above, carrier aggregation (CA) is defined as a bandwidth extension technology in LTE 10 such that multiple serving cells can be configured for a terminal. The terminal transmits channel information regarding the multiple serving cells to the base station periodically or aperiodically for the purpose of data scheduling of the base station. The base station schedules data for each carrier and transmits the same, and the terminal transmits A/N feedback regarding data transmitted with regard to each carrier. LTE Rel-10 is designed such that a maximum of 21 bits of A/N feedback is transmitted, and when A/N feedback transmission and channel information transmission overlap in one subframe, the A/N feedback is transmitted, and the channel information is discarded. LTE Rel-11 is designed such that channel information of one cell is multiplexed together with A/N feedback such that a maximum of 22 bits of A/N feedback and channel information of one cell are transmitted through PUCCH format 3 by using a transmission resource of PUCCH format 3.

LTE-13 assumes a scenario wherein a maximum of 32 serving cells is configured, and establishes a concept wherein bands not only in a licensed band, but also in an unlicensed band are used to extend the number of serving cells to a maximum of 32. In addition, considering the fact that the number of licensed bands is limited as in the case of the LTE frequency, providing an LTE service in an unlicensed band such as 5 GHz band has been completed, and is referred to as licensed assisted access (LAA). The LAA applies carrier aggregation technology in the LTE and supports operating an LTE cell, which is a licensed band, as a PCell and operating an LAA cell, which is an unlicensed band, as an SCell. Accordingly, a feedback occurring in the LAA cell, which is an SCell, needs to be transmitted only in the PCell as in the case of LTE, and the downlink subframe and the uplink subframe can be freely applied to the LAA cell. Unless otherwise specified in the specification, "LTE" as used herein includes all advanced technologies of LTE, such as LTE-A and LAA.

Meanwhile, the 5th-generation wireless cellular communication system (hereinafter, referred to as 5G or NR), which is a post-LTE communication system, needs to be able to freely accommodate various requirements of the user, the service provider, and the like, and a service satisfying such various requirements can be provided accordingly.

Therefore, 5G may be defined as technology for satisfying requirements selected for various 5G-oriented services, among the requirements such as a maximum terminal transmission rate of 20 Gbps, a maximum terminal speed of 500 km/h, a maximum latency of 0.5 ms, and a terminal access density of 1,000,000 terminals/km$^2$, in connection with various 5G-oriented services such as enhanced mobile broadband (hereinafter, referred to as eMBB), massive machine-type communication (hereinafter, referred to as mMTC), ultra-reliable and low-latency communications (hereinafter, referred to as URLLC).

For example, in order to provide eMBB in 5G, one base station needs to be able to provide a maximum terminal transmission rate of 20 Gbps in the downlink, and a maximum terminal transmission rate of 10 Gbps in the uplink. At the same time, the average transmission rate that is actually experienced by the terminal needs to be increased. In order to satisfy such a requirement, it is necessary to improve the transmission reception technology, including a further improved multiple-input multiple-output transmission technology.

At the same time, mMTC is considered for use in supporting an application service such as Internet of things (IoT) in 5G. In order to efficiently provide IoT, mMTC is required to meet requirements such as support for large-scale terminal access in a cell, terminal coverage improvement, improved battery time, and terminal cost reduction. A large number of terminals (for example, 1,000,000 terminals/km$^2$) needs to be supported in a cell such that the same are attached to various sensors and devices to provide communication functions according to IoT. In addition, mMTC is required to have a coverage larger than that provided by eMBB because, due to the service characteristics, terminals are likely to be positioned in coverage holes, such as a basement of a building, where cell coverage fails. Since mMTC is likely to be configured by inexpensive terminals, and since it is difficult to frequently replace the batteries of the terminals, a very long battery lifetime is required.

Lastly, in the case of URLLC, it is required to provide cellular-based wireless communication used for a specific purpose, specifically, communication that provides ultra-low latency and ultra-high reliability in connection with services used for remote control of a robot or machinery, industrial automation, unmanned aerial vehicles, remote health control, and emergency notifications. For example, URLLC has the requirement that the maximum latency be shorter than 0.5 ms, and that a packet error rate equal to or less than $10^{-5}$ be provided. Accordingly, URLLC has the design requirement that the same provide a transmit time interval (TTI) smaller than that of a 5G service such as eMBB, and a large resource be allocated in the frequency band.

The services considered in the $5^{th}$-generation wireless cellular communication system described above need to be provided as a single framework. That is, for the purpose of efficient resource management and control, respective services are preferably integrated into a single system, controlled, and transmitted, instead of being operated independently.

Figure 2B:
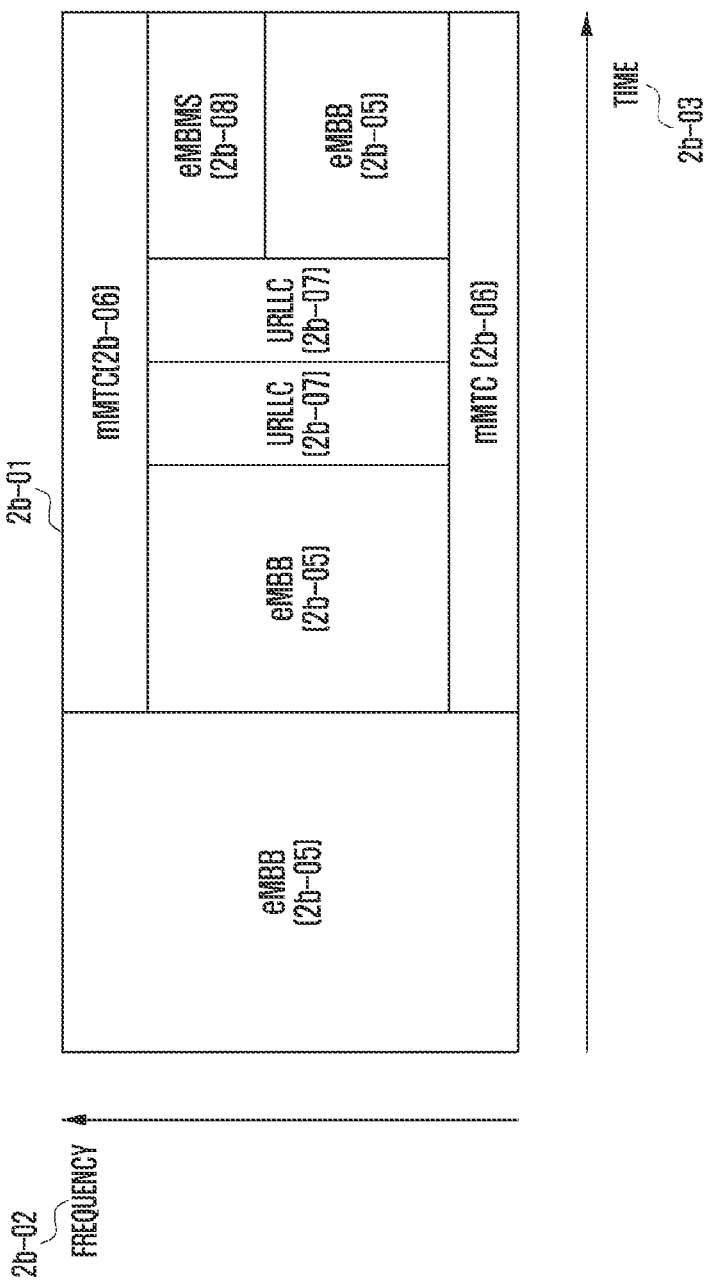
FIG. 2B illustrates an example of multiplexing and transmitting 5G services in one system.

FIG. 2B illustrates an example of multiplexing services considered in 5G into one system and transmitting the same.

In FIG. 2B, the frequency-time resource 2b-01 used by 5G may include a frequency axis 2b-02 and a time axis 2b-03. FIG. 2B illustrates an example wherein, inside one framework, 5G operates eMBB 2b-05, mMTC 2b-06, and URLLC 2b-07. It is also possible to consider, as a service that can be additionally considered in 5G, an enhanced mobile broadcast/multicast service (eMBMS) 2b-08 for providing a cellular-based broadcasting service. Services considered in 5G, such as eMBB 2b-05, mMTC 2b-06, URLLC 2b-07, and eMBMS 2b-08, may be multiplexed and transmitted by means of time-division multiplexing (TDM) or frequency division multiplexing (FDM) inside one system frequency bandwidth operated by 5G, and it is also possible to consider spatial division multiplexing. In the case of eMBB 2b-05, it is preferred to occupy and transmit the maximum frequency bandwidth at a specific arbitrary time in order to provide the above-mentioned increased data transmission rate. Accordingly the service of eMBB 2b-05 is preferably subjected to TDM with other services and transmitted within the system transmission bandwidth 2b-01, but the same is also preferably subjected to FDM with other services and transmitted within the system transmission bandwidth, as required by other services.

In the case of mMTC 2b-06, an increased transmission interval is required to secure a wide coverage unlike other services, and the coverage can be secured by repeatedly transmitting the same packet inside the transmission interval. At the same time, there is a limit on the transmission bandwidth that a terminal can receive in order to reduce the complexity and price of the terminal. In view of such requirements, the mMTC 2b-06 is preferably subjected to TDM with other services and transmitted within the system transmission bandwidth 2b-01 of 5G.

In order to satisfy the ultra-latency requirement required by services, URLLC 2b-07 preferably has a short transmit time interval (TTI) compared with other services. At the same time, the same preferably has a large bandwidth in terms of frequency because a low coding rate is necessary to satisfy the ultra-latency requirement. In view of such requirements of URLLC 2b-07, the URLLC 2b-07 is preferably subjected to TDM with other services within the transmission system bandwidth 2b-01 of 5G.

Respective services described above may have different transmission/reception techniques and transmission/reception parameters in order to satisfy requirements required by respective services. For example, respective services may have different numerologies according to respective service requirements. As used herein, the numerology includes the length of a cyclic prefix (CP), the subcarrier spacing, the length of an OFDM symbol, and the length of a TTI in a communication system based on orthogonal frequency division multiplexing (OFDM) or orthogonal frequency division multiple access (OFDMA). As an example of having different numerologies between services, eMBMS 2b-08 may have a CP length longer than that of other services. Since eMBMS transmits broadcast-based upper-level traffic, the same may transmit the same data in all cells. From the viewpoint of a terminal, if signals received in multiple cells arrive within the CP length, the terminal can receive and decode all of the signals and thus can obtain single frequency network (SFN) diversity gain; accordingly, there is an advantage in that even a terminal positioned at a cell boundary can receive broadcast information with no coverage limit. However, when the CP length is longer than that of other services in connection with providing eMBMS in 5G, the CP overhead generates waste, a longer OFDM symbol length is accordingly required than that of other services, and a narrower subcarrier spacing is also required than that of other services.

As another example of using different numerologies between services in 5G, URLLC may require a smaller TTI than that of other services, a shorter OFDM symbol length may be accordingly required, and a larger subcarrier spacing may also be required.

Meanwhile, one TTI in 5G may be defined as one slot, and may include 14 OFDM symbols or 7 OFDM symbols. Accordingly, in the case of subcarrier spacing at 15 KHz, one slot has a length of 1 ms or 0.5 ms. In addition, for the purpose of emergency transmission and transmission in an unlicensed band in 5G, one TTI may be defined as one mini-slot or sub-slot, and one mini-slot may have OFDM symbols, the number of which ranges from 1 to ((number of OFDM symbols of the slot)-1). For example, if the length of one slot corresponds to 14 OFDM symbols, the length of one mini-slot may be determined from 1-13 OFDM symbols. The length of the slot or mini-slot may be defined by standards, or may be transmitted by an upper-level signal or system information and received by the terminal.

The slot or mini-slot may be defined to have various transmission formats, and may have formats classified as below:
  DL-only slot or full-DL slot: a DL-only slot includes only a DL interval and supports only DL transmission.
  DL-centric slot: a DL-centric slot includes a DL interval, a GP, and a UL interval, and the number of OFDM symbols of the DL interval is larger than the number of OFDM symbols of the UL interval.
  UL-centric slot: a UL-centric slot includes a DL interval, a GP, and a UL interval, and the number of OFDM symbols of the DL interval is smaller than the number of OFDM symbols of the UL interval.
  UL-only slot or full-UL slot: a UL-only slot includes only a UL interval, and supports only UL transmission.

Although slot formats have solely been classified above, mini-slots may also be classified in the same manner. That is, mini-slots may be classified into a DL-only mini-slot, a DL-centric mini-slot, a UL-centric mini-slot, and a UL-only mini-slot.

According to the format of the slot or mini-slot, the transmission start symbol and end symbol of UL/DL data may vary. The disclosure provides a scheme wherein, in order to transmit/receive UL/DL data to/from a base station through the slot or mini-slot of a terminal, the start symbol and end symbol (or interval) of data are indicated to the terminal, and the terminal receives the values, thereby transmitting/receiving data through the slot or min-slot.

Hereinafter, preferred embodiments of the disclosure will be described in detail with reference to the accompanying drawings. Here, it is noted that identical reference numerals denote the same constituent elements in the accompanying drawings. Further, a detailed description of a known function and configuration which may make the subject matter of the disclosure unclear will be omitted.

Further, although the following detailed description of embodiments of the disclosure will be directed to LTE and 5G systems, it can be understood by those skilled in the art that the main gist of the disclosure may also be applied to any other communication systems having similar technical backgrounds and channel types, with a slight modification, without substantially departing from the scope of the disclosure.

Hereinafter, a 5G system for performing data transmission/reception in the 5G cell will be described.

Figure 2C:
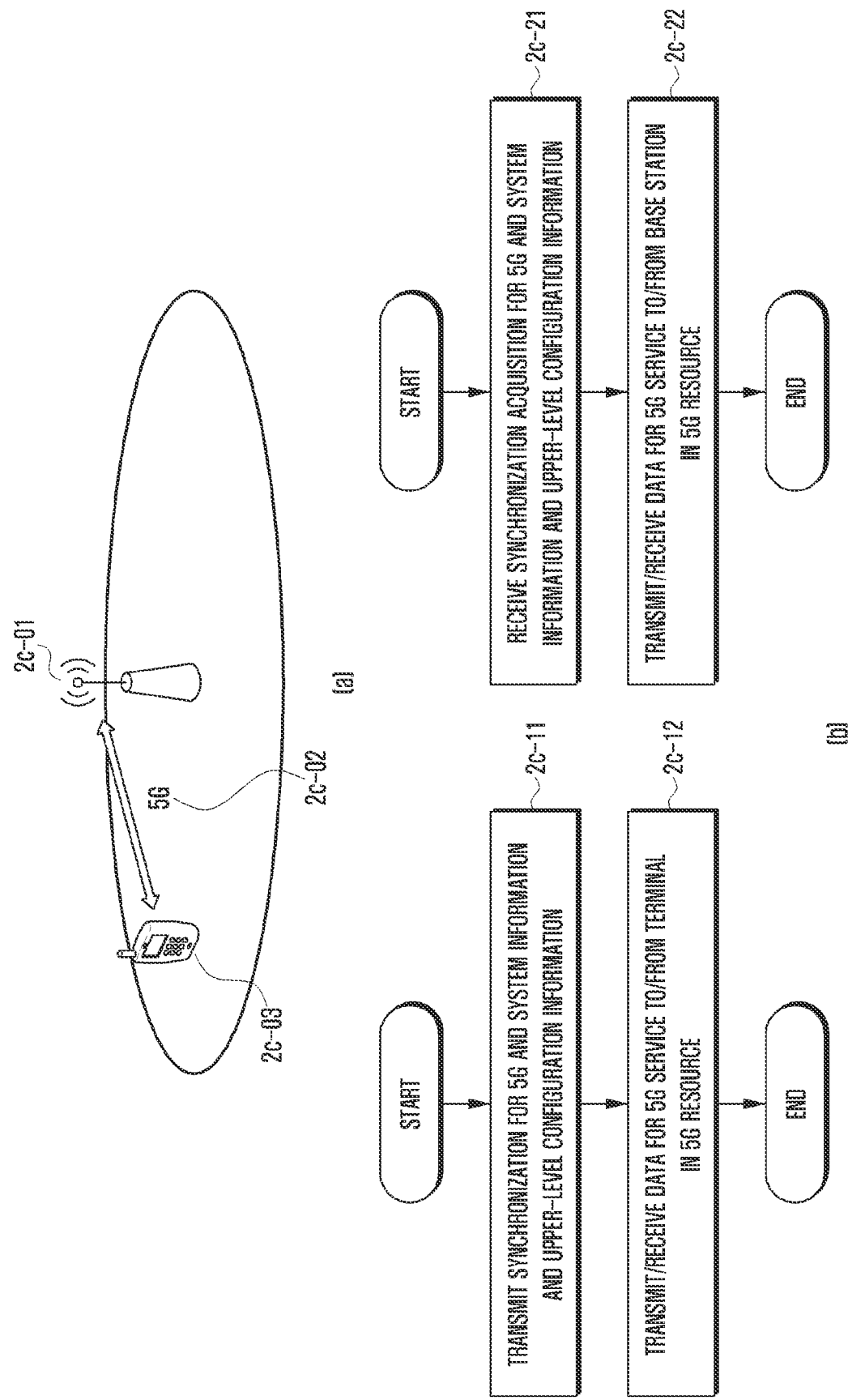
FIG. 2C illustrates the $(2\text{-}1)^{th}$ embodiment of a communication system to which the disclosure is applied.

FIG. 2C illustrates a first embodiment of a communication system to which the disclosure is applied. The drawings illustrate a type in which a 5G system is operated, and schemes proposed by the disclosure are applicable to the system of FIG. 2C.

Referring to FIG. 2C, FIG. 2CA illustrates a case wherein a 5G cell 2c-02 is operated by one base station 2c-01 in a network. The terminal 2c-03 is a 5G-capable terminal having a 5G transmission/reception module. The terminal 2c-03 acquires synchronization through a synchronization signal transmitted in the 5G cell 2c-02, receives system information, and transmits/receives data to/from the base station 2c-01 through the 5G cell 2c-02. In this case, there is no limit on the duplex type of the 5G cell 2c-02. If the 5G cell is the PCell, uplink control transmission is transmitted through the 5G cell 2c-02. In the system of 5c, the 5G cell may include multiple serving cells and may support a total of 32 serving cells. It is assumed that the base station 2c-01 in the network has a 5G transmission/reception module (system), and the base station 2c-01 can control and operate the 5G system in real time.

Next, a procedure of the base station 2c-01 configuring a 5G resource and transmitting/receiving data to/from the 5G-capable terminal 2c-03 in the resource for 5G will be described.

In step 2c-11 of FIG. 2CB, the base station 2c-01 transmits synchronization for 5G, system information, and upper-level configuration information to the 5G-capable terminal 2c-03. In connection with the synchronization signal for 5G, a separate synchronization signal may be transmitted for eMBB, mMTC, or URLLC that uses a different numerology, and it is also possible to transmit a synchronization signal common to a specific 5G resource by using a single numerology. In connection with the system information, a single numerology may be used to transmit a system signal common to a specific 5G resource, and separate system information may be transmitted for eMBB, mMTC, or Lane that uses a different numerology. The system information and upper-level configuration information may include configuration information regarding whether a slot or a mini-slot will be used to transmit/receive data, and may include the number of OFDM symbols of the slot or mini-slot and a numerology. When DL common control channel reception is configured for the terminal, the system information and upper-level configuration information may include configuration information regarding the DL common control channel reception.

In step 2c-12, the base station 2c-01 transmits/receives data for a 5G service to/from the 5G-capable terminal 2c-03 in the 5G resource.

Next, a procedure of the 5G-capable terminal 2c-03 receiving a 5G resource configuration from the base station 2c-01 and transmitting/receiving data in the 5G resource will be described.

In step 2c-21 of FIG. 2CB, the 5G-capable terminal 2c-03 acquires synchronization from a synchronization signal for 5G transmitted by the base station 2c-01, and receives system information and upper-level configuration information transmitted by the base station 2c-01. In connection with the synchronization signal for 5G, a separate synchronization signal may be transmitted for eMBB, mMTC, or URLLC that uses a different numerology, and it is also possible to transmit a synchronization signal common to a specific 5G resource by using a single numerology. In connection with the system information, a single numerology may be used to transmit a system signal common to a specific 5G resource, and separate system information may be transmitted for eMBB, mMTC, or URLLC that uses a different numerology. The system information and upper-level configuration information may include configuration information regarding whether a slot or a mini-slot will be used to transmit/receive data, and may include the number of OFDM symbols of the slot or mini-slot and a numerology. When DL common control channel reception is configured for the terminal, the system information and upper-level configuration information may include configuration information regarding the DL common control channel reception.

In step 2c-22, the 5G-capable terminal 2c-03 transmits/receives data for a 5G service to/from the base station 2c-01 in the 5G resource.

The following description concerns a scheme wherein, when the 5G system of FIG. 2C is operated by using a slot or mini-slot, a terminal is informed of the time symbol position of UL/DL data, which may vary depending on the transmission format, and the terminal transmits/receives data on the basis of the position.

Figure 2D:
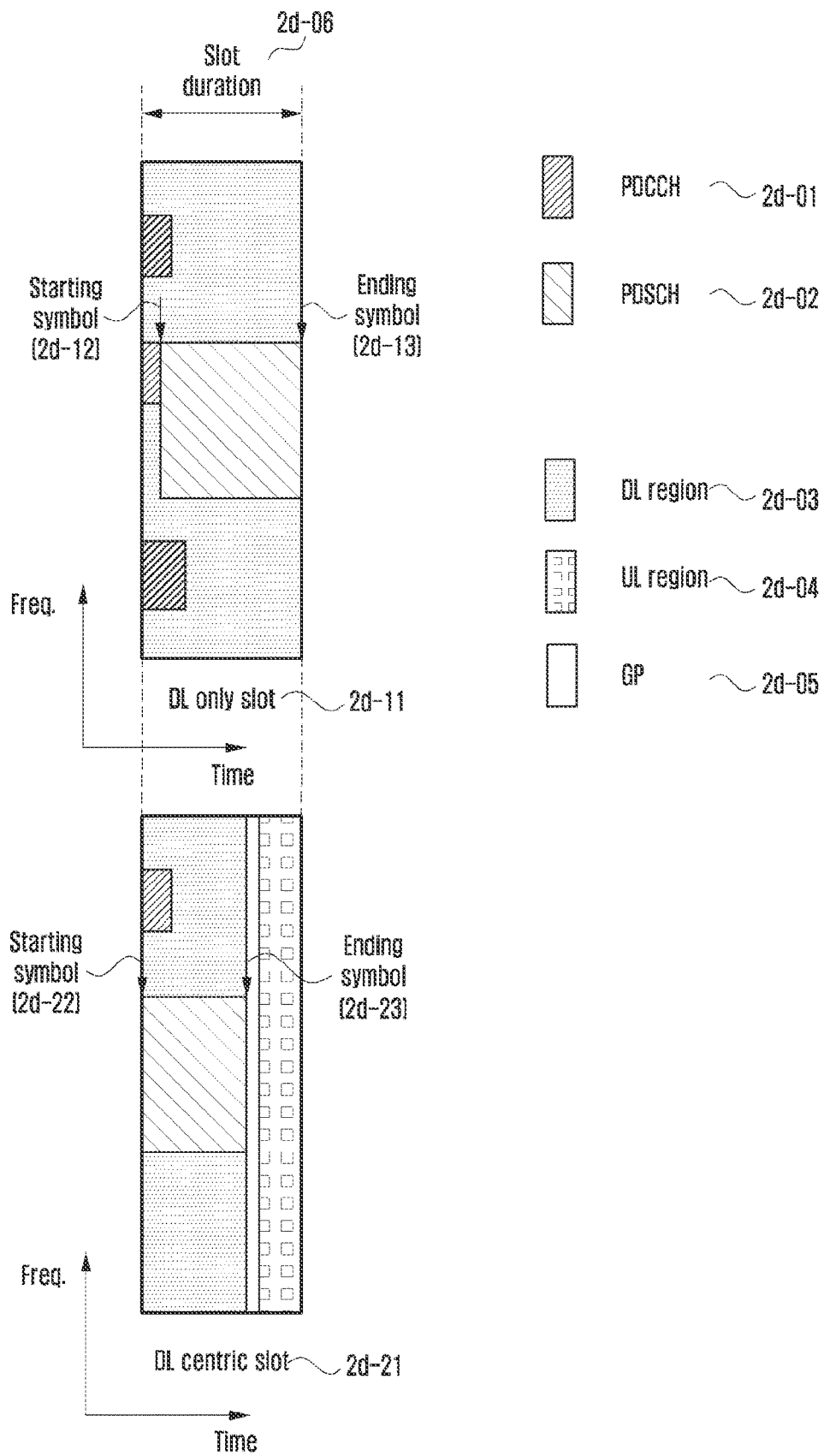
FIG. 2D illustrates the $(2\text{-}1)^{th}$ embodiment in the disclosure.

FIG. 2D illustrates the $(2\text{-}1)^{th}$ embodiment in the disclosure.

It is to be noted that, although a scheme will be described with reference to FIG. 2D wherein a terminal determines the start symbol position and end symbol position (or interval length) of DL data and receives a DL data channel on the basis of a slot, the disclosure is also applicable to a case wherein a terminal determines the start symbol position and end symbol position (or interval length) of DL data and receives a DL data channel on the basis of a mini-slot.

In FIG. 2D, 2d-01 refers to a DL control channel, and may be a terminal-common control channel or a terminal-specific control channel. The terminal-common control channel includes pieces of information that can be commonly indicated to terminals, such as information regarding the format of the slot or mini-slot. The terminal-specific control channel includes pieces of terminal-specific information, such as information regarding the position of the data transmission frequency for UL/DL data scheduling.

In FIG. 2D, 2d-02 denotes a DL data channel, and the data channel includes DL data and an RS necessary to transmit/receive the DL data.

In FIG. 2D, 2d-03 denotes time and frequency domains in which DL transmission is possible inside a slot.

In FIG. 2D, 2d-04 denotes time and frequency domains in which UL transmission is possible inside a slot.

In FIG. 2D, 2d-05 denotes time and frequency domains necessary to change the RF from DL to UL inside a slot.

Firstly, a situation will be described wherein, in a DL-only slot 2d-11 of a slot interval 2d-06, the start OFDM symbol and end OFDM symbol (or interval length) of DL data need to be indicated to the terminal. Time and frequency domains are illustrated, in which a DL control channel 2d-01 and a DL data channel 2d-02 are transmitted in the DL-only slot 2d-11 of FIG. 2D, and the DL data channel 2d-02 may be multiplexed with the DL control channel 2d-01 that schedules DL data either in the time domain or in the frequency domain. Accordingly, the terminal needs to be aware of the OFDM symbol position in which the DL data 2d-02 starts and the OFDM symbol position (or interval length) in which the same ends.

Next, a situation will be described wherein, in a DL-centric slot 2d-21 of a slot interval 2d-06, the start OFDM symbol and end OFDM symbol (or interval length) of DL data need to be indicated to the terminal. Time and frequency domains are illustrated, in which a DL control channel 2d-01 and a DL data channel 2d-02 are transmitted in the DL-centric slot 2d-21 of FIG. 2D, and the DL data channel 2d-02 may be multiplexed with the DL control channel 2d-01 that schedules DL data either in the time domain or in the frequency domain. In addition, the end part of the DL-centric slot 21-21 includes a GP 2d-05 and an UL transmission interval 2d-04, and the DL data channel 2d-02 cannot be transmitted in the interval. Accordingly, the terminal needs to be aware of the OFDM symbol position in which the DL data 2d-02 starts and the OFDM symbol position (or interval length) in which the same ends.

Two schemes proposed by the (2-1)$^{th}$ embodiment of the disclosure in connection with the above-mentioned situations are as follows:

1) A method to be applied to a case wherein a terminal always receives a terminal-common control channel, or a case wherein a terminal receives an upper-level signal configuration that enables detection of a terminal-common control channel and then detects a terminal-common control channel, will be described. OFDM symbols 2d-12 and 2d-22, at which DL data starts, are indicated by a terminal-specific control channel that schedules DL data. The terminal receives, from the X-bit field of the terminal-specific control channel, information regarding from which OFDM symbol of the DL-only slot 2d-11 DL data is positioned. OFDM symbols (or interval length) 2d-13 and 2d-23, at which DL data ends, are estimated from a terminal-common control channel that indicates the slot format. The slot format includes information regarding what format the slot has, the number of OFDM symbols of the DL interval, the number of OFDM symbols of the GP, and the number of OFDM symbols of the UL interval. For example, it is determined that, in the case of a DL-only slot having a DL interval including 14 OFDM symbols, DL data ends at the 14$^{th}$ OFDM symbol. For example, it is determined that, in the case of a DL-centric slot having a DL interval including ten OFDM symbols, a GP including one OFDM symbol, and a UL interval including three OFDM symbols, DL data ends at the 10$^{th}$ OFDM symbol. Accordingly, the terminal determines that DL data is transmitted up to the last of the OFDM symbols of the DL interval of the slot format indicated by the terminal-common control channel.

Although a situation has been described above wherein DL data is scheduled only in one slot, the following schemes may be applied to a case wherein DL data is scheduled to be transmitted in multiple slots, or a case of semi-persistent scheduling.

According to the first scheme, a DL data start OFDM symbol received from an X-bit field of a terminal-specific control channel, which schedules the first DL data, and the end OFDM symbol determined from the slot format of the terminal-common control channel, are also applied to DL data reception through subsequent slots. Accordingly, the terminal receives DL data by applying the same DL data start OFDM symbol and the same end OFDM symbol (or interval length) in multiple slots.

According to the second scheme, a DL data start OFDM symbol received from X-bit field of a terminal-specific control channel, which schedules the first DL data, is also applied to DL data reception through subsequent slots, and, if the terminal-common control channel informs of slot formats regarding subsequent channels, end OFDM symbols determined from respective slot formats are applied to subsequent slots, respectively. Accordingly, the terminal receives DL data by applying, in multiple slots, the same DL data start OFDM symbol and end OFDM symbols (or interval lengths) that are different for respective slots.

2) A method to be applied to a case wherein a terminal receives an upper-level signal configuration that instructs the terminal not to detect a terminal-common control channel, and thus does not detect a terminal-common control channel, will be described, OFDM symbols 2d-12 and 2d-22, at which DL data starts, are indicated by a terminal-specific control channel that schedules DL data. The terminal receives, from the X-bit field of the terminal-specific control channel, information regarding from which OFDM symbol of the DL-only slot 2d-11 DL data is positioned. OFDM symbols (or interval length) 2d-13 and 2d-23, at which DL data ends, are estimated from a terminal-specific channel that indicates the slot format. The slot format includes information regarding what format the slat has, the number of OFDM symbols of the DL interval, the number of OFDM symbols of the GP, and the number of OFDM symbols of the UL interval. For example, it is determined that, in the case of a DL-only slot having a DL interval including 14 OFDM symbols, DL data ends at the 14$^{th}$ OFDM symbol. For example, it is determined that, in the case of a DL-centric slot having a DL interval including ten OFDM symbols, a GP including one OFDM symbol, and a UL interval including three OFDM symbols, DL data ends at the 10$^{th}$ OFDM symbol. Accordingly, the terminal determines that DL data is transmitted up to the last of the OFDM symbols of the DL interval of the slot format indicated by the terminal-specific control channel.

Although a situation has been described above wherein DL data is scheduled only in one slot, the following schemes may be applied to a case wherein DL data is scheduled to be transmitted in multiple slots, or a case of semi-persistent scheduling.

According to the first scheme, a DL data start OFDM symbol received from an X-bit field of a terminal-specific control channel, which schedules the first DL data, and the end OFDM symbol determined from the slot format of the terminal-specific control channel, are also applied to DL data reception through subsequent slots. Accordingly, the terminal receives DL data by applying the same DL data start OFDM symbol and the same end OFDM symbol (or interval length) in multiple slots.

According to the second scheme, a DL data start OFDM symbol received from an X-bit field of a terminal-specific control channel, which schedules the first DL data, is also applied to DL data reception through subsequent slots, and, if the terminal-specific control channel informs of slot formats regarding subsequent channels, end OFDM symbols determined from respective slot formats are applied to subsequent slots, respectively. Accordingly, the terminal receives DL data by applying, in multiple slots, the same DL data start OFDM symbol and end OFDM symbols (or interval lengths) that are different for respective slots.

Figure 2E:
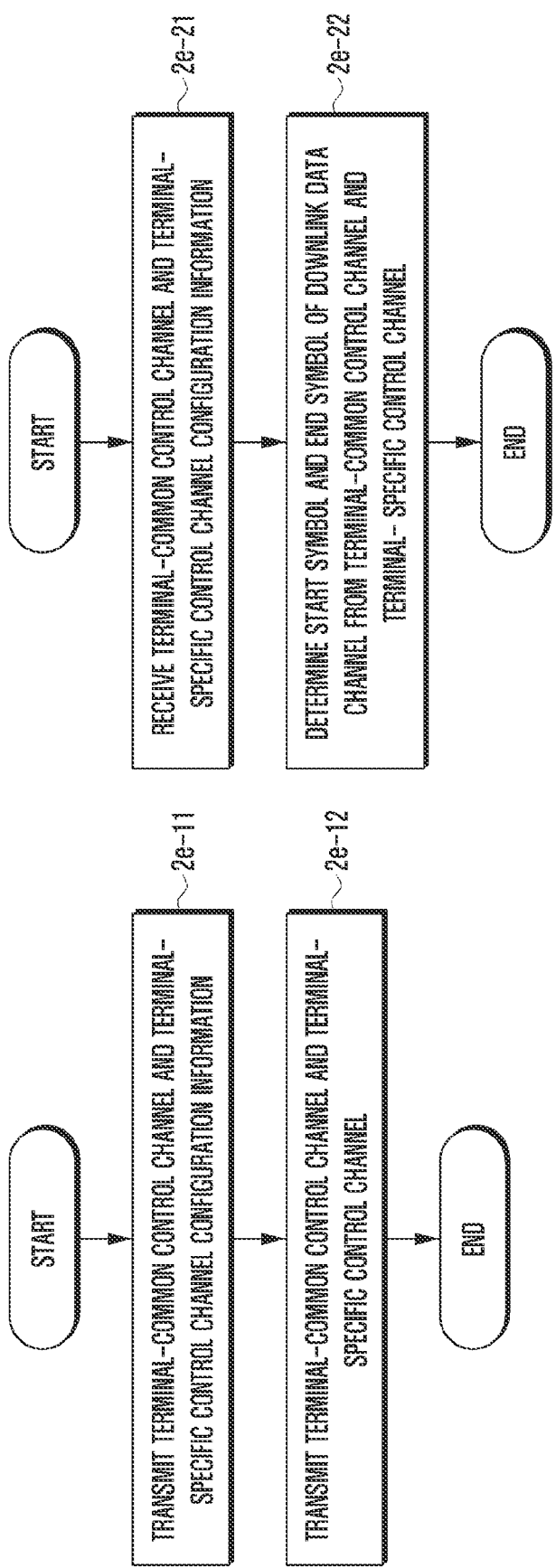
FIG. 2E illustrates a base station procedure and a terminal procedure regarding the $(2\text{-}1)^{th}$ embodiment in the disclosure.

FIG. 2E illustrates a base station procedure and a terminal procedure regarding the (2-1)$^{th}$ embodiment of the disclosure.

Firstly, the base station procedure will be described.

In step 2e-11, the base station transmits terminal-common control channel and terminal-specific control channel configuration information to the terminal.

In step 2e-12, the base station transmits a terminal-common control channel and a terminal-specific control channel to the terminal in view of the slot format and DL data channel scheduling. The terminal-common control channel and a terminal-specific control channel include information regarding the start OFDM symbol and end OFDM symbol (or interval length) of the DL data channel as illustrated with reference to FIG. 2D.

Next, the terminal procedure will be described.

In step 2e-21, the terminal receives terminal-common control channel and terminal-specific control channel configuration information from the base station.

In step 2e-22, the terminal receives a terminal-common control channel and a terminal-specific control channel from the base station and determines the start OFDM symbol and end OFDM symbol (or interval length) of the DL data channel from the terminal-common control channel and the terminal-specific control channel. When a specific terminal is configured not to receive the terminal-common control channel, the same receives only the terminal-specific control channel and determines the start OFDM symbol and end OFDM symbol (or interval length) of the DL data channel. The terminal-common control channel and the terminal-specific control channel include information regarding the start OFDM symbol and end OFDM symbol (or interval length) of the DL data channel as illustrated with reference to FIG. 2D.

Figure 2F:
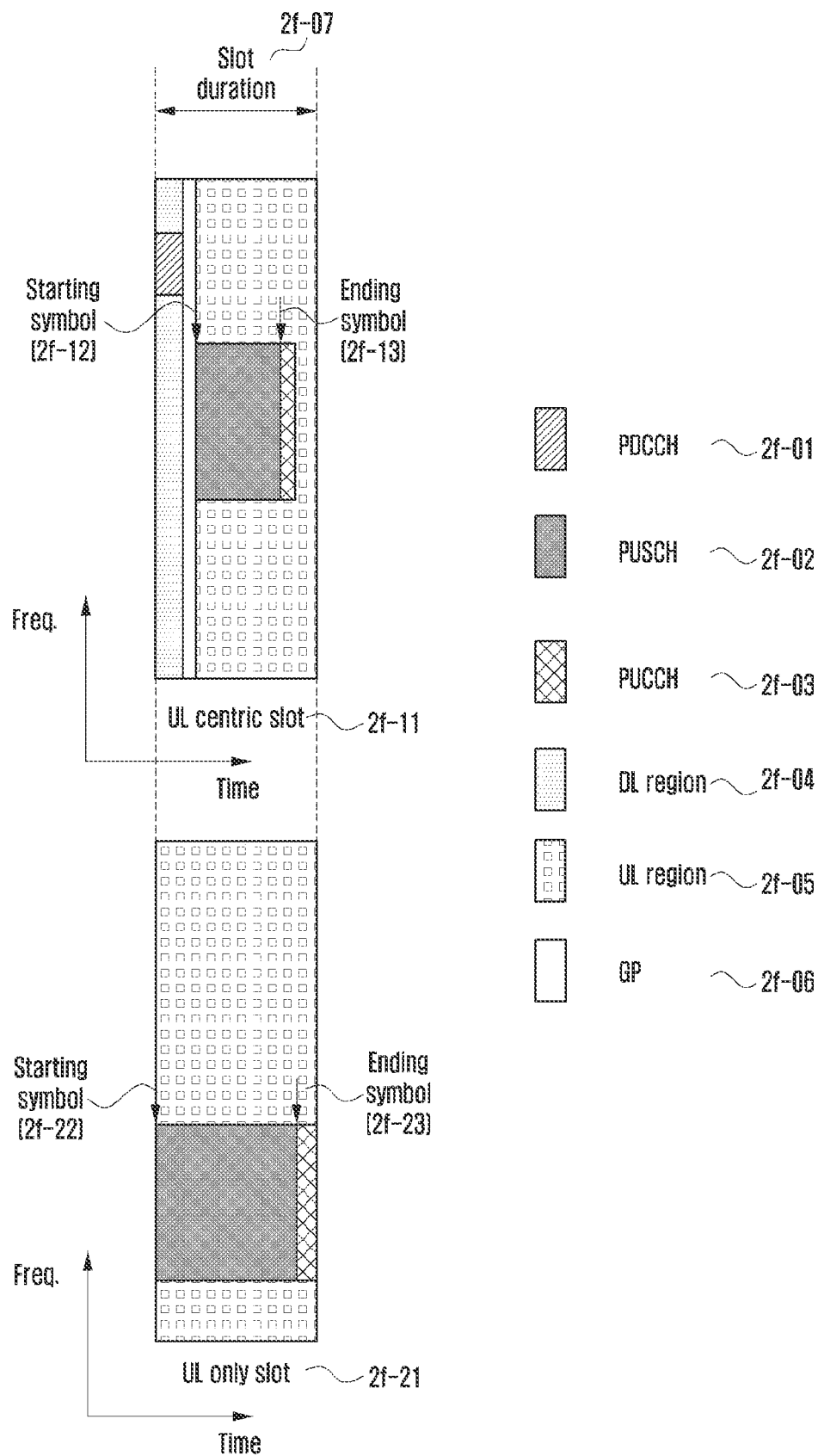
FIG. 2F illustrates the $(2\text{-}2)^{th}$ embodiment in the disclosure.

FIG. 2F illustrates the (2-2)$^{th}$ embodiment in the disclosure.

It is to be noted that, although a scheme will be described with reference to FIG. 2F wherein a terminal determines the start symbol position and end symbol position (or interval length) of UL data and transmits a UL data channel on the basis of a slot, the disclosure is also applicable to a case wherein a terminal determines the start symbol position and end symbol position (or interval length) of DL data and transmits a UL data channel on the basis of a mini-slot.

In FIG. 2F, 2f-01 refers to a DL control channel, and may be a terminal-common control channel or a terminal-specific control channel. The terminal-common control channel includes pieces of information that can be commonly indicated to terminals, such as information regarding the format of the slot or mini-slot. The terminal-specific control channel includes pieces of terminal-specific information, such as information regarding the position of the data transmission frequency for UL/DL data scheduling.

In FIG. 2F, 2f-02 denotes a UL data channel, and the data channel includes UL data and an RS necessary to transmit/receive the UL data.

In FIG. 2F, 2f-03 denotes a UL control channel, and the control channel includes UL control information and an RS necessary to transmit/receive the UL control information.

In FIG. 2F, 2f-04 denotes time and frequency domains in which DL transmission is possible inside a slot.

In FIG. 2F, 2f-05 denotes time and frequency domains in which UL transmission is possible inside a slot.

In FIG. 2F, 2f-06 denotes time and frequency domains necessary to change the RF from DL to UL inside a slot.

Firstly, a situation will be described wherein, in a UL-centric slot 2f-21 of a slot interval 2f-07, the start OFDM symbol and end OFDM symbol (or interval length) of DL data need to be indicated to the terminal. Time and frequency domains are illustrated, in which a DL control channel 2f-01, a UL data channel 2f-02, and a UL control channel 2f-03 are transmitted in the UL-centric slot 2f-11 of FIG. 2F. The UL data channel 2f-02 can start transmission in the UL interval 2f-05 and, since the time and frequency domains of the UL control channel 2f-03 of other terminals cannot be known, the base station needs to inform one terminal of the range of OFDM symbols within the UL interval 2f-05 of one slot, in which the terminal can transmit the UL data channel 2f-02, so as to avoid collision with the time and frequency domains of the UL control channel 2f-03 of other terminals. Accordingly, the terminal needs to be aware of the OFDM symbol position in which the UL data 2f-02 starts and the OFDM symbol position (or interval length) in which the same ends.

Next, a situation will be described wherein, in a UL-only slot 2f-21 of a slot interval 2f-07, the start OFDM symbol and end OFDM symbol (or interval length) of UL data need to be indicated to the terminal. Time and frequency domains are illustrated, in which a UL data channel 2f-02 and a UL control channel 2f-03 are transmitted in the UL-only slot 2f-21 of FIG. 2F. The UL data channel 2f-02 can start transmission from the first OFDM symbol of the UL interval 2f-05 and, since the time and frequency domains of the UL control channel 2f-03 of other terminals cannot be known, the base station needs to inform one terminal of the range of OFDM symbols within the UL interval 2f-05 of one slot, in which the terminal can transmit the UL data channel 2f-02, so as to avoid collision with the time and frequency domains of the UL control channel 2f-03 of other terminals. Although not illustrated in the drawing, it is also necessary to inform one terminal of the OFDM symbols that can be used to transmit the UL data channel 2f-02, due to the sounding reference signal (SRS) transmission time and frequency domains of terminals. Accordingly, the terminal needs to be aware of the OFDM symbol position in which the UL data 2f-02 starts and the OFDM symbol position (or interval length) in which the same ends.

Two schemes proposed by the (2-2)$^{th}$ embodiment of the disclosure in connection with the above-mentioned situations are as follows:

1) A method to be applied to a case wherein a terminal always receives a terminal-common control channel, or a case wherein a terminal receives an upper-level signal configuration that enables detection of a terminal-common control channel and then detects a terminal-common control channel, will be described. OFDM symbols 2f-12 and 2f-22, at which UL data starts, are estimated from the terminal-common control channel that indicates the slot format. The slot format includes information regarding what format the slot has, the number of OFDM symbols of the DL interval, the number of OFDM symbols of the GP, and the number of OFDM symbols of the UL interval. For example, it is determined that, in the case of a UL-only slot having a UL interval including 14 OFDM symbols, UL data is transmitted at the first OFDM symbol. For example, it is determined that, in the case of a UL-centric slot having a DL interval including three OFDM symbols, a GP including one OFDM symbol, and a UL interval including ten OFDM symbols, UL data is transmitted at the fifth OFDM symbol. Accordingly, the terminal determines that UL data is transmitted from the start OFDM symbol of the UL interval of the slot format indicated by the terminal-common control channel. The OFDM symbols (or interval length) 2f-13 and 2f-23, at which the UL data ends, are indicated by a terminal-specific control channel that schedules UL data. The terminal receives, from the Y-bit field of the terminal-specific control channel, information regarding the range of OFDM symbols of the UL-centric slot 2f-11 or the UL-only slot 2f-21, in which UL data can be transmitted.

Although a situation has been described above wherein UL data is scheduled only in one slot, the following schemes may be applied to a case wherein UL data is scheduled to be transmitted in multiple slots, or a case of semi-persistent scheduling.

According to the first scheme, the start OFDM symbol determined from the slot format of the terminal-common control channel and the end OFDM symbol of UL data received from the Y-bit field of a terminal-specific control channel, which schedules the first UL data are also applied to UL data transmission through subsequent slots. Accordingly, the terminal transmits UL data by applying the same UL data start OFDM symbol and the same end OFDM symbol (or interval length) in multiple slots.

According to the second scheme, if the terminal-common control channel informs of slot formats regarding subsequent channels, start OFDM symbols determined from respective slot formats are applied to subsequent slots, respectively, and the UL data end OFDM symbol received from the Y-bit field of the terminal-specific control channel, which schedules the first UL data, is also applied to UL data transmission through subsequent slots. Accordingly, the terminal transmits UL data by applying, in multiple slots, start OFDM symbols that are different for respective slots and the same UL data end OFDM symbol (or interval length).

2) A method to be applied to a case wherein a terminal receives an upper-level signal configuration that instructs the terminal not to detect a terminal-common control channel, and thus does not detect a terminal-common control channel, will be described. OFDM symbols 2f-12 and 2f-22, at which UL data starts, are estimated from the terminal-common control channel that indicates the slot format. The slot format includes information regarding what format the slot has, the number of OFDM symbols of the DL interval, the number of OFDM symbols of the GP, and the number of OFDM symbols of the UL interval. For example, it is determined that, in the case of a UL-only slot having a UL interval including 14 OFDM symbols, UL data is transmitted at the first OFDM symbol. For example, it is determined that, in the case of a UL-centric slot having a DL interval including three OFDM symbols, a GP including one OFDM symbol, and a UL interval including ten OFDM symbols, UL data is transmitted at the fifth OFDM symbol. Accordingly, the terminal determines that UL data is transmitted from the first OFDM symbol of the UL interval of the slot format indicated by the terminal-common control channel. The OFDM symbols (or interval length) 2f-13 and 2f-23, at which the UL data ends, are indicated by a terminal-specific control channel that schedules UL data. The terminal receives, from the Y-bit field of the terminal-specific control channel, information regarding the range of OFDM symbols of the UL-centric slot 2f-11 or the UL-only slot 2f-21, in which UL data can be transmitted.

Although a situation has been described above wherein UL data is scheduled only in one slot, the following schemes may be applied to a case wherein UL data is scheduled to be transmitted in multiple slots, or a case of semi-persistent scheduling.

According to the first scheme, the start OFDM symbol determined from the slot format of the terminal-common control channel and the end OFDM symbol of UL data received from the Y-bit field of a terminal-specific control channel, which schedules the first UL data are also applied to UL data transmission through subsequent slots. Accordingly, the terminal transmits UL data by applying the same UL data start OFDM symbol and the same end OFDM symbol (or interval length) in multiple slots.

According to the second scheme, if the terminal-common control channel informs of slot formats regarding subsequent slots, start OFDM symbols determined from respective slot formats are applied to subsequent slots, respectively, and the UL data end OFDM symbol received from the Y-bit field of the terminal-specific control channel, which schedules the first UL data, is also applied to UL data transmission through subsequent slots. Accordingly, the terminal transmits UL data by applying, in multiple slots, start OFDM symbols that are different for respective slots and the same UL data end OFDM symbol (or interval length).

Figure 2G:
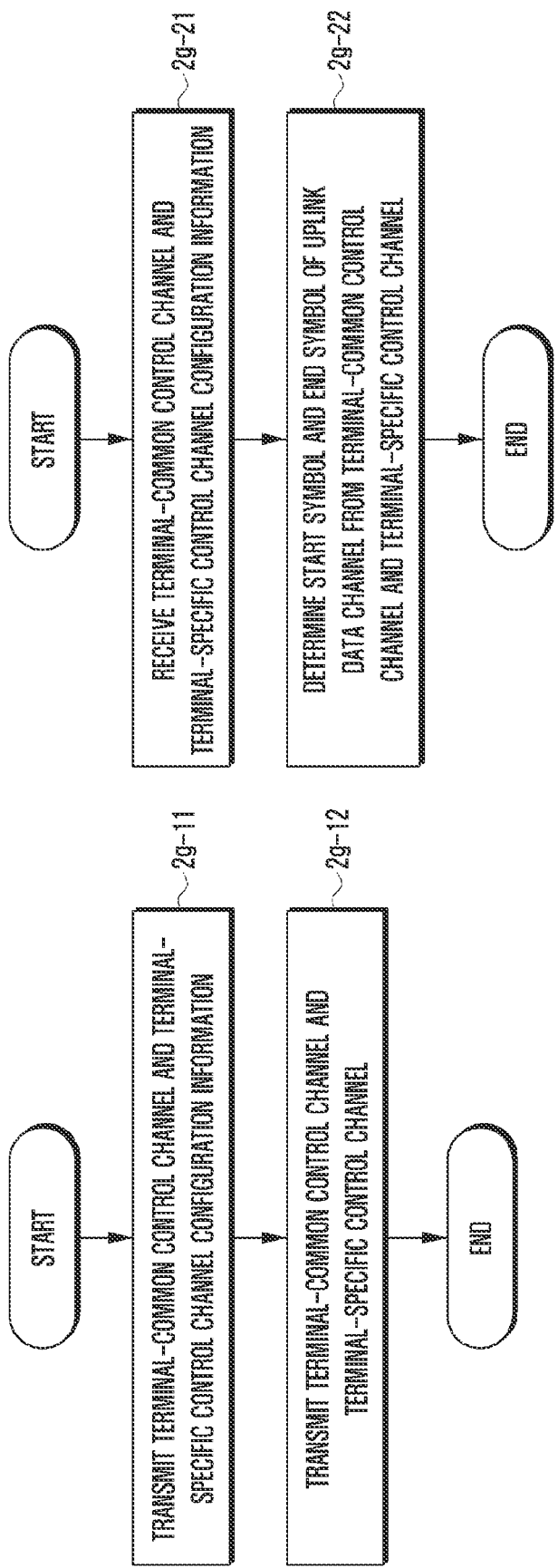
FIG. 2G illustrates a base station procedure and a terminal procedure regarding the $(2\text{-}2)^{th}$ embodiment in the disclosure.

FIG. 2G illustrates a base station procedure and a terminal procedure regarding the $(2\text{-}2)^{th}$ embodiment of the disclosure.

Firstly, the base station procedure will be described.

In step 2g-11, the base station transmits terminal-common control channel and terminal-specific control channel configuration information to the terminal.

In step 2g-12, the base station transmits a terminal-common control channel and a terminal-specific control channel to the terminal in view of the slot format and UL data channel scheduling. The terminal-common control channel and a terminal-specific control channel include information regarding the start OFDM symbol and end OFDM symbol (or interval length) of the UL data channel as illustrated with reference to FIG. 2F.

Next, the terminal procedure will be described.

In step 2g-21, the terminal receives terminal-common control channel and terminal-specific control channel configuration information from the base station.

In step 2g-22, the terminal receives a terminal-common control channel and a terminal-specific control channel from the base station and determines the start OFDM symbol and end OFDM symbol (or interval length) of the UL data channel from the terminal-common control channel and the terminal-specific control channel. When a specific terminal is configured not to receive the terminal-common control channel, the same receives only the terminal-specific control channel and determines the start OFDM symbol and end OFDM symbol (or interval length) of the UL data channel. The terminal-common control channel and the terminal-specific control channel include information regarding the start OFDM symbol and end OFDM symbol (or interval length) of the UL data channel as illustrated with reference to FIG. 2F.

The terminal-specific control channel described with reference to FIG. 2D and FIG. 2F may schedule DL data by means of a one-bit flag, or may schedule UL data. If the one-bit flag indicates 0, the terminal-specific control channel schedules DL data; in this case, the X-bit field in a specific position indicates the start OFDM symbol of the DL data channel; and the terminal may receive the terminal-specific control channel and may determine the start OFDM symbol of the DL data channel from the X-bit field in the specific position. If the one-bit flag indicates 1, the terminal-specific control channel schedules UL data; in this case, the Y-bit field in a specific position indicates the end OFDM symbol (or interval length) of the UL data channel; and the terminal may receive the terminal-specific control channel and may determine the end OFDM symbol of the UL data channel from the Y-bit field in the specific position. The terminal may determine that the X-bit field and the Y-bit field have the same position and the same bit number, and may receive the same accordingly.

Figure 2H:
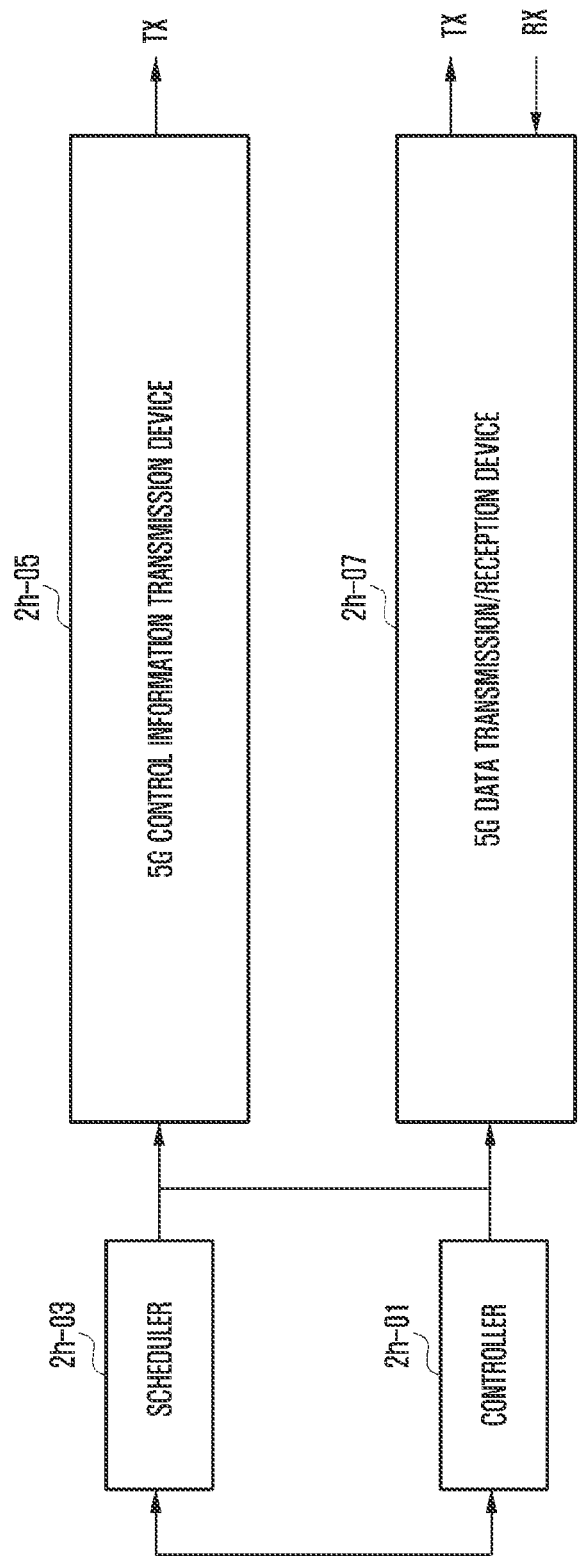
FIG. 2H illustrates a base station device according to the disclosure.

Next, FIG. 2H illustrates a base station device according to the disclosure.

The controller 2h-01 controls UL/DL data transmission/reception resources according to the base station procedure illustrated FIG. 2E and FIG. 2G of the disclosure and the method for transmitting/receiving UL/DL data illustrated in FIG. 2D and FIG. 2F of the disclosure, transmits the same to a terminal through a 5G control information transmission device 2h-05, and schedules 5G data by a scheduler 2h-03 so as to transmit/receive 5G data to/from the 5G terminal through a 5G data transmission/reception device 2h-07.

Figure 2I:
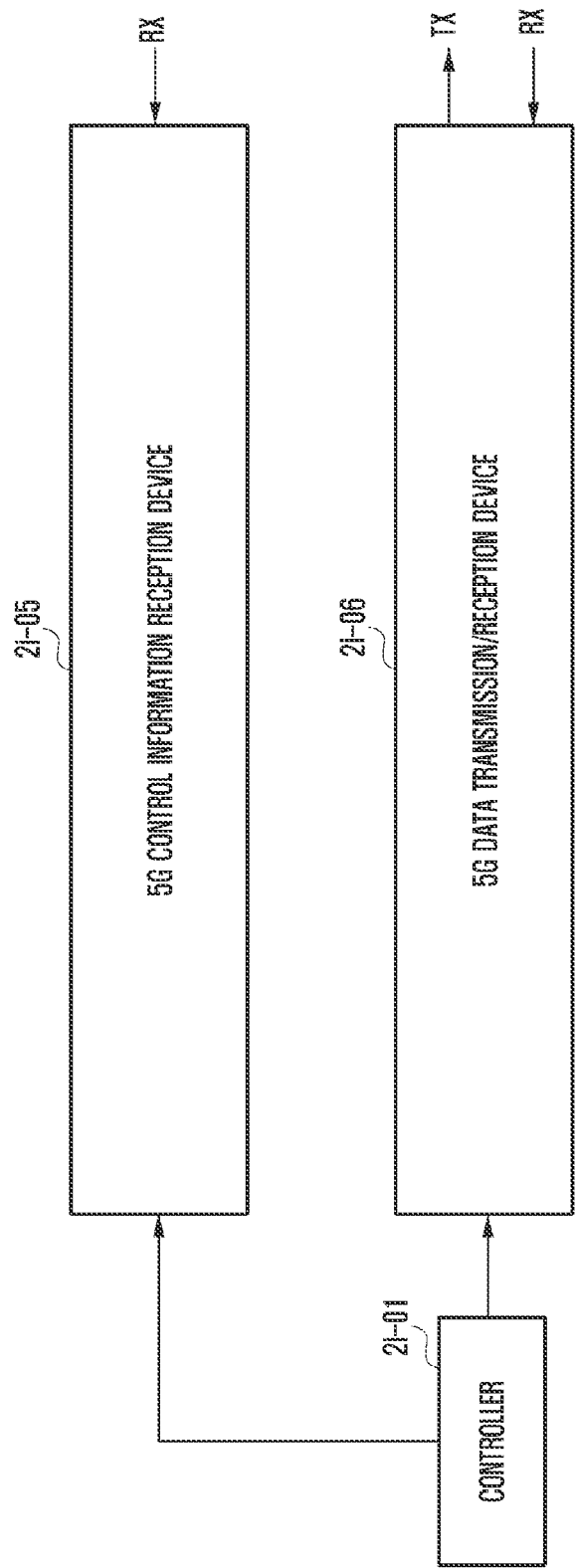
FIG. 2I illustrates a terminal device according to the disclosure.

Next, FIG. 2I illustrates a terminal device according to the disclosure.

According to the terminal procedure illustrated in FIG. 2E and FIG. 2G of the disclosure and the method for transmitting/receiving UL/DL data illustrated in FIG. 2D and FIG. 2F of the disclosure, the same receives a UL/DL data transmission/reception resource position from the base station through a 5G control information reception device 2i-05, and the controller 2i-01 transmits/receives 5G data, which has been scheduled in the received resource position, to/from the 5G base station through a 5G data transmission/reception device 2i-06.

<Third Embodiment>

A wireless communication system has developed beyond the voice-based service provided at the initial stage into a broadband wireless communication system that provides high-speed and high-quality packet data services compliant with communication standards such as high-speed packet access (HSPA) of 3GPP, long-term evolution (LTE) or evolved universal terrestrial radio access (E-UTRA), LT E-advanced (LTE-A), high-rate packet data (HRPD) of 3GPP2, ultra-mobile broadband (LMB), and 802.16e of IEEE, and the like. Also, communication standards of 5G or new radio (NR) are being developed as a 5G wireless communication system.

In such a wireless communication system, including 5G, a terminal may be provided with at least one service among enhanced mobile broadband (eMBB), massive machine-type communications (mMTC), and ultra-reliable and low-latency communications (URLLC). Such services may be provided to the same terminal during the same time interval. In the embodiment, the eMBB may be a service aimed at high-speed transmission of large-capacity data, the mMTC may be a service aimed at minimizing terminal power and connecting multiple terminals, and the URLLC, may be a service aimed at high reliability and low latency, but the disclosure is not limited thereto. The above three services may be major scenarios in a system such as an LIT system or a post-LTE 5G/NR (new-radio or next-radio) system. In the embodiment, a method for coexistence between eMBB and URLLC or coexistence between mMTC and URLLC and a device using the same will be described.

When a base station has scheduled, for a terminal, data corresponding to an eMBB service in a specific transmission time interval (TTI), and if a situation has occurred in which URLLC data needs to be transmitted in the TTI, a part of eMBB data may not be transmitted in the frequency band that has already been used to schedule and transmit the eMBB data, and the generated URLLC data may be transmitted in the frequency band. The terminal for which the eMBB has been scheduled and the terminal for which the URLLC has been scheduled may be the same terminal or different terminals. In such a case, a part of the eMBB data that has already been scheduled and transmitted may fail to be transmitted, and the possibility that the eMBB data will be damaged accordingly increases. Therefore, there is a need to determine a method for processing a signal received by the terminal for which the eMBB has been scheduled or the terminal for which the URLLC has been scheduled in such a case, and a method for receiving the signal. Accordingly, in the embodiment, a method for coexistence between different kinds of services will be described, wherein, when information regarding eMBB and information regarding URLLC are scheduled by sharing all or part of a frequency band, when information regarding mMTC and information regarding URLLC are scheduled simultaneously, when information regarding mMTC and information regarding eMBB are scheduled simultaneously, or when information regarding eMBB, information regarding URLLC, and information regarding mMTC are scheduled simultaneously, information regarding respective services can be transmitted.

Hereinafter, embodiments of the disclosure will be described in detail with reference to the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of operators, or customs. Therefore, the definitions of the terms should be made based on the contents throughout the specification. As used herein, a base station refers to an entity that performs terminal resource allocation, and may be at least one of a gNode B, an eNode B, a Node B, a base station (BS), a wireless access unit, a base station controller, a transmission and reception unit (TRP), or a node on a network. A terminal may include user equipment (UE), a mobile station (MS), a cellular phone, a smartphone, a computer, or a multimedia system capable of performing a communication function. In the disclosure, "downlink (DL)" refers to a path of wireless transmission of a signal that a base station transmits to a terminal, and "uplink (UL)" refers to a path of wireless communication of a signal that a terminal transmits to a base station. Although embodiments of the disclosure will be described hereinafter with reference to an exemplary LTE or LTE-A system, embodiments of the disclosure are also applicable to other communication systems having similar technical backgrounds or channel types. For example, the $5^{th}$ generation mobile communication technology (5G new radio (NR)) that is developed as post-LTE-A may belong thereto. In addition, embodiments of the disclosure may be applied to other communication systems through a partial modification that is not deemed by a person skilled in the art to substantially deviate from the scope of the disclosure.

An LTE system, which is a representative example of the broadband wireless communication system, employs an orthogonal frequency division multiplexing (OFDM) scheme for a downlink (DL), and employs a single carrier frequency division multiple access (SC-FDMA) scheme for an uplink (UL). "Uplink" refers to a wireless link through which a terminal (or user equipment (UE) or a mobile station (MS)) transmits data or a control signal to a base station (BS) (or eNodeB), and "downlink" refers to a wireless link through which a base station transmits data or a control signal to a terminal. In the multiple access schemes described above, time-frequency resources for carrying data or control information are allocated and operated in a manner that prevents overlapping of the resources, i.e. to establish orthogonality between users, so as to identify data or control information of each user.

When decoding fails at the initial transmission, the LTE system employs a hybrid automatic repeat reQuest (HARQ) scheme that retransmits the corresponding data in a physical layer. According to the HARQ scheme, when the receiver fails to accurately decode data, the receiver transmits information that indicates decoding failure (negative acknowledgement (HACK)) to the transmitter such that the transmitter can retransmit the corresponding data in the physical layer. The receiver combines data retransmitted by the transmitter with data, the decoding of which has previously failed, thereby improving data reception performance. Also, when the receiver accurately decodes data, the receiver may transmit information that indicates successful decoding (acknowledgement (ACK)) to the transmitter such that the transmitter can transmit new data.

Figure 3A:
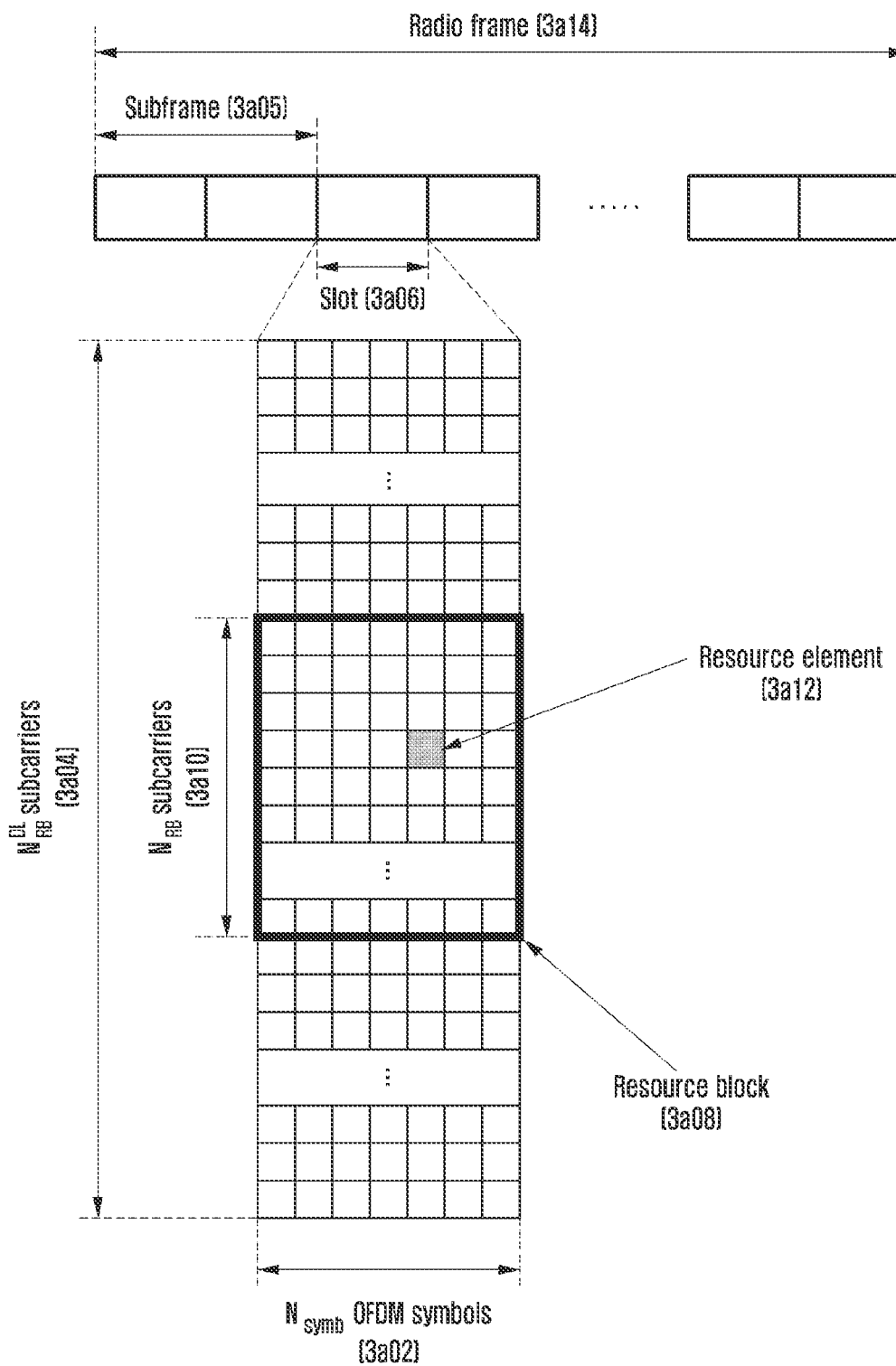
FIG. 3A illustrates a downlink time-frequency domain transmission structure of an LTE or LTE-A system.

FIG. 3A illustrates the basic structure of a time-frequency domain, which is a radio resource domain where data or a control channel is transmitted in a downlink of an LTE system or a system similar thereto.

Referring to FIG. 3A, the horizontal axis indicates the time domain, and the vertical axis indicates the frequency domain. The smallest transmission unit in the time domain is an OFDM symbol, $N_{symb}$ OFDM symbols 3a02 constitute one slot 3a06, and two slots constitute one subframe 3a05. The length of each slot is 0.5 ms, and the length of each subframe is 1.0 ms. The radio frame 3a14 is a time-domain unit including ten subframes. The smallest transmission unit in the frequency domain is a subcarrier, and the bandwidth of the entire system transmission bandwidth includes a total of $N_{BW}$ subcarriers 3a04. However, such specific numerical values may be applied variably.

In the time-frequency domain, the basic resource unit is a resource element (RE) 3a12, which may be expressed by an OFDM symbol index and a subcarrier index. A resource block (RB) (or physical resource block (PRB)) 3a08 is defined by $N_{symb}$ consecutive OFDM symbols 3a02 in the time domain and $N_{RB}$ consecutive subcarriers 3a10 in the frequency domain. Therefore, one RB 3a08 in one slot may include $N_{symb} \times N_{RB}$ REs 3a12. Generally, the minimum frequency-domain allocation unit of data is the RB unit, and in the LTE system, generally, $N_{symb}=7$ and $N_{RB}=12$, and $N_{BW}$ and $N_{RB}$ may be proportional to the bandwidth of the system transmission band. The data rate increases in proportion to the number of RBs that are scheduled for the terminal. An LTE system may define and operate six transmission bandwidths. In the case of an FDD system that separately operates the downlink and the uplink on the basis of frequency, the downlink transmission bandwidth and the uplink transmission bandwidth may differ from each other. The channel bandwidth denotes an RF bandwidth corresponding to the system transmission bandwidth. Table 3 provided below indicates a correlation between a system transmission bandwidth and a channel bandwidth defined in the LTE system. For example, in the case of are LTE system having a channel bandwidth of 10 MHz, the transmission bandwidth may include 50 RBs.

TABLE 3

| Channel bandwidth $BW_{Channel}$ [MHz] | 1.4 | 3 | 5 | 10 | 15 | 20 |
|---|---|---|---|---|---|---|
| Transmission bandwidth configuration $N_{RB}$ | 6 | 15 | 25 | 50 | 75 | 100 |

Downlink control information may be transmitted within the initial N OFDM symbols inside the subframe. In the embodiment, generally N={1,2,3}. Therefore, the value of N may be variably applied for each subframe according to the amount of control information to be transmitted in the current subframe. The transmitted control information may include a control channel transmission interval indicator indicating the number of OFDM symbols across which control information is transmitted, scheduling information associated with downlink data or uplink data, and a HARQ ACK/NACK signal.

In the LTE system, scheduling information associated with downlink data or uplink data is transmitted from a base station to a terminal via downlink control information (DCI). The DCI is defined according to various formats and may indicate, according to each format, whether scheduling information regarding uplink data (UL grant) or scheduling information regarding downlink data (DL grant) is used, whether or not a compact DCI having a small control information size is used, whether or not spatial multiplexing using multiple antennas is applied, and whether or not a DCI for power control is used. For example, DCI format 1 corresponding to scheduling control information regarding downlink data (DL grant) may include at least the following pieces of control information.

Resource allocation type 0/1 flag: indicates whether the resource allocation scheme is type 0 or type 1. Type 0 applies a bitmap scheme and allocates resources in units of resource block groups (RBGs). In the LTE system, the basic unit of scheduling is an RB expressed by time and frequency domain resources, and an RBG includes multiple RBs and is used as a basic unit of scheduling in the type 0 scheme. Type 1 is used to allocate a specific RB inside the RBG.

Resource block assignment: indicates RBs assigned to data transmission. Expressed resources are determined according to the system bandwidth and the resource allocation scheme.

Modulation and coding scheme (MCS): indicates the modulation scheme used for data transmission and the size of the transport block (TB), which is the data to be transmitted.

HARQ process number: indicates the process number of the HARQ.

New data indicator: indicates HARQ initial transmission or retransmission.

Redundancy version: indicates the redundancy version of the HARQ.

Transmit power control (TPC) command for physical uplink control channel (PUCCH): indicates a transmit power control command regarding a PUCCH, which is an uplink control channel.

The DCI may undergo channel coding and modulation processes and may be transmitted through a physical downlink control channel (PDCCH), which is a downlink physical control channel (or control information, which will hereinafter be used interchangeably), or through an enhanced PDCCH (EPDCCH) (or enhanced control information, which will hereinafter be used interchangeably).

In general, the DCI is scrambled by a specific radio network temporary identifier (RNTI) (or terminal identifier) independently of each terminal, a cyclic redundancy check (CRC) is added thereto, the DCI is channel-coded, and the DCI is then configured as each independent PDCCH and transmitted. In the time domain, the PDCCH is mapped and transmitted during the control channel transmission interval. The frequency domain mapping position of the PDCCH is determined by the identifier (ID) of each terminal, and may be distributed across the entire system transmission band and transmitted.

The downlink data may be transmitted through a physical downlink shared channel (PDSCH), which is a physical channel dedicated to downlink data transmission. The PDSCH may be transmitted after the control channel transmission interval, and scheduling information such as the specific mapping position in the frequency domain and the modulation scheme is determined on the basis of the DCI transmitted through the PDCCH.

By using an MCS among the control information constituting the DCI, the base station notifies the terminal of the modulation scheme applied to the PDSCH to be used for transmission and the size of the data to be transmitted (transport block size (TBS)). In an embodiment, the MCS may include five bits, or more or fewer bits. The TBS corresponds to the size before channel coding for error correction is applied to the data (transport block (TB)) to be transmitted by the base station.

The modulation scheme supported by the LTE system includes quadrature phase shift keying (QPSK), 16 quadrature amplitude modulation (QAM), and 64QAM, and modulation orders ($Q_m$) thereof correspond to 2, 4, and 6 respectively. That is, in the case of the QPSK modulation, 2 bits can be transmitted per symbol; in the case of the 16QAM modulation, 4 bits can be transmitted per symbol; and in the case of 64QAM modulation, 6 bits can be transmitted per symbol. It is also possible to use a modulation scheme of 256QAM or higher according to system modification.

Figure 3B:
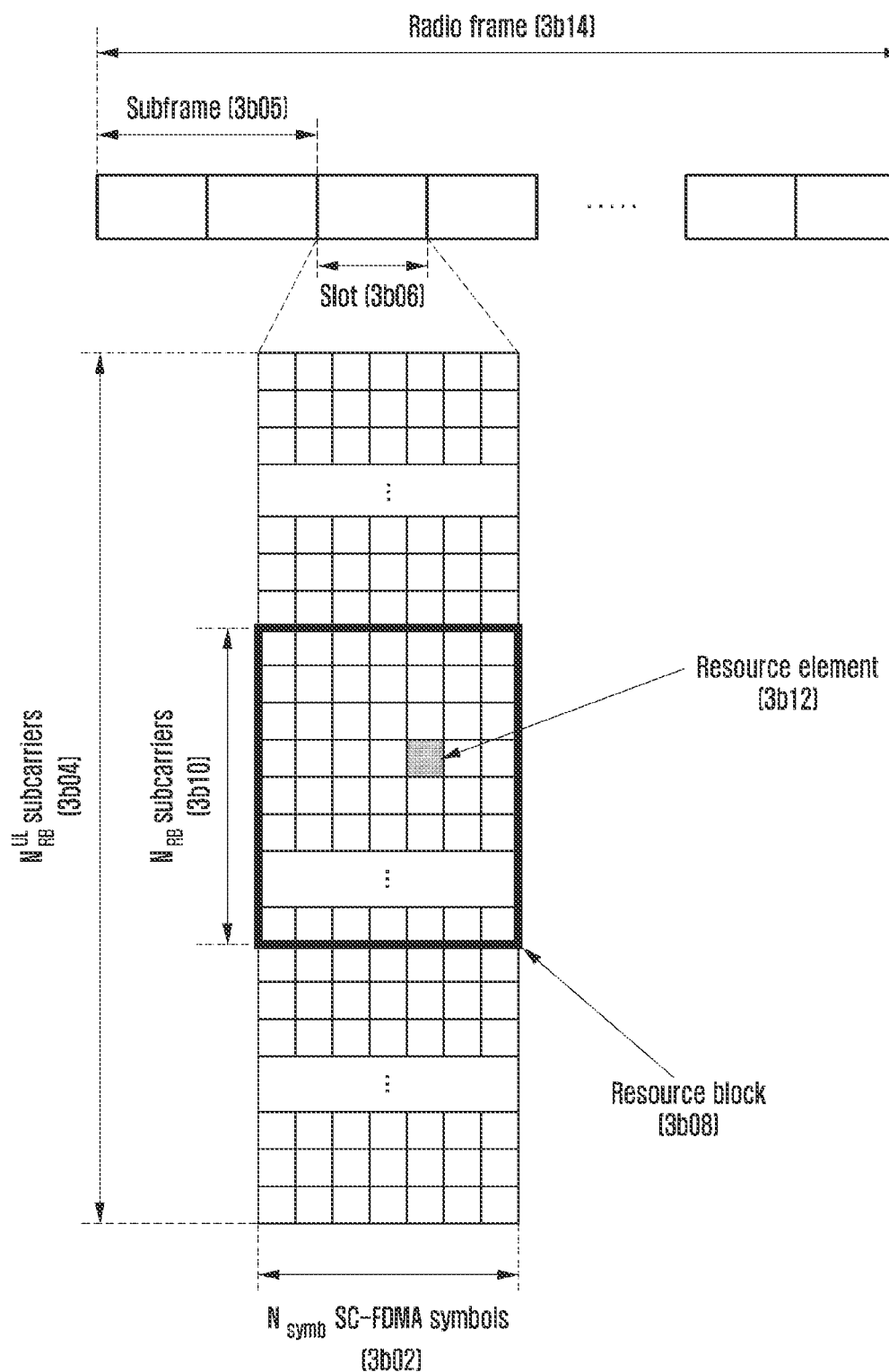
FIG. 3B illustrates an uplink time-frequency domain transmission structure of an LTE or LTE-A system.

FIG. 3B illustrates the basic structure of a time-frequency domain, which is a radio resource domain where data or a control channel is transmitted in an uplink of an LTE system.

Referring to FIG. 3B, the horizontal axis indicates the time domain, and the vertical axis indicates the frequency domain. The smallest transmission unit in the time domain is an SC-FDMA symbol 3b02, and $N_{symbol}$ SC-FDMA symbols may constitute one slot 3b06. Two slots constitute one subframe 3b05. The smallest transmission unit in the frequency domain is a subcarrier, and the entire system transmission bandwidth 3b04 includes a total of $N_{BW}$ subcarriers. The $N_{BW}$ may have a value proportional to the system transmission band.

In the time-frequency domain, the basic resource unit is a resource element (RE) 3b12, which may be expressed by an SC-FDMA symbol index and a subcarrier index, A resource block pair (RB pair) 3b08 may be defined by $N_{symbol}$ consecutive SC-FDMA symbols in the time domain and $N_{scRB}$ consecutive subcarriers in the frequency domain. Therefore, one RB includes $N_{symbol} \times N_{scRB}$ REs. Generally, the minimum transmission unit of data or control information is the RB unit. In the case of PUCCH, the same is mapped to a frequency domain corresponding to one RB and transmitted during one subframe.

In an LTE system, there may be defined a timing relationship of a PUCCH or PUSCH which is an uplink physical channel for transferring an HARQ ACK/NACK, and which corresponds to a PDSCH that is a physical channel for downlink data transmission or a PDCCH/EPDDCH that includes semi-persistent scheduling release (SPS release). For example, in an LTE system that operates according to frequency division duplex (FDD), an HARQ ACK/NACK corresponding to a PDSCH transmitted in the $(n-4)^{th}$ subframe or a PDCCH/EPDCCH including SPS release may be transmitted through a PUCCH or PUSCH in the $n^{th}$ subframe.

The downlink HARQ in an LTE system adopts an asynchronous HARQ type in which the data retransmission timepoint is not fixed. That is, when a base station has received a feedback of HARQ NACK from a terminal in response to initially transmitted data, the base station freely determines the retransmission data transmission timepoint by a scheduling operation. After buffering data that has been determined as erroneous as a result of decoding reception data for an HARQ operation, the terminal may perform combining with the next retransmission data.

If the terminal receives a PDSCH including downlink data transmitted from the base station in subframe n, the terminal transmits uplink control information including the HARQ ACK or NACK of the downlink data in subframe nil to the base station through a PUCCH or PUSCH. In this case, k may be defined differently according to the FDD or time division duplex (TDD) of the system of LTE and the subframe configuration thereof. For example, in the case of an FDD LTE system, k is fixed to 4. In the case of a TDD LTE system, k may vary according to the subframe configuration and the subframe number. In addition, when data is transmitted through multiple carriers, the value of k may be differently applied according to the TDD configuration of each carrier.

In an LTE system, uplink HARQ adopts a synchronous HARQ type in which the data transmission timepoint is fixed, unlike downlink HARQ. That is, the up/downlink timing relationship of a physical uplink shared channel (PUSCH) which is a physical channel for uplink data transmission, a PDCCH which is a downlink control channel preceding the same, and a physical hybrid indicator channel (PHICH) which is a physical channel for transmitting a downlink HARQ ACK/NACK, and which corresponds to the PUSCH, may be transmitted/received according to the following rule.

If the terminal receives a PDCCH including uplink scheduling control information transmitted from the base station in subframe n or a PHICH for transmitting a downlink HARQ ACK/NACK, the terminal transmits uplink data corresponding to the control information in subframe n+k through a PUSCH. In this case, k may be defined differently according to the FDD or time division duplex (TDD) of the system of LTE and the subframe configuration thereof. For example, in the case of an FDD LTE system, k may be fixed to 4. In the case of a TDD LTE system, k may vary according to the subframe configuration and the subframe number. In addition, when data is transmitted through multiple carriers, the value of k may be differently applied according to the TDD configuration of each carrier.

In addition, if the terminal receives a PHICH including information regarding a downlink HARQ ACK/NACK from the base station in subframe i, the PHICH corresponds to the PUSCH transmitted by the terminal in subframe i-k. In this case, k may be defined differently according to the FDD or TDD of the system of LTE and the configuration thereof. For example, in the case of an FDD LTE system, k is fixed to 4. In the case of a TDD LTE system, k may vary according to the subframe configuration and the subframe number. In addition, when data is transmitted through multiple carriers, the value of k may be differently applied according to the TDD configuration of each carrier.

TABLE 4

| Trans-mission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 (see subclause 7.1.1) |
|  | DCI format 1 | UE specific by C-RNTI | Single-antenna port, port 0 (see subclause 7.1.1) |
| Mode 2 | DCI format 1A | Common and UE specific by C-RNTI | Transmit diversity (see subclause 7.1.2) |
|  | DCI format 1 | UE specific by C-RNTI | Transmit diversity (see subclause 7.1.2) |
| Mode 3 | DCI format 1A | Common and UE specific by C-RNTI | Transmit diversity (see subclause 7.1.2) |
|  | DCI format 2A | UE specific by C-RNTI | Large delay CDD (see subclause 7.1.3) or Transmit diversity (see subclause 7.1.2) |
| Mode 4 | DCI format 1A | Common and UE specific by C-RNTI | Transmit diversity (see subclause 7.1.2) |
|  | DCI format 2 | UE specific by C-RNTI | Closed-loop spatial multiplexing (see subclause 7.1.4) or Transmit diversity (see subclause 7.1.2) |
| Mode 5 | DCI format 1A | Common and UE specific by C-RNTI | Transmit diversity (see subclause 7.1.2) |
|  | DCI format 1D | UE specific by C-RNTI | Multi-user MIMO (see subclause 7.1.2) |
| Mode 6 | DCI format 1A | Common and UE specific by C-RNTI | Transmit diversity (see subclause 7.1.2) |
|  | DCI format 1B | UE specific by C-RNTI | Closed-loop spatial multiplexing (see subclause 7.1.4) using a single transmission layer |
| Mode 7 | DCI format 1A | Common and UE specific by C-RNTI | If the number of PBCH antenna ports is one, Single-antenna port, port 0 is used (see subclause 7.1.1), otherwise Transmit diversity (see subclause 7.1.2) |
|  | DCI format 1 | UE specific by C-RNTI | Single-antenna port, port 5 (see subclause 7.1.1) |
| Mode 8 | DCI format 1A | Common and UE specific by C-RNTI | If the number of PBCH antenna ports is one, Single-antenna port, port 0 is used (see subclause 7.1.1), otherwise Transmit diversity (see subclause 7.1.2) |
|  | DCI format 2B | UE specific by C-RNTI | Dual layer transmisson port 7 and 8 (see subclause 7.1.5A) or single-antenna port, port 7 or 8 (see subclause 7.1.1) |

Table 4 above enumerates DCI format types that can be supported according to respective transmission modes under conditions configured by C-RNTI that follows 3GPP TS 36.213 (PDCCH and PDSCH configured by C-RNTI). The terminal assumes that the corresponding DCI format exists in a control space interval according to a preconfigured transmission mode, and then performs searching and decoding. For example, if transmission mode 8 is indicated to the terminal, the terminal searches for DCI format 1A in the common search space and the UE-specific search space, and searches for DCI format 2B only in the UE-specific search space.

The above description of a wireless communication system has been made with reference to an LTE system, and the content of the disclosure is not limited to the LTE system, and is also applicable to various wireless communication systems such as NR and 5G. In addition, when applied to a different wireless communication system in an embodiment, the value of k may be changed and applied also to a system using a modulation type corresponding to FDD.

Figure 3C:
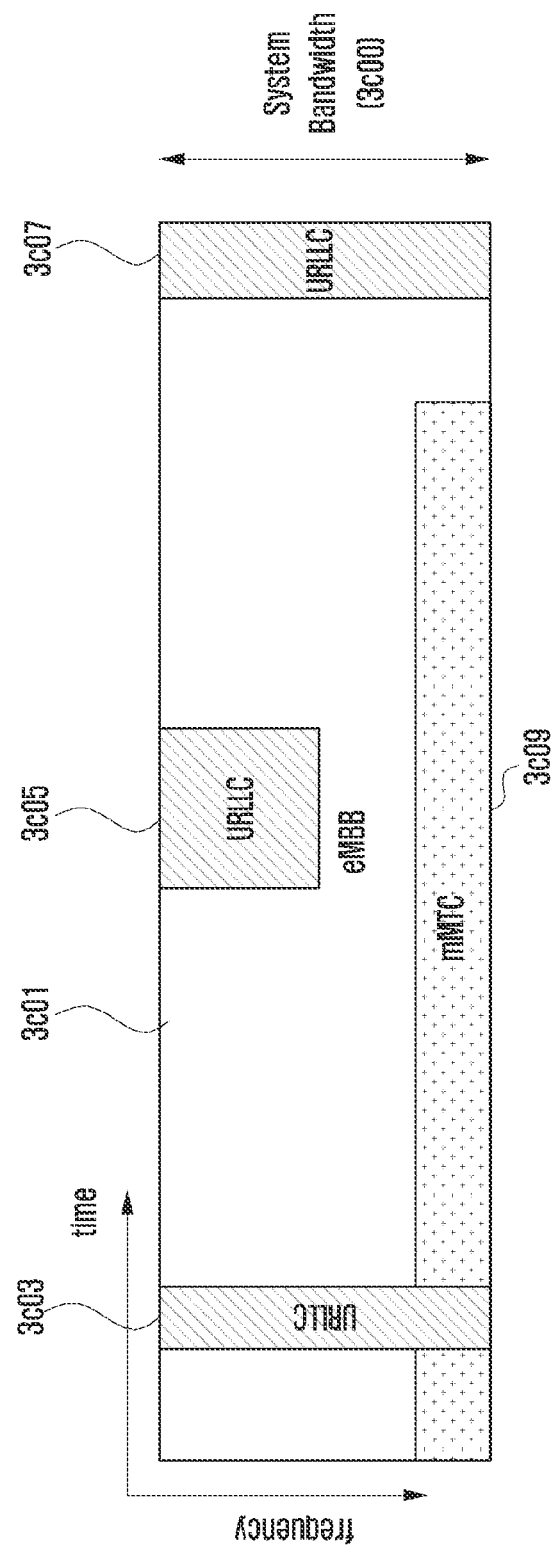
FIG. 3C illustrates allocation of pieces of data for eMBB, URLLC, and mMTC in connection with a frequency-time resource in a communication system.
Figure 3D:
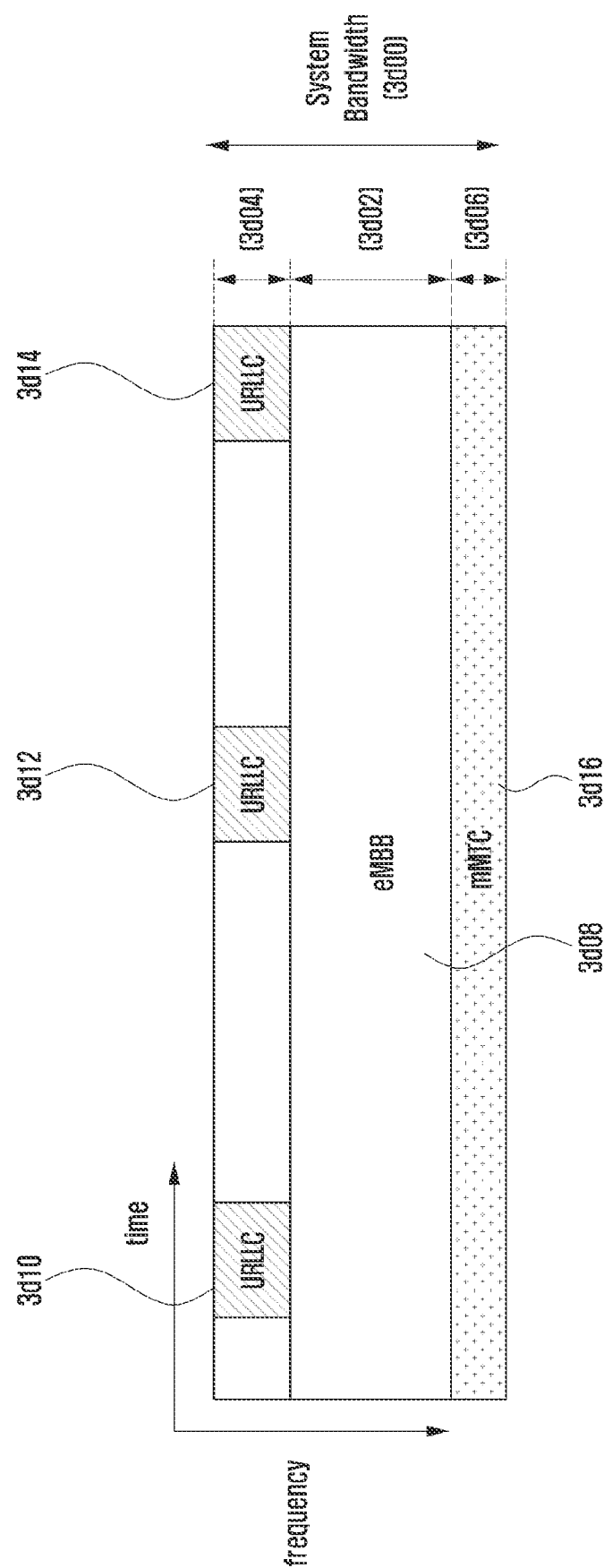
FIG. 3D illustrates allocation of pieces of data for eMBB, URLLC, and mMTC in connection with a frequency-time resource in a communication system.

FIG. 3C and FIG. 3D illustrate allocation of pieces of data for eMBB, URLLC, and mMTC, which are services considered in a 5G or NR system, in connection with a frequency-time resource.

Referring to FIG. 3C and FIG. 3D, types of allocation of frequency and time resources for information transmission in respective systems are illustrated.

Firstly, FIG. 3C illustrates allocation of data for eMBB, URLLC, and MMTC in the entire system frequency band 3c00. If URLLC data 3c03, 3c05, and 3c07 is generated and needs to be transmitted while eMBB 3c01 and mMTC 3c09 are allocated and transmitted in a specific frequency band, the URLLC data 3c03, 3c05, and 3c07 may be transmitted after emptying the parts to which eMBB 3c01 and mMTC 3c09 have already been allocated or without transmitting the same. Since the URLLC among the services needs to have reduced latency, the URLLC data 3c03, 3c005, and 3c07 may be allocated to a part of the resource 3c01 to which eMBB has been allocated, and then transmitted. Obviously, if URLLC is additionally allocated to the resource to which eMBB has been allocated and then transmitted, eMBB data may not be transmitted in the overlapping frequency-time resource, and the eMBB data transmission performance may degrade accordingly. That is, in the above case, URLLC allocation may result in eMBB data transmission failure.

In FIG. 3D, the entire system frequency hand 3d00 may be divided and used to transmit services and data in respective sub-bands 3d02, 3d04, and 3d06. Information regarding the sub-band configuration may be determined in advance, and the information may be transmitted from the base station to the terminal through upper-level signaling. Alternatively, in connection with information regarding the sub-bands, the base station or network node may arbitrarily divide and provide services to the terminal without transmitting any separate sub-hand configuration information. In FIG. 3D, the sub-hand 3d02 is used to transmit eMBB data, the sub-band 3d04 is used to transmit URLLC data, and the sub-band 3d06 is used to transmit mMTC.

The length of the transmission time interval (TTI) used for URLLC transmission throughout the entire embodiment may be smaller than the length of the TTI used to transmit eMBB or mMTC. In addition, a response to information regarding URLLC may be transmitted faster than in the case of eMBB or mMTC, and information can accordingly be transmitted/received with low latency.

The eMBB service described hereinafter will be referred to as a first-type service, and data for eMBB will be referred to as first-type data. The first-type service or first-type data is not limited to eMBB, and may also correspond to a case in which high-speed data transmission is required, or wideband transmission is conducted. In addition, a URLLC service will be referred to as a second-type service, and data for URLLC will be referred to as second-type data. The second-type service or second-type data is not limited to URLLC, and may also correspond to a case in which low latency is required or high-reliability transmission is required, or to a different system in which low latency and high reliability are both required. In addition, the mMTC service will be referred to as a third-type service, and data for mMTC will be referred to as third-type data. The third-type service or third-type data is not limited to mMTC, and may also correspond to a case in which a low speed, wide coverage, or low power is required. In addition, in the description of an embodiment, the first service may be understood as including the third type service or not including the same.

Physical layer channels used for respective types to transmit the three kinds of services or data may have different structures. For example, at least one of the length of the TTI, the frequency resource allocation unit, the control channel structure, and the data mapping method may differ.

Although three kinds of services and three kinds of data have been described above, more kinds of services and data corresponding thereto may exist, and the content of the disclosure is also applicable to such cases.

The terms "physical channels" and "signals" in a conventional LTE or LTE-A system may be used to describe a method and a device proposed in an embodiment. However, the content of the disclosure is also applicable to a wireless communication system other than LTE and LTE-A systems.

An embodiment defines, as described above, transmission/reception operations of a terminal and a base station for transmitting first-, second-, and third-type services or data, and proposes a detailed method for operating terminals that receive different types of services or data scheduling together in the same system. As used herein, "first-, second-, and third-type terminals" refer to terminals that receive first-, second-, and third-types of services or data scheduling, respectively. In an embodiment, the first-, second-, and third-type terminals may be the same terminal or different terminals.

In the following embodiment, at least one of the uplink scheduling grant signal and the downlink data signal will be referred to as a first signal. In addition, at least one of the uplink data signal regarding the uplink scheduling grant and the HARQ ACK/NACK regarding the downlink data signal will hereinafter be referred to as a second signal in the disclosure. In an embodiment, among signals transmitted from the base station to the terminal, a signal that expects a response from the terminal may be the first signal, and a response signal of the terminal corresponding to the first signal may be the second signal. In an embodiment, furthermore, the service type of the first signal may be at least one of eMBB, URLLC, and mMTC, and the second signal may also correspond to at least one of the services.

In the following embodiment, the TTI length of the first signal may indicate the length of time for which the first signal is transmitted, as a time value related to first signal transmission. In addition, in the disclosure, the TTI length of the second signal may indicate the length of time for which the second signal is transmitted, as a time value related to second signal transmission, and the TTI length of the third signal may indicate the length of time for which the third signal is transmitted, as a time value related to third signal transmission. Furthermore, in the disclosure, second signal transmission timing corresponds to information regarding when the terminal transmits the second signal and when the base station receives the second signal, and may be referred to as second signal transmission/reception timing.

The content in the disclosure is applicable in FDD and TDD systems.

As used herein, upper-level signaling is a signal transfer method wherein the base station transfers a signal to the terminal by using the downlink data channel of the physical layer, or the terminal transfers a signal to the base station by using the uplink data channel of the physical layer, and may also be referred to as RRC signaling, PDCP signaling, or MAC control element (MAC CE).

The content in the disclosure is applicable in FDD and TDD systems.

Figure 3E:
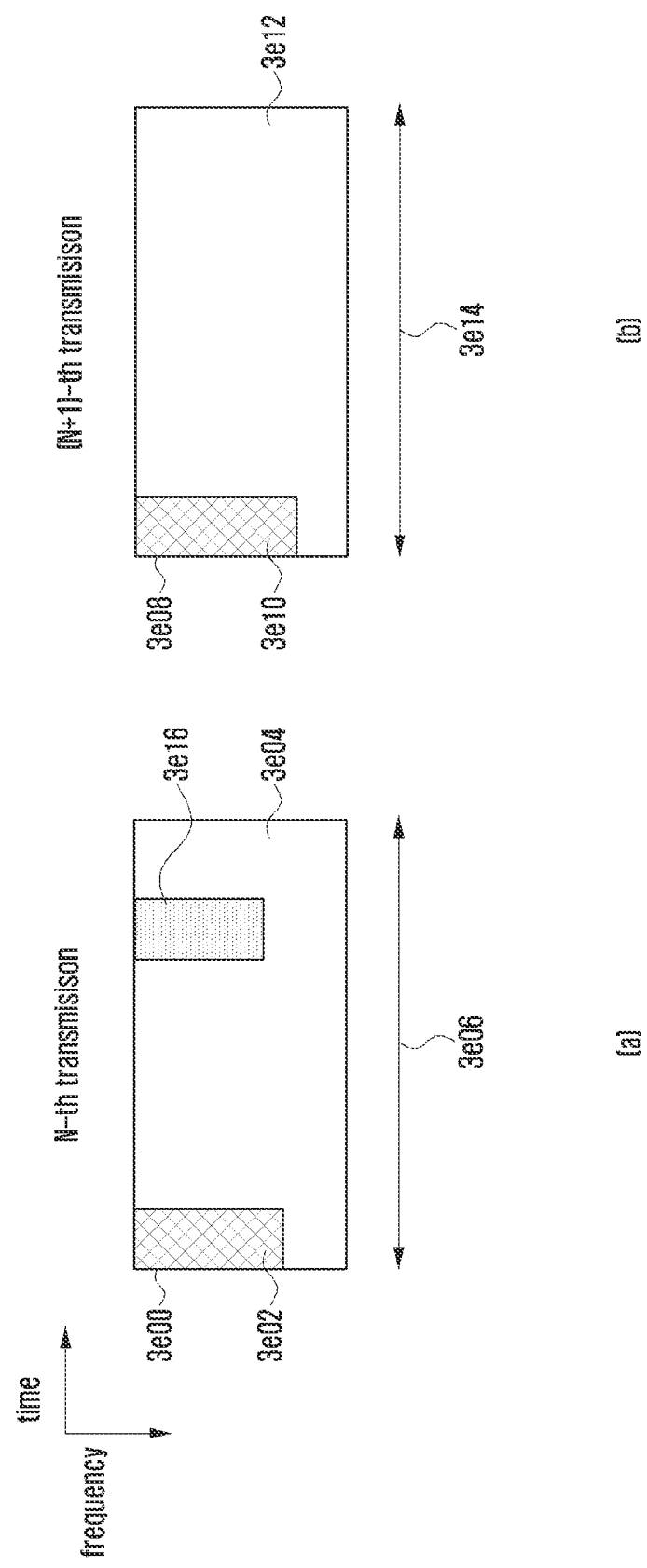
FIG. 3E illustrates control and data information transfer.

FIG. 3E illustrates control and data information transfer.

FIG. 3EA and FIG. 3EB illustrate situations wherein a transport block (TB) of the first service type is transmitted through the downlink in the $N^{th}$ transport interval 3e06 and in the $(N+1)^{th}$ transport interval 3e14, respectively. The $N^{th}$ transport interval 3e06 includes a control area 3e02 and a data area 3a16, and the control area 3e02 provides the terminal, in advance, with all or part of information regarding the modulation and coding scheme (MCS) of the transport block of the first service type, the hybrid ARQ (HARQ) process number, resource block (RB) allocation, and the start position (symbol or slot or mini-slot) and the end position (symbol or slot or semi-slot) of the corresponding data area 3e16. In the $N^{th}$ transport interval 3e06, the control area 3e02 and the data area 3e16 may have the same frequency resource, different frequency resources, or partially identical frequency resource, depending on the case. The case in which N is 1 corresponds to a situation in which the transport block of the first service type is initially transmitted, and the case in which N is larger than 2 indicates a situation in which the transport block of the first service type is retransmitted. The $(N+1)^{th}$ transport interval 3e14 indicates a situation wherein the transport block of the first service type, which has been transmitted in the $N^{th}$ transport interval 3e06, is transmitted again. Such a situation of retransmission may correspond to a case wherein the transport block of the first service type, which has been transferred to the base station from the terminal in the $N^{th}$ transport interval 3e06, fails to be received. The $(N+1)^{th}$ transport interval 3e14 includes a control area 3e10 and a data area 3e12. The transport block of the first service type is positioned in the data area 3e04 in the $N^{th}$ transport interval 3e06 and in the data area 3e12 in the $(N+1)^{th}$ transport interval 3e14, respectively. There may be a situation wherein a transport block of a second service type, which is different from the first service type, occurs in the $N^{th}$ transport interval 3e06, and a part of the data area 3e04, to which a previously scheduled transport block of the first service type has been allocated, is used for a transport block of the second service type. Accordingly, the transport block of the first service type, which has been allocated to the data area 3e04 of the $N^{th}$ transport interval 3e04, may be partially broken by the resource area 3e16 used for the transport block of the second service type. That is, when the terminal receives the transport block of the first service type, decoding of code blocks (CBs) constituting the corresponding transport block may partially fail.

The first service type may be eMBB or mMTC, for example, and the second service type may be URLLC. When the terminal fails to decode some of the code blocks constituting the transport block of the first service type, the terminal reports to the base station that decoding of the transport block including the corresponding code blocks has failed. In the $(N+1)^{th}$ transport interval 3e14, the transport block of the first service type, which has failed to be transmitted in the $N^{th}$ transport interval 3e06, is transmitted again. In addition, information regarding whether the data area 3e12 of the $(N+1)^{th}$ transport interval 3e10 is a retransmitted transport block or a new transport block in the control area 3e10 of the $(N+1)^{th}$ transport interval 3e14 is included in the DCI of the control area 3e10 and transferred to the terminal. In LTE, bit information referred to as a new data indicator (NDI) provides information thereon. If the terminal confirms retransmission with reference to the NDI, the pre-decoding value (or raw data) of the transport block received in the previous transport interval and the pre-decoding value (or raw data) of the transport block received in the current transport interval are HARQ-combined, thereby performing decoding. This is for the purpose of increasing the probability of successful decoding. However, the HARQ combining is not to be performed in a situation wherein the transport block of the second service type occupies a part of the data area which has already been allocated for the transport block of the first service type. This is because some or all of several arbitrary code blocks of the transport block of the first service type could be interpreted as being replaced by a transport block of the second service type. Accordingly, if the terminal conducts the HARQ combining after determining that the $(N+1)^{th}$ transmission is retransmission of the $N^{th}$ transmission, code blocks having different pieces of information may end up being combined. Therefore, in such a situation, decoding is preferably performed only by the same code blocks transmitted in the $(N+1)^{th}$ transport interval without HARQ-combining code blocks constituting the transport block of the first service type, which have been damaged by the transport block of the second service type. For example, if the $i^{th}$ code block of the transport block of the first service type in the $N^{th}$ transport interval is damaged by the transport block of the second service type, the $i^{th}$ code block retransmitted in the $(N+1)^{th}$ transport interval is solely decoded without HARQ-combining the $i^{th}$ code block of the transport block of the first service type, which has been transmitted again in the $(N+1)^{th}$ transport interval, with the $i^{th}$ code block that has been damaged in the $N^{th}$ transport interval. Accordingly, the DCI needs to include information for additionally determining whether or not to perform HARQ combining.

In the disclosure, such information is referred to as a second service type occurrence indicator (or HARQ-combining indicator). For example, if the HARQ-combining indicator in the DCI that indicates retransmission is 0, the terminal considers that combining of the transport block of the previous transport interval and the transport block of the current transport interval is not to be performed. In contrast, if the HARQ-combining indicator in the DCI that indicates retransmission is 1, the terminal considers that combining of the transport block of the previous transport interval and the transport block of the current transport interval is not to be performed. It is to be noted that the value of the HARQ-combining indicator in this example can be applied interchangeably. The HARQ-combining indicator may be one-bit information as in the above example, and may also be information including more bits. One-bit information alone may be sufficient to indicate whether or not HARQ combining is to be performed. The corresponding HARM-combining indicator may always be included in the DCI that is transmitted through the control area across the entire system frequency band, or may be included only in the DCI that is transmitted in the frequency band in which the second service type can be transmitted. In addition, only base stations capable of supporting the second service type can transmit a DCI including the corresponding HARQ-combining indicator.

The above-mentioned HARQ-combining indicator may have information, to which one bit is separately added, in the DCI. As another example, since the HARQ-combining indicator corresponds to an operation applied if the information indicated by the NDI indicates retransmission, the DCI constituent elements may be interpreted differently according to the value indicated by the NDI without adding a separate bit for the HARQ-combining indicator. That is, if the NDI indicates retransmission, some of various elements constituting the DCI of LTE, such as the HARQ process number, MCS or RB allocation, and RV, may be utilized as the HARQ-combining indicator. When the NDI indicates retransmission, the MCS is capable of an operation of selecting one from 29-31 as the $I_{MCS}$ value as given in Table 5 below. Table 5 (Modulation and TBS index table for PDSCH) given below is based on Table 7.1.7.1-1 included in document 3GPP TS 36.213-d20.

The TBS size follows the TBS size determined in the previous transmission, and only the modulation order can be changed. When the NDI indicates retransmission, it is possible to utilize only three values, as the MCS value, among 32 cases provided by using a total of five bits in LTE. Accordingly, in post-LTE 5G (NR), next-generation mobile communication, if the NDI indicates retransmission, one bit among the total bit number constituting the MCS may be utilized as the HARQ-combining indicator. In the case of LTE, for example, if the NDI indicates retransmission while a total of five bits is used for the MCS, one bit among the total of five bits constituting the MCS may be used as a bit indicating the HARQ-combining indicator, and the remaining four bits may be utilized to indicate an MCS newly configured in a retransmission situation. If the TBS follows the previous transmission value in the retransmission situation, and if the modulation order is solely changed, only the total number of modulation orders that can be supported in the corresponding system is necessary. If a total of three modulation orders is solely supported in the LTE, retransmission DCI can be supported sufficiently solely by the remaining four bits other than one bit excluded for the HARQ-combining indicator.

TABLE 5

| MCS Index $I_{MCS}$ | Modulation Order $Q_m$ | Modulation Order $Q_n$ | TBS Index $I_{TBS}$ |
|---|---|---|---|
| 0 | 2 | 2 | 0 |
| 1 | 2 | 2 | 1 |
| 2 | 2 | 2 | 2 |
| 3 | 2 | 2 | 3 |
| 4 | 2 | 2 | 4 |
| 5 | 2 | 4 | 5 |
| 6 | 2 | 4 | 6 |
| 7 | 2 | 4 | 7 |
| 8 | 2 | 4 | 8 |
| 9 | 2 | 4 | 9 |
| 10 | 4 | 6 | 9 |
| 11 | 4 | 6 | 10 |
| 12 | 4 | 6 | 11 |
| 13 | 4 | 6 | 12 |
| 14 | 4 | 6 | 13 |
| 15 | 4 | 6 | 14 |
| 16 | 4 | 6 | 15 |
| 17 | 6 | 6 | 15 |
| 18 | 6 | 6 | 16 |
| 19 | 6 | 6 | 17 |
| 20 | 6 | 6 | 18 |
| 21 | 6 | 6 | 19 |
| 22 | 6 | 6 | 20 |
| 23 | 6 | 6 | 21 |
| 24 | 6 | 6 | 22 |
| 25 | 6 | 6 | 23 |
| 26 | 6 | 6 | 24 |
| 27 | 6 | 6 | 25 |
| 28 | 6 | 6 | 26/26A |
| 29 | 2 | 2 | reserved |
| 30 | 4 | 4 | |
| 31 | 6 | 6 | |

Figure 4:
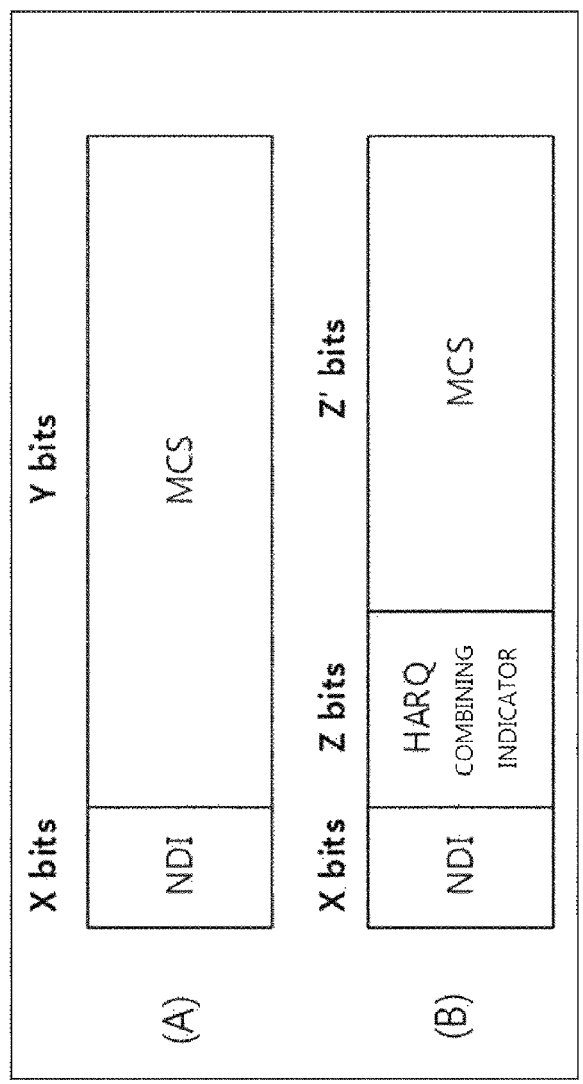
FIG. 4 is schematic diagram of NDIs of an initial transmission situation and a retransmission situation, according to an embodiment.

A schematic diagram of the above-described example is as illustrated in FIG. 4.

Referring to FIG. 4, the NDI shows the initial transmission in (A), and (B) shows a retransmission situation. When the NDI indicates retransmission, the MCS of Y bits used in the initial transmission (specifically, area indicating Modulation and TBS index Table information) is divided into a HARQ-combining indicator of Z bits and a newly configured MCS of Z' bits. It is to be noted that Y=Z+Z'. In LTE, X=1, Y=5. In addition, although Z=1 is considered as the bit number of the HARQ-combining indicator in the disclosure, other values can also be considered. The MCS expressed in the following diagram may be utilized sufficiently as information constituting a different DCI.

As another example, it is also possible to utilize one-bit configuration among information allocated to MCS, HARQ process, and RB allocation as the HARQ-combining indicator. That is, it is possible to configure a total of five bits for the MCS and to use a total of 32 cases, and if not all of the 32 cases but only some thereof are used, the cases that are not used may be used for the HARQ-combining indicator. That is, it may be interpreted that, if a bit configuration configured as 11010 is not used as MCS information, the corresponding information indicates the HARQ-combining indicator. The above example is sufficiently applicable in the same manner to another constituent element of different DCI information.

The disclosure proposes a method for minimizing the influence of a service of a second service type on a terminal that supports a first service type. The above-described code blocks may all be interpreted as a unit constituting a transport block of the first service type. The above-described HARQ-combining indicator may also be used as a term of a second service type occurrence indicator, an HARQ indicator, or a combining indicator. In addition, the HARQ-combining indicator may be added to a specific format or all of formats of a DCI positioned in a downlink control area and utilized accordingly. The HARQ-combining indicator may exit in such a manner that one bit is added to an existing DCI field, or may be configured such that the same is added to MCS, HARQ process, and RB allocation among elements constituting the existing DCI. For example, some of bits constituting the MCS may be utilized as the HARQ-combining indicator. The DCI including the HARQ-combining indicator may exist in the entire frequency band supported by the terminal or in only a part of the frequency band. Alternatively, the base station may provide a DCI configuration including the HARQ-combining indicator to all terminals or to each terminal by means of high-layer signaling such as MAC CE, SIB, or RRC. Instead of being included in the DCI as explicit bit information, the HARQ-combining indicator may be transferred to a group of terminals or to each terminal semi-statically in the form of MAC CE, SIB, or RRC. Accordingly, if the HARQ-combining indicator is received semi-statically, the retransmitted transport block may operate in such a manner that HARQ combining is always performed or is not performed during a predetermined interval.

Moreover, the HARQ-combining indicator may be supported implicitly. That is, if a specific value is indicated by a combination or individual states of elements constituting a specific MCS, specific HARQ process, RB allocation, or another DCI field, the terminal may interpret the same as an operation of performing or not performing HARQ combining. For example, if specific values among values constituting the MCS are denoted, or if specific bits among all bits constituting the MCS indicate a specific value, the terminal may interpret the same as an operation of performing or not performing HARQ combining. Alternatively, according to the position or range of the frequency or time of a resource from which a DCI field has been detected, the terminal may interpret the same as an operation of performing or not performing HARQ combining. Alternatively, according to the position or range of the frequency or time of a data area resource allocated to a transport interval before a retransmission DCI is received, the terminal may interpret the same as an operation of performing or not performing HARQ combining. Alternatively, according to the number of code blocks constituting a transport block, the terminal may interpret the same as an operation of performing or not performing HARQ combining. Alternatively, according to the number of all code blocks constituting a transport block and the index, order, or position of a code block, the decoding of which has failed (or succeeded) in the previous transmission, the terminal may interpret the same as an operation of performing or not performing HARQ combining. In addition, according to the number/degree of code blocks, the decoding of which has succeeded (or failed) in the previous transmission, among the total number of code blocks constituting a transport block, the terminal may interpret the same as an operation of performing or not performing HARQ combining. In addition, according to the HARQ timing value, the terminal may interpret the same as an operation of performing or not performing HARQ combining. The HARQ timing may be defined as the time between downlink resource allocation and downlink data transmission, the time between downlink data transmission result reporting and downlink data retransmission, or the time between downlink data transmission and transmission result reporting. In addition, according to the number of configured HARQ processes, the terminal may interpret the same as an operation of performing or not performing HARQ combining. In addition, according to the terminal type, the terminal may interpret the same as an operation of performing or not performing HARQ combining. Examples of the terminal type includes a terminal supporting both the first service type and the second service type and a terminal supporting only a part thereof. In addition, according to channel estimation values that the terminal has reported to the base station, such as channel state information (CSI), precoding matrix indicator (PMI), or reference signal received power (RSRP), the terminal may interpret the same as an operation of performing or not performing HARQ combining.

Figure 3F:
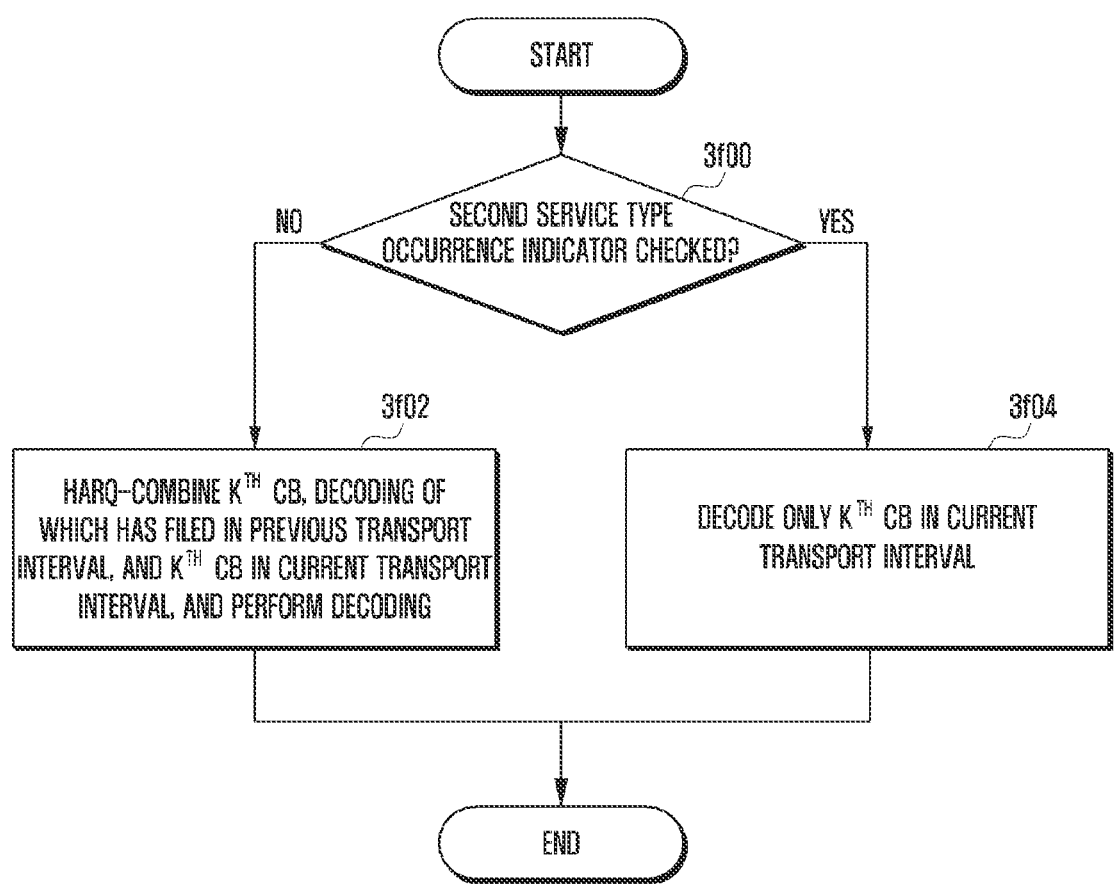
FIG. 3F is a block diagram of a method for receiving data by a terminal according to the $(3\text{-}1)^{th}$ embodiment.

FIG. 3F is a block diagram illustrating a method for receiving data by a terminal according to the $(3-1)^{th}$ embodiment.

FIG. 3F illustrates a terminal operation when a second service type occurrence indicator (or HARQ-combining indicator) exists in a DCI existing in a control area. The terminal initially checks the control area before checking the data area, and then checks (3/00) the HARQ-combining indicator included in the DCI of the control area. If the second service type occurrence indicator indicates YES (for example, one-bit value of 0), the same means that occurrence of the second service type is indicated, and the terminal operates assuming that HARQ combining is not performed. Accordingly, code blocks included in the transport block received in the current transport interval are solely decoded (3/04). In contrast, if the second service type occurrence indicator indicates NO (for example, one-hit value of 1), the same means that non-occurrence of the second service type is indicated, and the terminal operates (3/02) assuming that HARQ combining is performed. Therefore, code blocks received in the current transport interval are HARQ-combined with code blocks received in the previous transmission and then decoded (3*j*02). The above example of YES or NO has a one-bit value of 0 or 1, and the interpretation still holds when the same are switched. It is to be noted that the example of YES or NO could also be determined by the terminal implicitly. The above-described code blocks may all be interpreted as a unit constituting a transport block of the first service type.

Figure 3G:
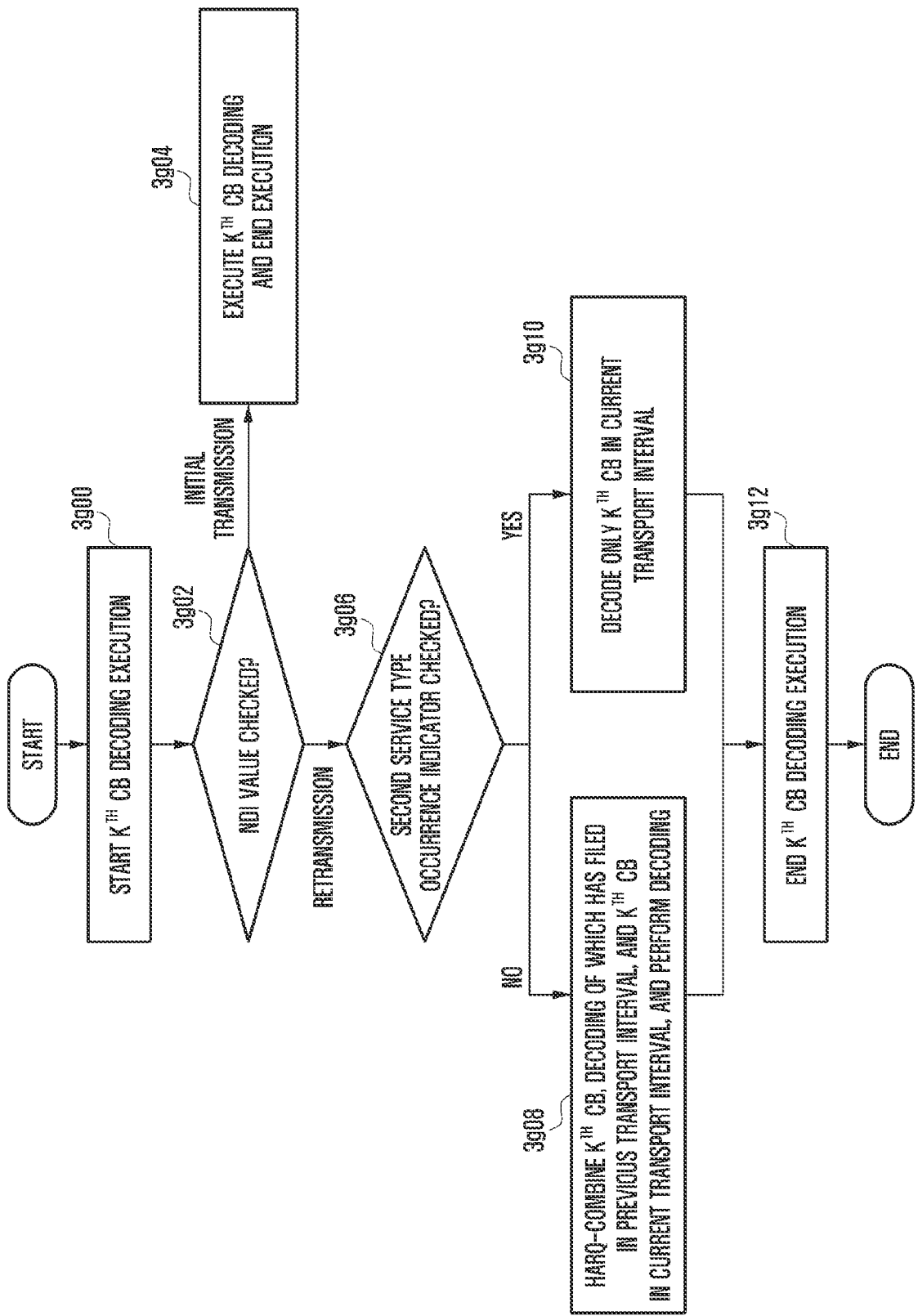
FIG. 3G is a block diagram of a method for receiving data by a terminal according to the $(3\text{-}2)^{th}$ embodiment.

FIG. 3G is a block diagram illustrating a method for receiving data by a terminal according to the $(3-2)^{th}$ embodiment.

FIG. 3G illustrates a terminal operation (3*g*00) when an NDI and a second service type occurrence indicator (or HARQ-combining indicator) exist in a DCI existing in a control area. The terminal checks (3*g*02) the NDI in the control area and, if initial transmission is confirmed as a result of checking, the terminal immediately decodes the corresponding code block (3*g*04). If retransmission is confirmed as a result of checking (3*g*02) the NDI, the terminal checks (3*g*06) the HARQ-combining indicator. If the second service type occurrence indicator indicates YES (for example, one-bit value of 0), the same means that occurrence of the second service type is indicated, and the terminal operates assuming that HARQ combining is not performed. Accordingly, code blocks included in the transport block received in the current transport interval are solely decoded (3*g*10). In contrast, if the second service type occurrence indicator indicates NO (for example, one-bit value of 1), the same means that non-occurrence of the second service type is indicated, and the terminal operates (3*g*08) assuming that HARQ combining is performed. Therefore, code blocks received in the current transport interval are HARQ-combined with code blocks received in the previous transmission and then decoded (3*g*08). The above example of YES or NO has a one-bit value of 0 or 1, and the interpretation still holds when the same are switched. It is to be noted that the example of YES or NO could also be determined by the terminal implicitly. The above-described code blocks may all be interpreted as a unit constituting a transport block of the first service type.

Figure 3H:
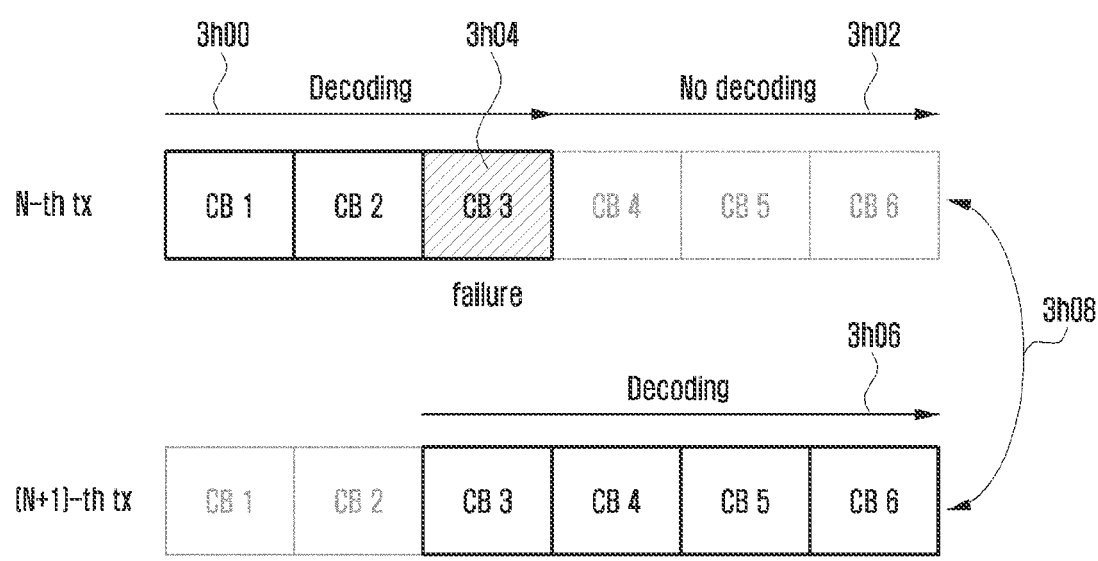
FIG. 3H illustrates a process of receiving data by a terminal according to the $(3\text{-}3)^{th}$ embodiment.
Figure 31A:
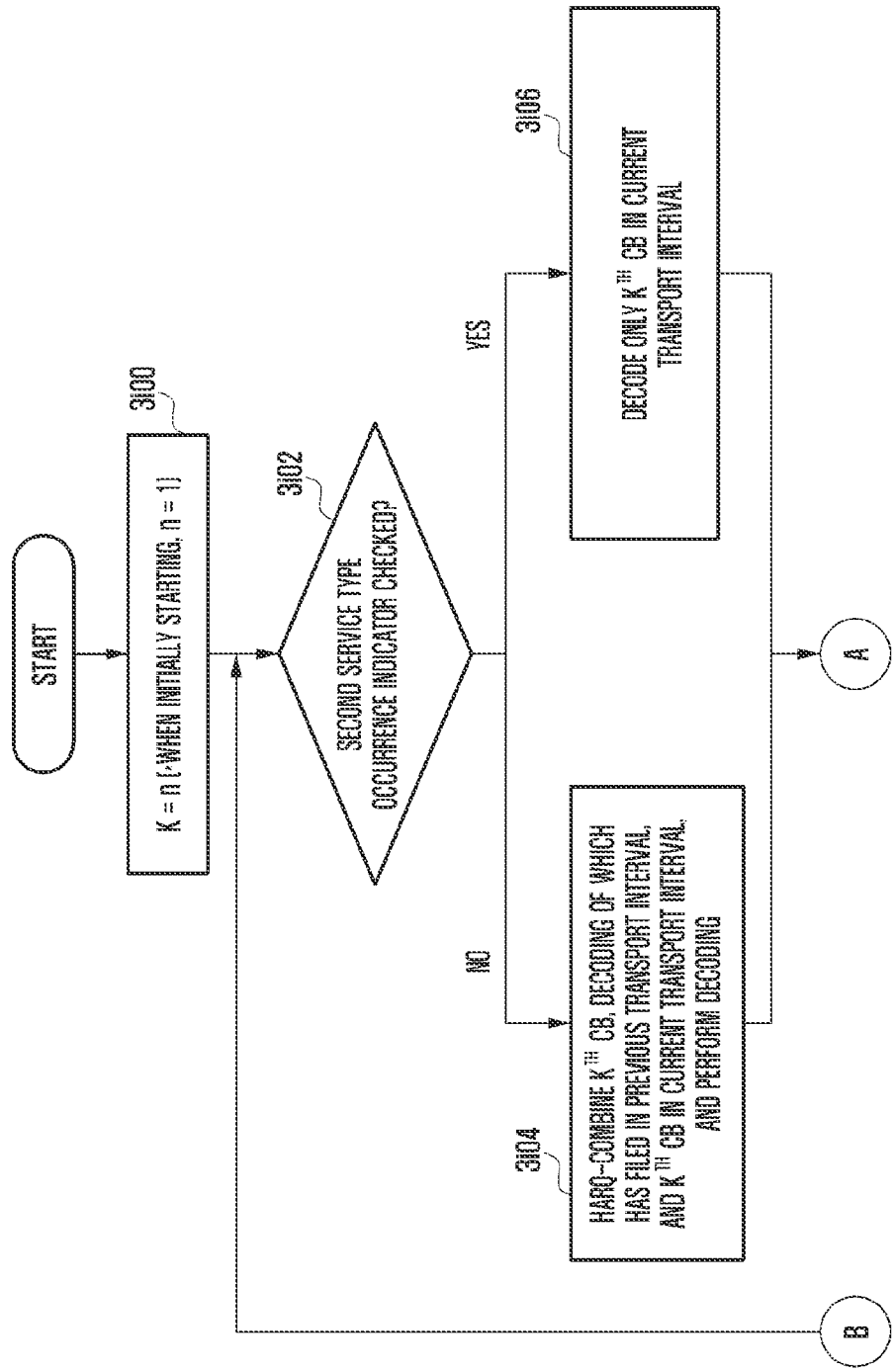
Figure 31B:
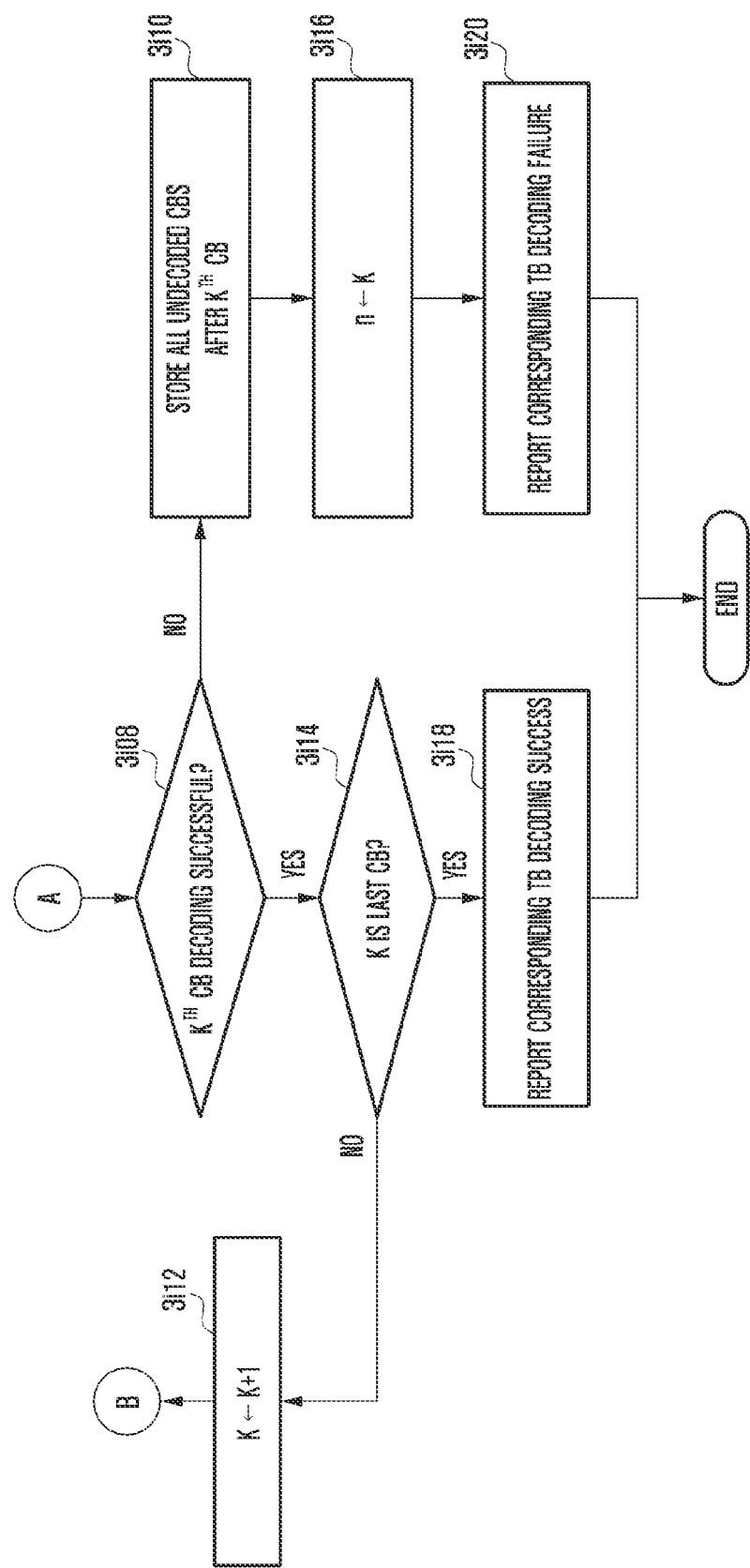

FIG. 3H illustrates a process of receiving data by a terminal according to the $(3-3)^{th}$ embodiment.

FIG. 3H illustrates a process of the terminal receiving data of the first service type from the viewpoint of code blocks. FIG. 3H illustrates a situation wherein a total of six code blocks exist. There may occur a situation wherein, while decoding successively proceeds (3*h*00) from code block (CB) 1 in the $N^{th}$ transport interval, decoding of code block 3 fails. Such a case of failed decoding may include a case wherein the corresponding code block is damaged (3*h*04) by influence of the channel or by the second service type. The following code blocks 4-6 may not be decoded (3*h*02), and the pre-decoding value may be stored in the buffer of the corresponding terminal. A situation supporting such an operation may be applied to reduce power consumption of the terminal that may additionally occur depending on decoding of the terminal. That is, since the result of decoding the corresponding transport block while code block 3 has been damaged is failure, the probability of successful decoding is increased by performing HARQ combining with the code block retransmitted later and then performing decoding with regard to each code block, and no decoding is accordingly performed after code block 3. That is, in connection with all code blocks 4-6 following code block 3, the pre-decoding value is stored in the buffer, and the value after successful decoding, in connection with code blocks 1 and 2, is stored in the buffer. The terminal performs (3*h*06), after confirming with reference to the HARQ-combining indicator whether or not to conduct HARQ combining (3*h*08) of code blocks 3-6 received in the $(N+1)^{th}$ transport interval and code blocks 3-6 received in the $N^{th}$ transport interval, That is, if the HARQ-combining indicator indicates HARQ combining, code blocks 3-6 successively undergo HARQ combining and then decoding. In contrast, if the HARQ-combining indicator indicates no HARQ combining, only code blocks 3-6 received in the $(N+1)^{th}$ transport interval, among code blocks 3-6, are decoded. In addition, an operation of erasing the pre-decoding values of code blocks 3-6 received in the previous $N^{th}$ transport interval from the buffer is also applied. The above-described code blocks may all interpreted as a unit constituting a transport block of the first service type. The situation presented in the embodiment, that is, the situation wherein one transport block includes six code blocks, is applicable through the same operation even when the number of code blocks is any natural number value other than six.

FIG. 3IA and FIG. 3IB are block diagrams illustrating a process of receiving data by a terminal according to the $(3-3)^{th}$ embodiment.

The terminal initially configures the $K^{th}$ code block value as n (3*i*00). The value of n has the value of 1 during initial transmission. The terminal then checks (3*i*02) the second service type occurrence indicator (or HARQ-combining indicator). If the result of checking the indicator indicates YES (that is, second service type occurred and HARQ combining not performed), the terminal decodes (3*i*06) only the $K^{th}$ code block in the current transport interval. In contrast, if the result of checking the indicator indicates NO (that is, the second service type not occurred and HARQ combining performed), the terminal HARQ-combines the $K^{th}$ code block in the current transport interval and the $K^{th}$ code block, the decoding of which has failed in the previous transport interval, and then performs decoding (3*i*04). The terminal then checks the result of performing decoding (3*i*08). If the decoding result is successful after performing each decoding, it is checked (3*i*14) whether the corresponding $K^{th}$ code block is the last code block of all code blocks constituting the transport block. If K indicates the last code block, the terminal informs (3*i*18) the base station that the transport block transmitted from the base station according to the corresponding preconfigured ACK/NACK report timing is successful. If the $K^{th}$ code block is not the last code block, the terminal performs (3*i*12) the same process with regard to the $(K+1)^{th}$ code block as has been performed with regard to the $K^{th}$ code block. If decoding of the $K^{th}$ code block fails, the terminal stores (3*i*10) the pre-decoding value of all code blocks, the decoding of which has not been attempted, following the $K^{th}$ code block in the buffer of the terminal, and updates (3*i*16) the value of n to K. This means that, in the case of retransmission conducted next, the terminal attempts decoding from the corresponding updated $n^{th}$ code block. The terminal then informs the base station that decoding of the corresponding transport block has failed (3*i*20). The above-described code blocks may all be interpreted as a unit constituting a transport block of the first service type.

Figure 3J:
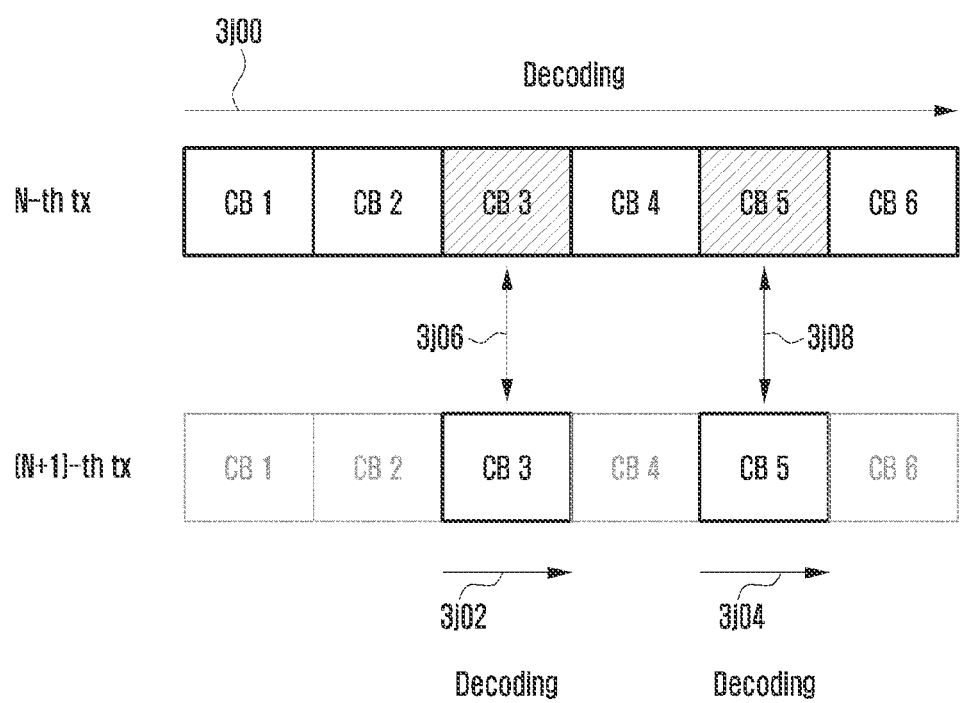
FIG. 3J illustrates a process of receiving data by a terminal according to the $(3\text{-}4)^{th}$ embodiment.

FIG. 3J illustrates a process of receiving data by a terminal according to the $(3-4)^{th}$ embodiment.

FIG. 3J illustrates a situation wherein the terminal receives a transport block including a total of six code blocks in the $N^{th}$ transport interval, and successively decodes respective code blocks. Unlike the third embodiment, the terminal decodes all regardless of whether decoding of each code block is a failure or a success (3*j*00). The $(3-4)^{th}$ embodiment shows that decoding of code blocks 3 and 5 has failed as a result. The reason for the corresponding decoding failure may be the influence of the channel change or because the transport block of the second service type has occupied a part of the data area configured for the transport block of the first service type. The terminal reports to the base station that the partially failed code block decoding has led to failed decoding of the corresponding transport block, and the base station later transmits the corresponding transport block to the terminal again in the $(N+1)^{th}$ transport interval. The terminal omits additional decoding of the code blocks, the decoding of which has succeeded, and re-attempts to decode only the code blocks that have not been successfully decoded (3*j*02 and 3*j*04). According to the second service type occurrence indicator (or HARQ-combining indicator), it is determined (3*j*06 and 3*j*08) whether to combine and decode the third code blocks and the fifth code blocks in the $N^{th}$ transport block and the $(N+1)^{th}$ transport block or to decode only the third code block and the fifth code block received in the $(N+1)^{th}$ transport block. The terminal performs decoding according to the operation determined by the indicator, and reports the corresponding decoding result to the base station. The above-described code blocks may all interpreted as a unit constituting a transport block of the first service type. The situation presented in the embodiment, that is, the situation wherein one transport block includes six code blocks, is applicable through the same operation even when the number of code blocks is any natural number value other than six.

Figure 3K:
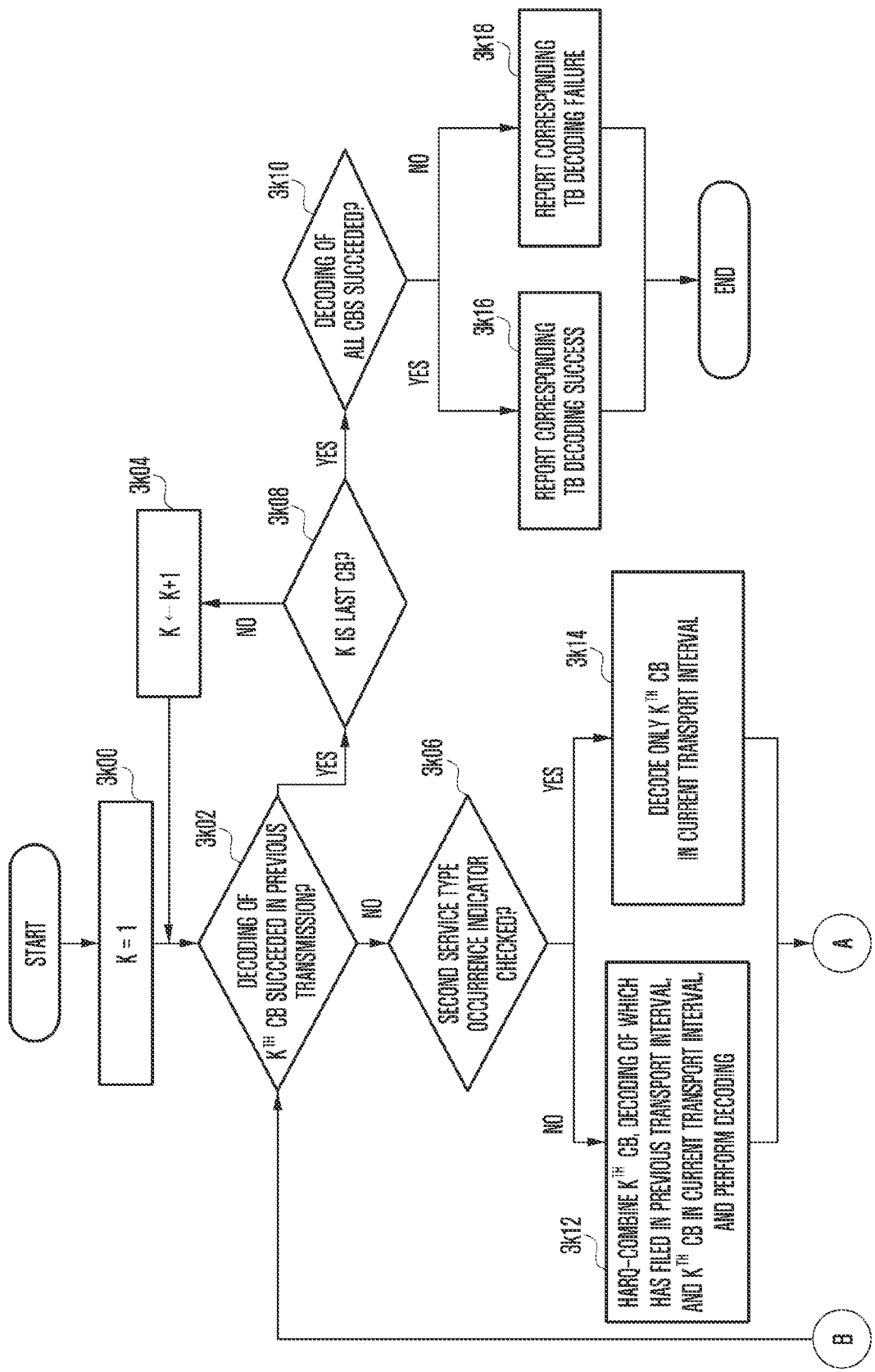
FIG. 3KA and FIG. 3KB are block diagrams of a process for receiving data by a terminal according to the $(3\text{-}4)^{th}$ embodiment.
Figure 3K:
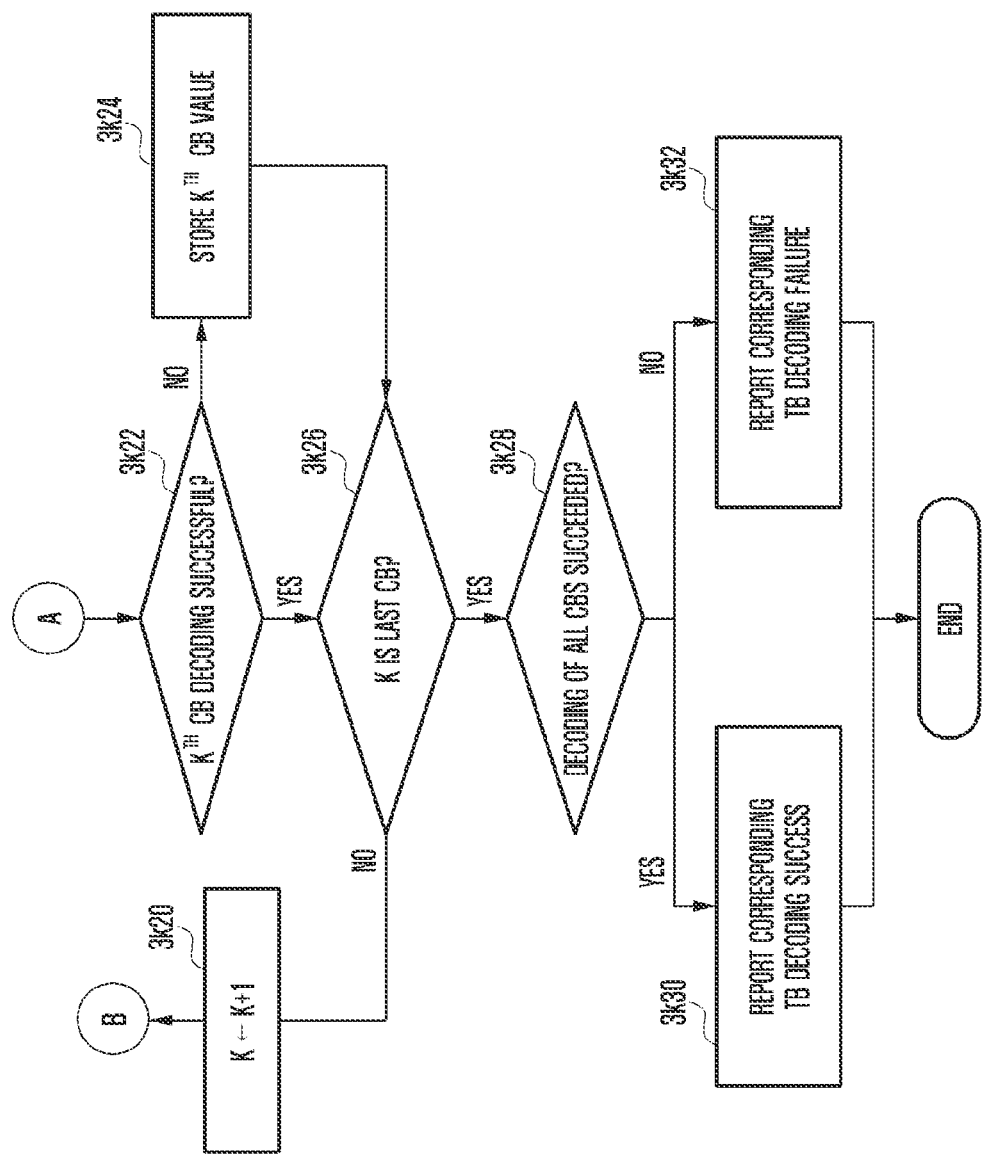
Figure 3L:
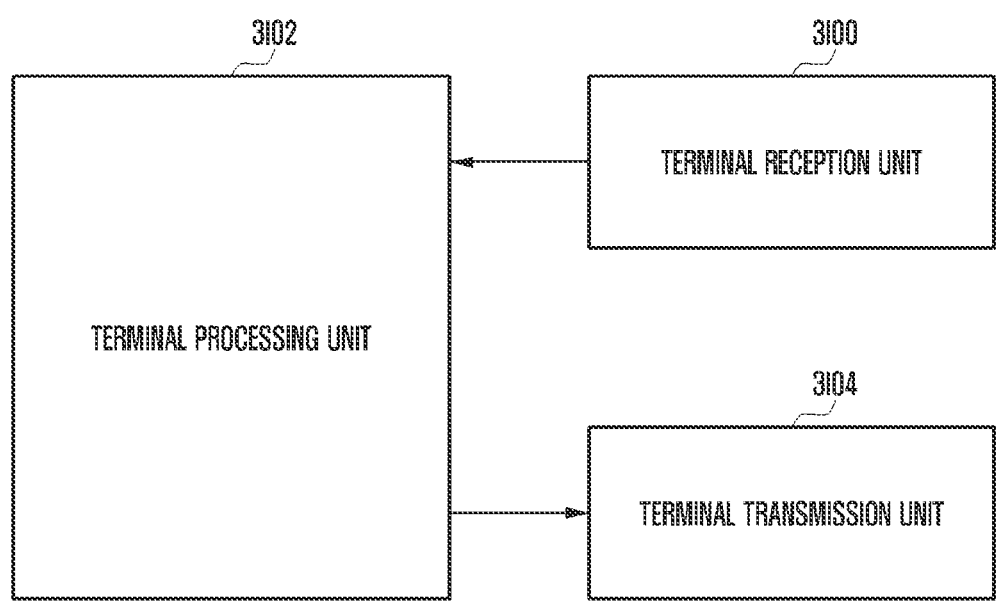
FIG. 3L is a block diagram illustrating the structure of a terminal according to embodiments.

FIG. 3KA and FIG. 3KB are block diagrams illustrating a process of receiving data by a terminal according to the $(3-4)^{th}$ embodiment.

The terminal initially configures K=1 (3*k*00). That is, the operation starts from the first code block among code blocks constituting the transport block of the first service type. It is determined whether or not decoding of the $K^{th}$ code block has succeeded in the previous transport interval (3*k*02). In the case of success, the terminal checks (3*k*08) whether or not the $K^{th}$ code block is the last code block. In the case of the last code block, the terminal determines whether or not decoding of all code blocks has succeeded (3*k*10). If decoding of all code block has succeeded, the terminal informs the base station that decoding of the corresponding transport block has succeeded (3*k*16). If decoding of all code blocks has not succeeded, the terminal informs the base station that decoding of the corresponding transport block has failed (3*k*18). If the $K^{th}$ code block is not the last code block, the terminal performs (3*k*04) the same operation with regard to the $(K+1)^{th}$ code block as in the method performed with regard to the $K^{th}$ code block. If decoding of the $K^{th}$ code block has failed in the previous transport interval, the terminal checks (3*k*06) the second service type occurrence indicator (or HARQ-combining indicator). If it is confirmed as a result of checking that the second service type has occurred (or HARQ combining has not been indicated), the terminal decodes only the $K^{th}$ code block in the current transport interval (3*k*14). If the second service type has not occurred (or if HARQ combining has been indicated), the $K^{th}$ code block, the decoding of which has failed in the previous transport interval, and the $K^{th}$ code block in the current transport interval are HARQ-combined and then decoded (3*k*12). After performing respective decoding processes, the terminal checks the result of successful $K^{th}$ decoding (3*k*22). If the decoding has succeeded, the terminal checks whether or not the corresponding code block is the last code block (3*k*26). In the case of the last code block, the terminal determines whether or not decoding of all code blocks has succeeded (3*k*28). If decoding of all code blocks succeeds, the terminal determines that the decoding of the corresponding transport block has succeeded, and reports the same to the base station (3*k*30). If decoding of some code blocks fails, the terminal determines that decoding of the corresponding transport block has failed, and reports the same to the base station (3*k*32). If the $K^{th}$ code block is not the last code block, processes performed with regard to the $K^{th}$ code block are performed again (3*k*20) with regard to the $(K+1)^{th}$ code block that follows. Meanwhile, if decoding of the $K^{th}$ code block fails, the terminal stores (3*k*24) the pre-decoding value of the corresponding code block in the buffer. The terminal then checks whether or not the $K^{th}$ code block is the last code block (3*k*26). The above-described code blocks may all be interpreted as a unit constituting a transport block of the first service type.

FIG. 3I is a block diagram illustrating the structure of a terminal according to embodiments.

Referring to FIG. 3I, the terminal of the disclosure may include a terminal reception unit 3100, a terminal transmission unit 3104, and a terminal processing unit 3102. In an embodiment, the terminal reception unit 3100 and the terminal transmission unit 3104 may be collectively referred to as a transmission/reception unit. The transmission/reception unit may transmit/receive a signal to/from a base station. The signal may include control information and data. To this end, the transmission/reception unit may include an RF transmitter that up-converts and amplifies the frequency of a transmitted signal, an RF receiver that low-noise-amplifies a received signal and down-converts the frequency thereof, and the like. In addition, the transmission/reception unit may receive a signal through a wireless channel, output the same to the terminal processing unit 3102, and transmit a signal output from the terminal processing unit 3102 through the wireless channel. The terminal processing unit 3102 may control a series of processes such that the terminal can operate according to the above-mentioned embodiment. For example, the terminal reception unit 3100 may receive a signal including second signal transmission timing information from the base station, and the terminal processing unit 3102 may control the same so as to interpret the second signal transmission timing. The terminal transmission unit 3104 then may transmit a second signal at the second timing.

Figure 3M:
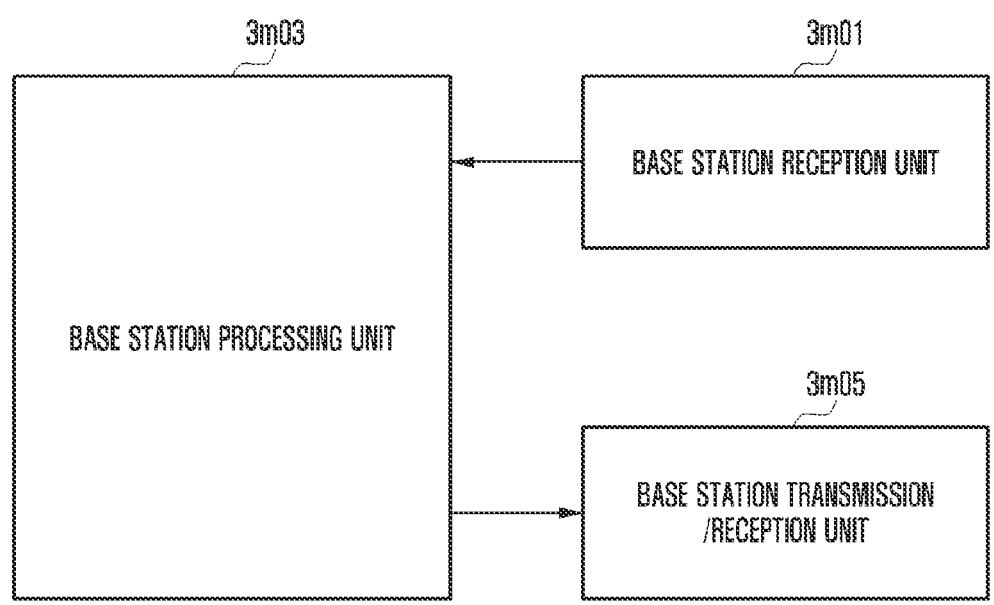
FIG. 3M is a block diagram illustrating the structure of a base station according to embodiments.

FIG. 3M is a block diagram illustrating the structure of a base station according to embodiments.

Referring to FIG. 3M, the base station in an embodiment may include at least one of a base station reception unit **3*m*01, a base station transmission unit 3*m*05, and a base station processing unit 3*m*03. In an embodiment of the disclosure, the base station reception unit 3*m*01 and the base station transmission unit 3*m*05 may be collectively referred to as a transmission/reception unit. The transmission/reception unit may transmit/receive a signal to/from a terminal. The signal may include control information and data. To this end, the transmission/reception unit may include an RF transmitter that up-converts and amplifies the frequency of a transmitted signal, an RF receiver that low-noise-amplifies a received signal and down-converts the frequency thereof, and the like. In addition, the transmission/reception unit may receive a signal through a wireless channel, output the same to the base station processing unit 3*m*03, and transmit a signal output from the terminal processing unit 3*m*03 through the wireless channel. The base station processing unit 3*m*03 may control a series of processes such that the base station can operate according to the above-mentioned embodiment of the disclosure. For example, the base station processing unit 3*m*03** may determine second signal transmission timing and may perform control so as to generate the second signal transmission timing information to be transferred to the terminal. The base station transmission unit 3m05 then may transfer the timing information to the terminal, and the base station reception 3m01 may receive the second signal at the timing. In addition, according to an embodiment of the disclosure, the base station processing unit 3m03 may perform control so as to generate downlink control information (DCI) including the second signal transmission timing information. In this case, the DCI may indicate that the same corresponds to the second signal transmission timing information.

Meanwhile, the embodiments of the disclosure disclosed in the specification and the drawings have been presented to easily explain technical contents of the disclosure and help comprehension of the disclosure, and do not limit the scope of the disclosure. That is, it is obvious to those skilled in the art to which the disclosure belongs that different modifications can be achieved based on the technical spirit of the disclosure. Further, if necessary, the above respective embodiments may be employed in combination. For example, parts of embodiments of the disclosure may be combined to operate a base station and a terminal. Further, although the above embodiments have been described on the basis of the NR system, it may be possible to implement other variant embodiments on the basis of the technical idea of the embodiments in other systems such as FDD or TDD LTE systems.

Although exemplary embodiments of the disclosure have been shown and described in this specification and the drawings, they are used in general sense in order to easily explain technical contents of the disclosure, and to help comprehension of the disclosure, and are not intended to limit the scope of the disclosure. It is obvious to those skilled in the art to which the disclosure pertains that other modified embodiments on the basis of the spirits of the disclosure besides the embodiments disclosed herein can be carried out.

Meanwhile, the embodiments of the disclosure disclosed in the specification and the drawings have been presented to easily explain technical contents of the disclosure and help comprehension of the disclosure, and do not limit the scope of the disclosure. That is, it is obvious to those skilled in the art to which the disclosure belongs that different modifications can be achieved based on the technical spirit of the disclosure. Further, if necessary, the above respective embodiments may be employed in combination. For example, a base station and a terminal may operate based on the combination of a part of the first embodiment and a part of the second embodiment of the disclosure. Further, although the above embodiments have been described on the basis of the LTE/LTE-A system, it may be possible to implement other variant embodiments on the basis of the technical idea of the embodiments in other systems such as 5G and NR systems.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. A method performed by a terminal in a wireless communication system, the method comprising:
   receiving, from a base station, first downlink control information (DCI) scheduling a transport block (TB), the first DCI including modulation and coding scheme (MCS) information for the TB, time domain resource information for the TB, and frequency domain resource information for the TB;
   receiving, from the base station, the TB including a plurality of code blocks based on the first DCI;
   transmitting, to the base station, hybrid automatic repeat request (HARQ) information based on a decoding failure of at least one code block among the plurality of code blocks;
   receiving, from the base station, second DCI scheduling a retransmission associated with the at least one code block, the second DCI including MCS information for the at least one code block, time domain resource information for the at least one code block, frequency domain resource information for the at least one code block, and information indicating whether the at least one code block is combinable;
   receiving, from the base station, the at least one code block based on the second DCI;
   decoding the at least one code block with an earlier received at least one code block, in case that the information indicating whether the at least one code block is combinable indicates a first value; and
   decoding the at least one code block without the earlier received at least one code block, in case that the information indicating whether the at least one code block is combinable indicates a second value.

2. The method of claim 1, wherein the HARQ information includes negative acknowledgement (NACK) information for the at least one code block among the plurality of code blocks.

3. The method of claim 1, wherein the information indicating whether the at least one code block is combinable includes one bit, and
   wherein the first value and the second value are different.

4. The method of claim 1, wherein a radio resource control (RRC) signaling received from the base station configures the information to be included in the second DCI.

5. A method performed by a base station in a wireless communication system, the method comprising:
   transmitting, to a terminal, first downlink control information (DCI) scheduling a transport block (TB), the first DCI including modulation and coding scheme (MCS) information for the TB, time domain resource information for the TB, and frequency domain resource information for the TB;
   transmitting, to the terminal, the TB including a plurality of code blocks based on the first DCI;
   receiving, from the terminal, hybrid automatic repeat request (HARQ) information associated with a decoding failure of at least one code block among the plurality of code blocks;
   transmitting, to the terminal, second DCI scheduling a retransmission associated with the at least one code block, the second DCI including MCS information for the at least one code block, time domain resource information for the at least one code block, frequency domain resource information for the at least one code block, and information indicating whether the at least one code block is combinable; and
   transmitting, to the terminal, the at least one code block based on the second DCI,
   wherein the at least one code block is decoded with an earlier transmitted at least one code block, in case that the information indicating whether the at least one code block is combinable indicates a first value, and wherein the at least one code block is decoded without the earlier transmitted at least one code block, in case that the information indicating whether the at least one code block is combinable indicates a second value.

6. The method of claim 5, wherein the HARQ information includes negative acknowledgement (NACK) information for the at least one code block among the plurality of code blocks.

7. The method of claim 5, wherein the information indicating whether the at least one code block is combinable includes one bit, and
wherein the first value and the second value are different.

8. The method of claim 5, wherein a radio resource control (RRC) signaling transmitted to the terminal configures the information to be included in the second DCI.

9. A terminal in a wireless communication system, the terminal comprising:
a transceiver configured to transmit or receive a signal; and
a controller configured to:
receive, from a base station, first downlink control information (DCI) scheduling a transport block (TB), the first DCI including modulation and coding scheme (MCS) information for the TB, time domain resource information for the TB, and frequency domain resource information for the TB,
receive, from the base station, the TB including a plurality of code blocks based on the first DCI,
transmit, to the base station, hybrid automatic repeat request (HARQ) information based on a decoding failure of at least one code block among the plurality of code blocks,
receive, from the base station, second DCI scheduling a retransmission associated with the at least one code block, the second DCI including MCS information for the at least one code block, time domain resource information for the at least one code block, frequency domain resource information for the at least one code block, and information indicating whether the at least one code block is combinable,
receive, from the base station, the at least one code block based on the second DCI,
decode the at least one code block with an earlier received at least one code block, in case that the information indicating whether the at least one code block is combinable indicates a first value, and
decode the at least one code block without the earlier received at least one code block, in case that the information indicating whether the at least one code block is combinable indicates a second value.

10. The terminal of claim 9, wherein the HARQ information includes negative acknowledgement (NACK) information for the at least one code block among the plurality of code blocks.

11. The terminal of claim 9, wherein the information indicating whether the at least one code block is combinable includes one bit, and
wherein the first value and the second value are different.

12. The terminal of claim 9, wherein a radio resource control (RRC) signaling received from the base station configures the information to be included in the second DCI.

13. A base station in a wireless communication system, the base station comprising:
a transceiver configured to transmit or receive; a signal; and
a controller configured to:
transmit, to a terminal, first downlink control information (DCI) scheduling a transport block (TB), the first DCI including modulation and coding scheme (MCS) information for the TB, time domain resource information for the TB, and frequency domain resource information for the TB,
transmit, to the terminal the TB including a plurality of code blocks based on the first DCI,
receive, from the terminal, hybrid automatic repeat request (HARQ) information associated with a decoding failure of at least one code block among the plurality of code blocks,
transmit, to the terminal, second DCI scheduling a retransmission associated with the at least one code block, the second DCI including MCS information for the at least one code block, time domain resource information for the at least one code block, frequency domain resource information for the at least one code block, and information indicating whether the at least one code block is combinable, and
transmit, to the terminal, the at least one code block based on the second DCI,
wherein the at least one code block is decoded with an earlier transmitted at least one code block, in case that the information indicating whether the at least one code block is combinable indicates a first value, and
wherein the at least one code block is decoded without the earlier transmitted at least one code block, in case that the information indicating whether the at least one code block is combinable indicates a second value.

14. The base station of claim 13, wherein the HARQ information includes negative acknowledgement (NACK) information for the at least one code block among the plurality of code blocks.

15. The base station of claim 13, wherein the information indicating whether the at least one code block is combinable includes one bit, and the first value and the second value are different.

16. The base station of claim 13, wherein a radio resource control (RRC) signaling transmitted to the terminal configures the information to be included in the second DCI.

* * * * *